United States Patent

Kawakami et al.

[11] Patent Number: 5,917,732
[45] Date of Patent: Jun. 29, 1999

[54] ARITHMETIC UNIT, CORRELATION ARITHMETIC UNIT AND DYNAMIC IMAGE COMPRESSION APPARATUS

[75] Inventors: Susumu Kawakami; Hiroaki Okamoto; Motomu Takatsu, all of Kawasaki, Japan

[73] Assignee: Fujitsu Limited, Kawasaki, Japan

[21] Appl. No.: 08/724,961

[22] Filed: Sep. 5, 1996

[30] Foreign Application Priority Data

Sep. 12, 1995 [JP] Japan ................................ 7-234343

[51] Int. Cl.[6] ....................................................... G06F 7/38
[52] U.S. Cl. ..................... 364/715.012; 364/807
[58] Field of Search ............................ 364/715.012, 768, 364/807

[56] References Cited

U.S. PATENT DOCUMENTS

| | | | |
|---|---|---|---|
| 4,622,588 | 11/1986 | Chapuis et al. | 364/715.012 |
| 5,075,879 | 12/1991 | Anderson | 364/715.012 |
| 5,148,386 | 9/1992 | Hori | 364/715.012 |
| 5,384,722 | 1/1995 | Dulong | 364/715.012 |

FOREIGN PATENT DOCUMENTS 06326911  11/1994  Japan .

*Primary Examiner*—David H. Malzahn
*Attorney, Agent, or Firm*—Staas & Halsey

[57] ABSTRACT

In a correlation arithmetic system adapted to detect a relative difference between two functions, an operation is simplified. This makes it possible to perform the operation with a small scale of hardware and also with great accuracy. There is adopted an operation g*h instead of the "product" in the correlation arithmetic operation. There is disclosed an arithmetic unit in which two numeral values $\underline{a}$ and $\underline{b}$ are inputted, and the two numerical values $\underline{a}$ and $\underline{b}$ are subjected to a predetermined operation process, so that a numerical value $\underline{c}$ representative of an operation result is derived. The arithmetic unit has an absolute value operation unit for evaluating an absolute value $|c|$ of the numerical value $\underline{c}$, and a sign operation unit for evaluating a sign "sign (c)" of the numerical value $\underline{c}$.

16 Claims, 84 Drawing Sheets

Fig. 1
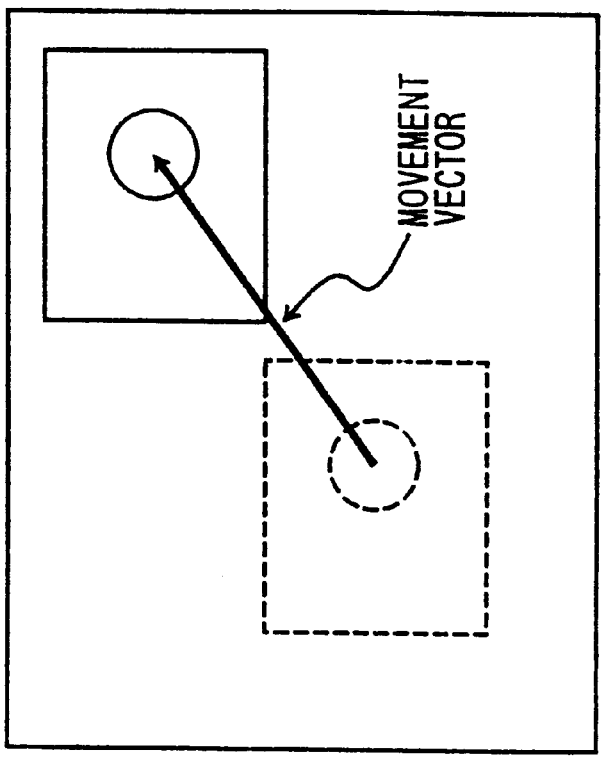
PRESENT SCREEN (SCREEN A)
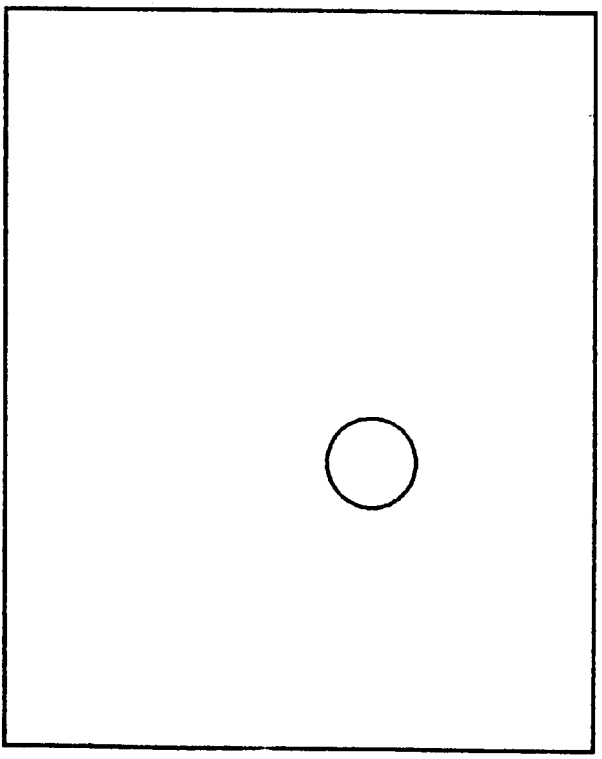
PREVIOUS SCREEN (SCREEN B)

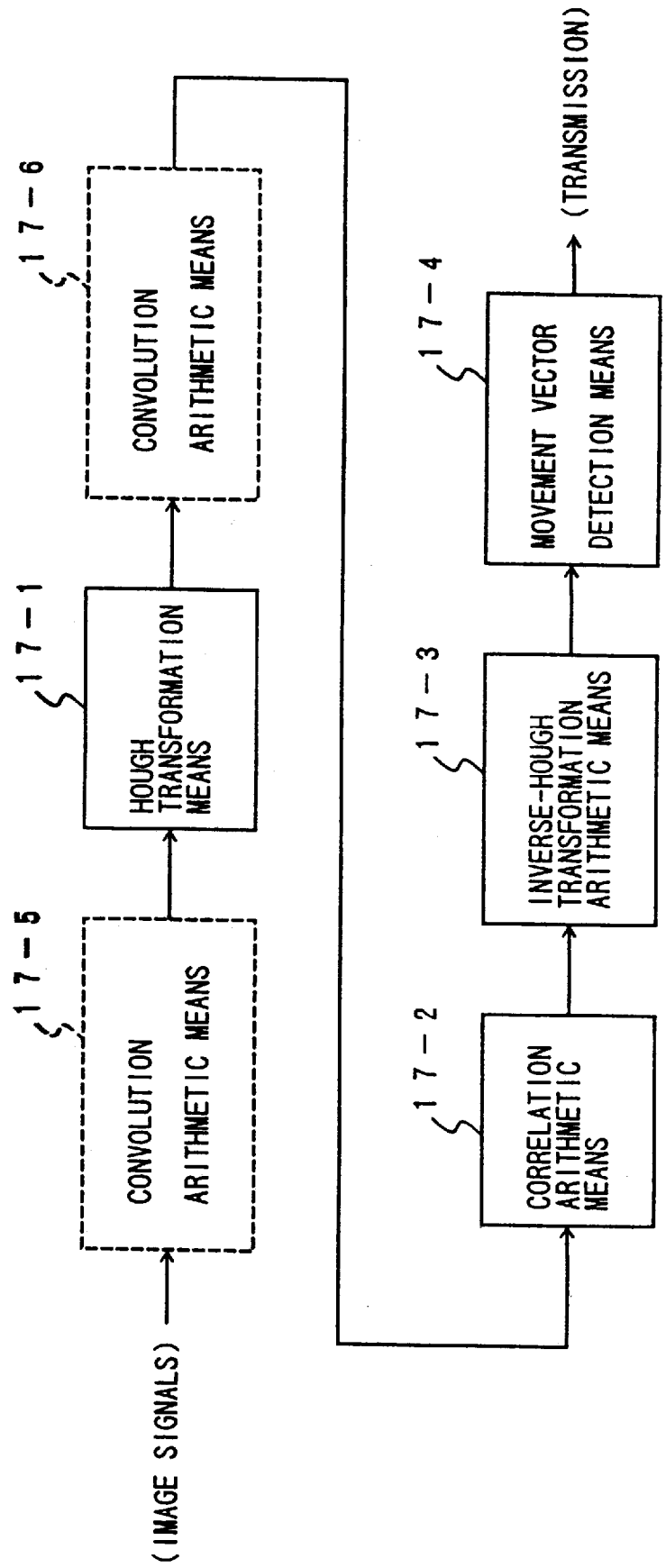

Fig. 25(A)
SIMBOL
Fig. 25(B)
CIRCUIT
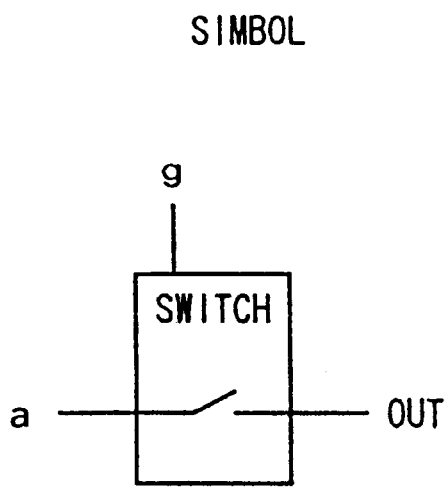
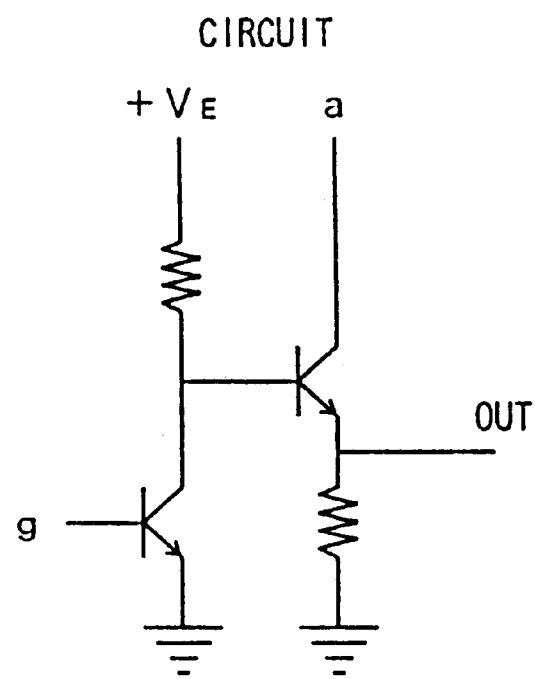
Fig. 26
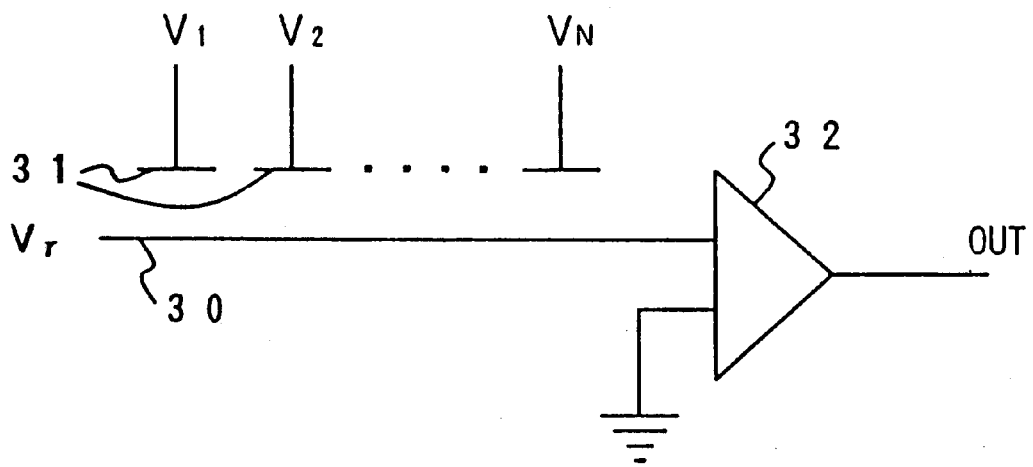

SCREEN B

SCREEN A

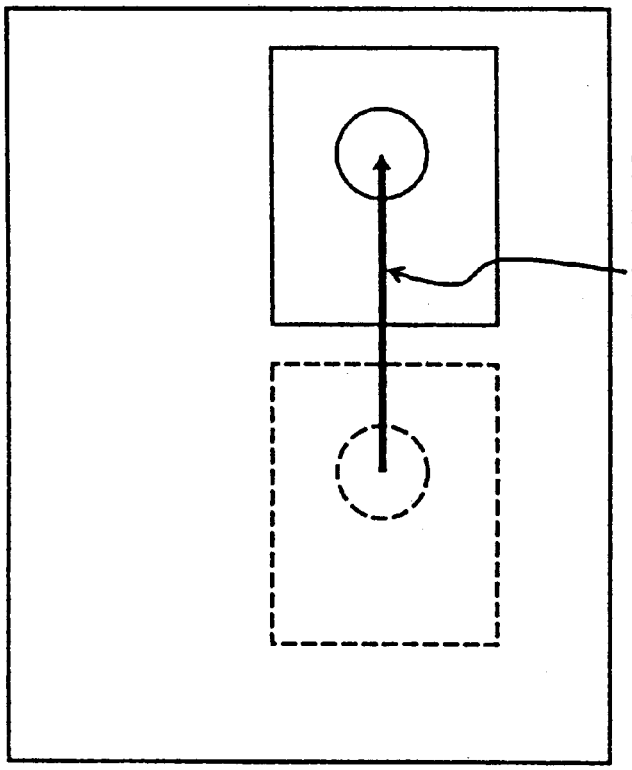
Fig. 42(B) RIGHT SCREEN
BINOCULAR DISPARITY
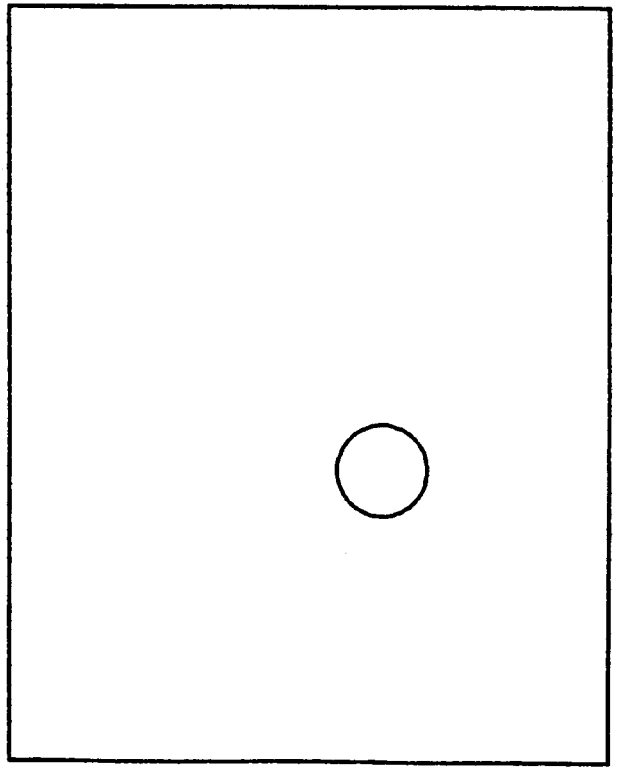
Fig 42(A) LEFT SCREEN

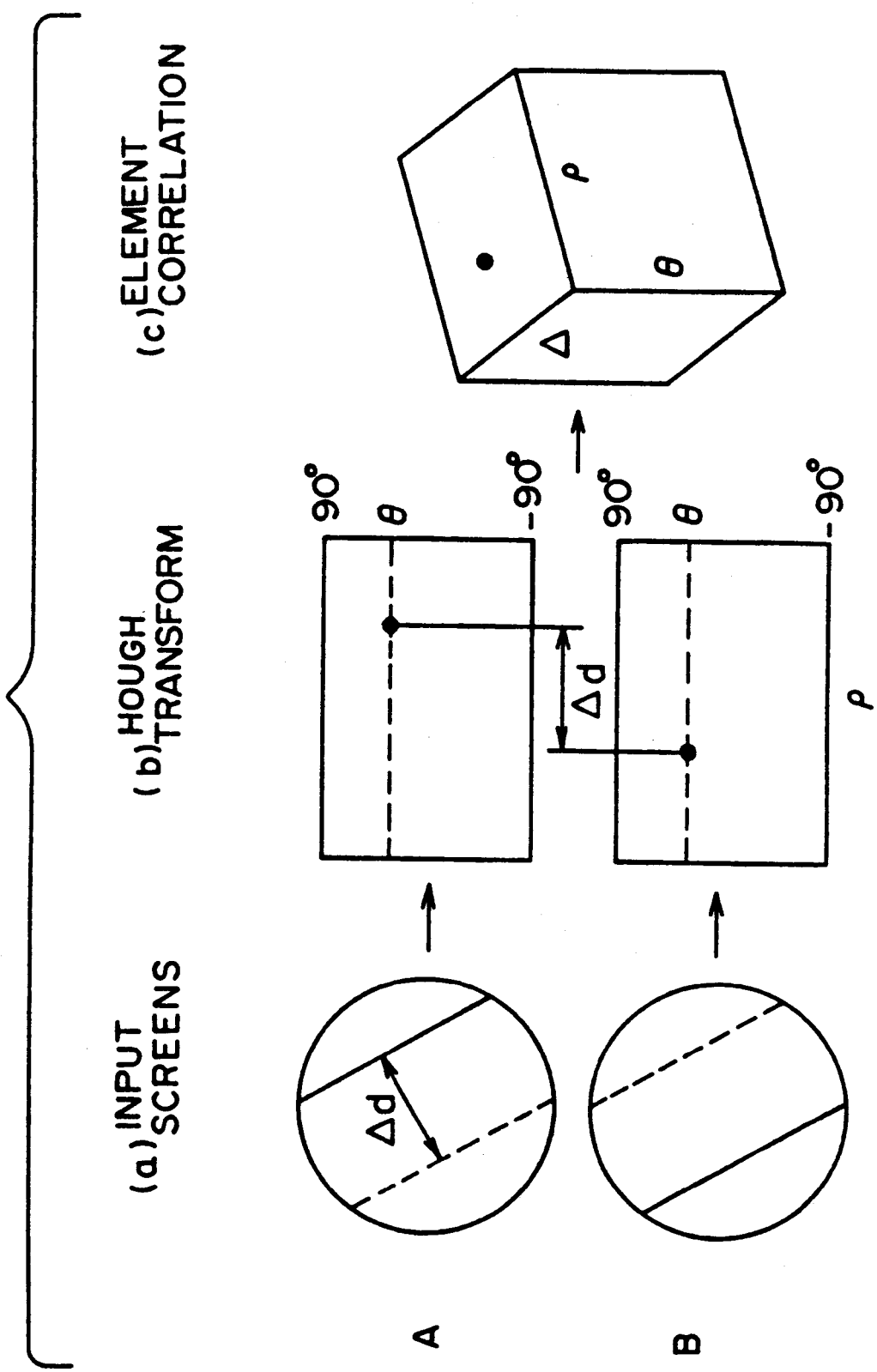

SCREEN B

SCREEN A

SCREEN B

SCREEN A

| -1 | -1 | -1 |
|---|---|---|
| -1 | 8 | -1 |
| -1 | -1 | -1 |

|  | -1 | -1 | -1 |  |
|---|---|---|---|---|
| -1 |  |  |  | -1 |
| -1 |  | 12 |  | -1 |
| -1 |  |  |  | -1 |
|  | -1 | -1 | -1 |  |

| -1 | 2 | -1 |

| -1 | | 2 | | -1 |

| -1 | | 1 |

ARITHMETIC UNIT, CORRELATION ARITHMETIC UNIT AND DYNAMIC IMAGE COMPRESSION APPARATUS

BACKGROUND OF THE INVENTION

1. Field of the Invention

The present invention relates to an arithmetic unit suitable for a correlation operation, a correlation arithmetic unit using such an arithmetic unit and a dynamic image compression apparatus using such a correlation arithmetic unit.

2. Description of the Related Art

It is necessary for a control of a mobile robot and an automatic traveling of a motorcar to measure a velocity vector in a camera screen. A control for the movement and the traveling is performed on the basis of the measured vector.

The velocity vector will be described referring to FIG. 1. Now, in the consideration of a circular figure in the space, as the robot moves, the circular figure moves in the position between the previous screen obtained through a camera and the present screen. This movement and its direction (or a movement vector) is measured. The measured movement vector divided by a time interval between the previous screen and the present screen gives the velocity vector.

In order to measure the movement vector, a two-dimensional correlation is used. A small area (a rectangle defined by a dotted line) of the previous screen is shifted on a two-dimensional basis by an arbitrary vector($\Delta_x$, $\Delta_y$) to take a correlation with a small area (a rectangle defined by a solid line) of the present screen. When the shift vector ($\Delta_x$, $\Delta_y$), wherein the correlation becomes the maximum, is detected, it is the movement vector to be determined.

In the field of communications, a "movement compensation" is performed for a compression of a dynamic image. It will be explained referring to FIG. 1. The circle in the present screen is equivalent to a translation of the circle in the previous screen. Thus, there is no need to transmit image data as to the circle as image data of the present screen. It is sufficient to transmit only a movement vector, so that the circle data on the previous screen is shifted to be displayed. Thus, a remarkable image compression is carried out. This scheme is used in International Standardization such as an MPEG. The two-dimensional correlation is used also for a measurement of the movement vector.

Also, in a pattern matching used in a pattern recognition and the like, it is necessary to detect a pattern matched in two screens and determine a vector as to their interval. The two-dimensional correlation is used also for such a matching.

The two-dimensional correlation is calculated, assuming that a luminance of a pixel (x, y) in a small area of the present screen is represented by a (x, y) and a luminance of a pixel shifted by ($\Delta_x$, $\Delta_y$) in a small area of the previous screen is represented by $\underline{b}$ (x+$\Delta_x$, y+$\Delta_y$), in the form of the product and sum of their whole pixels in accordance with the following equation.

$$C (\Delta_x, \Delta_y) = \Sigma_x \Sigma_y \, a \, (x, y) \, b \, (x+\Delta_x, y+\Delta_y) \quad (5)$$

Where the accumulation of x and y is performed throughout small areas.

However, since the "product" of the above equation needs a large scale of hardware as compared with addition and subtraction, the product is replaced by the "absolute value of the difference", the two-dimensional correlation is calculated in accordance with the following equation.

$$C (\Delta_x, \Delta_y) = \Sigma_x \Sigma_y \, |a \, (x, y) - b \, (x+\Delta_x, y+\Delta_y)| \quad (6)$$

This replacement involves several drawbacks. The correlation expressed by equation (5) takes the maximum value when both the small areas match with one another (or when a travel equivalent to the movement vector is implemented), and takes the smaller value when both the small areas do not match with one another. Thus, it is possible to detect the maximum value so as to detect the movement vector with great accuracy. On the other hand, the correlation expressed by equation (6) takes the value zero when both the small areas match with one another, and takes the larger value when both the small areas do not match with one another. Consequently, the minimum value is detected to detect the movement vector. However, the correlation expressed by equation (6) takes the smaller value not only when both the small areas match with one another, but also when luminance of the screen is small in its entirety. Thus, there remains the problem in a reliability of the minimum value detection. Further, the noise mixed into the screen causes the correlation to vary, and thus a detection of the minimum value is insecure. According to equation (5), the correlation value becomes zero when luminance of one of the screens is zero. This indicates that it is involved in a non-correlation. On the contrary, according to equation (6), luminance of another of the screens becomes a correlation value. Thus, there remains the problem in a determination of the correlation.

SUMMARY OF THE INVENTION

In view of the foregoing, it is therefore an object of the present invention to provide an arithmetic unit suitable for a correlation operation, a correlation arithmetic unit using such an arithmetic unit and a dynamic image compression apparatus using such a correlation arithmetic unit, in which arithmetic operations are simplified and as a result the arithmetic operations can be carried out with a small scale of hardware.

FIG. 2 is a basic block diagram of the first arithmetic unit according to the present invention.

To attain the above mentioned object of the present invention, there is provided the first arithmetic unit in which two numeral values $\underline{a}$ and $\underline{b}$ are inputted, and the two numerical values $\underline{a}$ and $\underline{b}$ are subjected to a predetermined operation process, so that a numerical value $\underline{c}$ representative of an operation result is derived, comprising:

an absolute value operation unit 2-1 for evaluating an absolute value |c| of the numerical value $\underline{c}$, and a sign operation unit 2-2 for evaluating a sign "sign (c)" of the numerical value $\underline{c}$.

In the first arithmetic unit according to the present invention, it is acceptable that said absolute value operation unit 2-1 receives input signals representing the two numerical values $\underline{a}$ and $\underline{b}$, and then outputs a signal representing a sum |a|+|b| of absolute values |a| and |b| of the two numerical values $\underline{a}$ and $\underline{b}$, and said sign operation unit 2-2 outputs signals representing a plus and a minus in compliance with either one of a match and a mismatch of signs "sign (a) and sign (b)" of the two numerical values $\underline{a}$ and $\underline{b}$ and the other, respectively.

In this case, as shown in FIG. 3, it is acceptable that said absolute value operation unit 2-1 comprises a digital adder 3-1, said digital adder receiving two input digital signals representing absolute values |a| and |b| of the two numerical values a and b, and performing an arithmetic operation of a sum |a|+|b| of the absolute values |a| and |b|, thereby outputting a digital signal representing the absolute value |c| of the numerical value c, and said sign operation unit 2-2 comprises a logic circuit 3-2, said logic circuit receiving digital signals representing signs "sign (a) and sign (b)" of the two numerical values a and b, and operating a logical exclusive OR on the signs "sign (a) and sign (b)" of the two numerical values a and b, thereby evaluating the sign "sign (c)" of the numerical value c.

Further, as shown in FIG. 4, it is acceptable that said absolute value operation unit 2-1 comprises an analog adder, said analog adder receiving two input analog signals representing absolute values |a| and |b| of the two numerical values a and b, and performing an arithmetic operation of the sum of the two absolute values, thereby outputting an analog signal representing the absolute value |c| of the numerical value c, and said sign operation unit 2-2 comprises a logic circuit, said logic circuit receiving digital signals representing signs "sign (a) and sign (b)" of the two numerical values a and b, and operating a logical exclusive OR on the signs "sign (a) and sign (b)" of the two numerical values a and b, thereby evaluating the sign "sign (c)" of the numerical value c.

In this case, it is preferable that said absolute value operation unit 2-1 outputs numerical value 0, instead of the sum |a|+|b|, when ab=0.

Further, in the first arithmetic unit according to the present invention, as shown in FIG. 5, it is acceptable that said absolute value operation unit 2-1 comprises:

an adder unit 5-1 for receiving input signals representing absolute values |a| and |b| of the two numerical values a and b, and for outputting an addition signal representing a sum |a|+|b| of the two absolute values |a| and |b|;

a first subtracter unit 5-2 for receiving input signals representing absolute values |a| and |b| of the two numerical values a and b, and for outputting a first subtraction signal representing a difference |a|−|b| between the two absolute values |a| and |b|;

a difference-absolute value operation unit 5-3 for receiving the first subtraction signal, and for outputting an absolute value signal representing an absolute value ||a|−|b|| of the difference |a|−|b|; and a second subtracter unit 5-4 for receiving the addition signal and the absolute value signal, and for outputting a second subtraction signal representing a difference |a|+|b|−||a|−|b|| between the sum |a|+|b| and the absolute value ||a|−|b||, and said sign operation unit 2-2 outputs signals representing a plus and a minus in compliance with either one of a match and a mismatch of signs "sign (a) and sign (b)" of the two numeral values a and b and the other, respectively.

Further, in the first arithmetic unit according to the present invention, as shown in FIG. 6, it is preferable that said absolute value operation unit 2-1 receives signals representing absolute values |a| and |b| of the two numerical values a and b, and outputs a signal representing a smaller one of the absolute values |a| and |b|, and said sign operation unit 2-2 outputs signals representing a plus and a minus in compliance with either one of a match and a mismatch of signs "sign (a) and sign (b)" of the two numeral values a and b and the other, respectively.

Further, in the first arithmetic unit according to the present invention, as shown in FIG. 7, it is acceptable that said absolute value operation unit 2-1 comprises:

an adder unit 7-1 for receiving input signals representing absolute values |a| and |b| of the two numerical values a and b, and for outputting an absolute value addition signal representing a sum |a|+|b| of the two absolute values |a| and |b|;

a first function generation unit 7-2 for receiving the absolute value addition signal, and for applying to the absolute value addition signal an even function f (x) involving a monotone variation when a variable x is in a predetermined positive area, where f $(x) \neq r \cdot x^2 + s$; r and s are constant, thereby generating a first function signal representing f (|a|+|b|);

a first subtracter unit 7-3 for receiving input signals representing absolute values |a| and |b| of the two numerical values a and b, and for outputting an absolute value subtraction signal representing a difference |a|−|b| between the two absolute values |a| and |b|;

a second function generation unit 7-4 for receiving the absolute value subtraction signal, and for applying the even function f (x) to the absolute value subtraction signal, thereby generating a second function signal representing f (|a|−|b|); and a second subtracter unit for receiving the first function signal and the second function signal, and for outputting a signal representing a difference f (|a|+|b|)−f (|a|−|b|) between f (|a|+|b|) and f (|a|−|b|), and wherein said sign operation unit 2-2 outputs signals representing a plus and a minus in compliance with either one of a match and a mismatch of signs "sign (a) and sign (b)" of the two numeral values a and b and the other, respectively.

Further, in the first arithmetic unit according to the present invention, as shown in FIG. 8, it is acceptable that said absolute value operation unit 2-1 receives signals representing absolute values |a| and |b| of the two numerical values a and b, and applies a predetermined function g to the absolute values |a| and |b|, thereby outputting signals representing g (|a|+|b|)−g (|a|−|b|) when |a|≧|b|, and g (|a|+|b|)−g (|b|−|a|) when |a|≦|b|, respectively, and said sign operation unit 2-2 outputs signals representing a plus and a minus in compliance with either one of a match and a mismatch of signs "sign (a) and sign (b)" of the two numeral values a and b and the other, respectively.

FIG. 9 is a basic block diagram of the second arithmetic unit according to the present invention.

To attain the above mentioned object of the present invention, there is provided the second arithmetic unit comprising:

an analog arithmetic operator 9-1 for performing an addition or an addition-subtraction for a plurality of analog signals;

an analog inverter 9-2 for receiving analog signals representing two numerical values a and b, and for evaluating analog signals representing two numerical values −a and −b; and an analog switch 9-3 for switchingly transmitting at least part of four analog signals representing the numerical values a, b, −a and −b respectively to said analog arithmetic operator in accordance with signs "sign (a) and sign (b)" of the two numerical values a and b, wherein an analog operation is carried out in such a manner that a sum |a|+|b| of absolute values |a| and |b| of the two numerical values a and b is given as an absolute value |c| of an operation result c, and a plus and a minus are given as a sign "sign (c)" of the operation result c in compliance with either one of a match and a mismatch of polarities of the two numerical values a and b and the other, respectively.

In the second arithmetic unit according to the present invention, it is preferable that when ab=0, the operation result c=0 is substituted for the sum |a|+|b|.

FIG. 10 is a basic block diagram of the third arithmetic unit according to the present invention.

To attain the above mentioned object of the present invention, there is provided the third arithmetic unit comprising:

an adder unit 10-1 for receiving input signals representing two numerical values a and b, and for outputting an addition signal representing a sum a+b of the two values a and b;

a sum-absolute value operation unit 10-2 for receiving the addition signal, and for outputting a sum-absolute value signal representing an absolute value |a+b| of the sum a+b of the two values a and b;

a first subtracter unit 10-3 for receiving the input signals representing the two numerical values a and b and for outputting a subtraction signal representing a difference a−b between the two numerical values a and b;

a difference-absolute value operation unit 10-4 for receiving the subtraction signal, and for outputting a difference-absolute value signal representing an absolute value |a−b| of the difference a−b between the two numerical values a and b; and a second subtracter unit 10-5 for receiving the sum-absolute value signal and the difference-absolute value signal, and for outputting a signal representing a difference |a+b|−|a−b| between the absolute value |a+b| of the sum a+b of the two numerical values a and b and the absolute value |a−b| of the difference a−b.

FIG. 11 is a basic block diagram of the fourth arithmetic unit according to the present invention.

To attain the above mentioned object of the present invention, there is provided the fourth arithmetic unit wherein upon receipt of two numerical values a and b, the arithmetic unit performs an operation of |a+b|−|a−b| by outputting:

a signal representing the numerical value b, when $a \geq -b$ and $a \geq b$;

a signal representing the numerical value a, when $a \geq -b$ and $a \leq b$;

a signal representing the numerical value −a, when $a \leq -b$ and $a \geq b$; and a signal representing the numerical value −b, when $a \leq -b$ and $a \leq b$.

FIG. 12 is a basic block diagram of the fifth arithmetic unit according to the present invention.

To attain the above mentioned object of the present invention, there is provided the fifth arithmetic unit comprising:

an adder unit 12-1 for receiving input signals representing two numerical values a and b, and for outputting an addition signal representing a sum a+b of the two numerical values a and b;

a first function generation unit 12-2 for receiving the addition signal, and for applying to the addition signal an even function f (x) involving a monotone variation when a variable x is in a predetermined positive area, where f (x)≠r·x²+s; r and s are constant, thereby generating a first function signal representing f (a+b);

a first subtracter unit 12-3 for receiving input signals representing the two numerical values a and b, and for outputting a subtraction signal representing a difference a−b between the two numerical values a and b;

a second function generation unit 12-4 for receiving the subtraction signal, and for applying the even function f (x) to the subtraction signal, thereby generating a second function signal representing f (a−b); and a second subtracter unit 12-5 for receiving the first function signal and the second function signal, and for outputting a signal representing a difference f(a+b)−f(a−b) between f (a+b) and f (a−b).

Here, the "monotone variation" implies both the monotone increasing and the monotone decreasing. It is acceptable that the even function f (x) is in either of the monotone increasing and the monotone decreasing in the predetermined area. Further, "when a variable x is in a predetermined positive area" implies that there is no need that the even function f (x) is in the monotone variation throughout the predetermined positive area, and it is sufficient that the even function f (x) is in the monotone variation in an area involved in the operation.

FIG. 13 is a basic block diagram of the sixth arithmetic unit according to the present invention.

To attain the above mentioned object of the present invention, there is provided the sixth arithmetic unit wherein upon receipt of two numerical values a and b, the arithmetic unit applies a predetermined function g to the two numerical values a and b, and performs an operation of g (|a+b|)−g (|a−b|) by outputting:

a signal representing g (a+b) and g (a−b), when $a \geq -b$ and $a \geq b$;

a signal representing g (a+b) and g (b−a), when $a \geq -b$ and $a \leq b$;

a signal representing g (−a−b) and g (a−b), when $a \leq -b$ and $a \geq b$; and a signal representing g (−a−b) and g (b−a), when $a \leq -b$ and $a \leq b$.

FIG. 14 is a basic block diagram of the first correlation arithmetic unit according to the present invention.

Incidentally, the correlation arithmetic unit according to the present invention is of one in which either of the above-mentioned first to sixth arithmetic units is used as an arithmetic unit for performing an element arithmetic a*b for a correlation arithmetic. Thus, those arithmetic units will be referred to in the figures.

To attain the above mentioned object of the present invention, there is provided the first correlation arithmetic unit in which when two integers satisfying $1 \leq i \leq j$ are denoted by i and j; j variables are given in the form of $x_1, x_2 \ldots, x_j$; and two functions are expressed by a $(x_1, x_2 \ldots, x_j)$ and b $(x_1, x_2 \ldots, x_j)$, an operation set forth below is applied to the two functions a $(x_1, x_2 \ldots, x_j)$ and b $(x_1, x_2 \ldots, x_j)$, $$c(\Delta x_1, \Delta x_2, \ldots, \Delta x_i, x_{i+1}, \ldots, x_j) = \sum_{x1}\sum_{x2}\ldots\sum_{xi} a(x_1, x_2, \ldots, x_j) * b(x_1 + \Delta x_1, x_2 + \Delta x_2, \ldots, x_i + \Delta x_i, x_{i+1}, \ldots, x_j) \quad (1)$$

where an operation g*h between optional two numbers g and h stands for an operation in which a sum |g|+|h| of absolute values of g and h is given as an absolute value |g*h| of an operation result by the operation g*h, and a plus and a minus are assigned to signs of the operation result by the operation g*h in compliance with either one of a match and a mismatch of polarities of g and h and the other, respectively.

In the first correlation arithmetic unit according to the present invention, it is preferable that said correlation arithmetic unit comprises convolution arithmetic means for practicing, prior to an operation of equation (1), a convolution arithmetic associated with a differential filter function on each of two functions $X(x_1, x_2 \ldots, x_j)$ and $Y(x_1, x_2 \ldots, x_j)$ in which $x_1, x_2 \ldots, x_j$ are given in the form of variables, thereby evaluating the two functions functions $a(x_1, x_2 \ldots, x_j)$ and $b(x_1, x_2 \ldots, x_j)$ as an object of the operation of equation (1).

As the differential filter function, for example, when a difference as to a one-dimensional direction is detected, it is acceptable to use a one-dimensional differential filter function differentiating in the one-dimensional direction. Also, for example, when a difference as to a predetermined two-dimensional plane is detected, it is acceptable to use a two-dimensional differential filter function. In this manner, it is possible to use various types of differential filter function in accordance with the detection object.

It is acceptable that said correlation arithmetic unit comprises convolution arithmetic means for practicing, prior to an operation of equation (1), when a k-dimensional differential filter function ($1 \leq k \leq j$) is expressed by $d(x_1, x_2 \ldots, x_k)$, an operation set forth below on each of two functions $X(x_1, x_2 \ldots, x_j)$ and $Y(x_1, x_2 \ldots, x_j)$ in which $x_1, x_2 \ldots, x_j$ are given in the form of variables, $$a(x_1, x_2, \ldots, x_j) = \sum_{u1}\sum_{u2}\cdots\sum_{uk} X(x_1 - u_1, x_2 - u_2, \ldots, x_k - u_k, x_{k+1}, \ldots, x_j) * d(u_1, u_2, \ldots, u_k)$$

$$b(x_1, x_2, \ldots, x_j) = \sum_{u1}\sum_{u2}\cdots\sum_{uk} Y(x_1 - u_1, x_2 - u_2, \ldots, x_k - u_k, x_{k+1}, \ldots, x_j) * d(u_1, u_2, \ldots, u_k)$$

where an operation g*h between optional two numbers g and h stands for an operation in which a sum |g|+|h| of absolute values of g and h is given as an absolute value |g*h| of an operation result by the operation g*h, and a plus and a minus are assigned to signs of the operation result by the operation g*h in compliance with either one of a match and a mismatch of polarities of g and h and the other, respectively, thereby evaluating the two functions functions $a(x_1, x_2 \ldots, x_j)$ and $b(x_1, x_2 \ldots, x_j)$ as an object of the operation of equation (1).

In the first correlation arithmetic unit of the present invention, it is preferable that said operation g*h is assigned to g*h=0, when gh=0, regardless of |g*h|=|g|+|h|.

In the first correlation arithmetic unit of the present invention, as shown in FIG. 2, it is acceptable that said correlation arithmetic unit comprises, as an arithmetic unit for performing the operation a*b between the two functions, an absolute value operation unit 2-1 for evaluating a sum |a|+|b| of absolute values |a| and |b| of said two functions a and b, and a sign operation unit 2-2 for outputting signals representing a plus and a minus in compliance with either one of a match and a mismatch of polarities "sign (a) and sign (b)" of said two functions a and b and the other, respectively.

In this case, as shown in FIG. 3, it is acceptable that said absolute value operation unit 2-1 comprises a digital adder 3-1, said digital adder receiving two input digital signals representing absolute values |a| and |b| of the two numerical values a and b, and performing an arithmetic operation of a sum |a|+|b| of the absolute values |a| and |b|, thereby outputting a digital signal representing a absolute value |c| of an operation result c, and said sign operation unit 2-2 comprises a logic circuit 3-2, said logic circuit receiving digital signals representing signs "sign (a) and sign (b)" of said two functions a and b, and operating a logical exclusive OR on the signs "sign (a) and sign (b)" of said two functions a and b, thereby evaluating a sign "sign (c)" of the operation result c.

Also, as shown in FIG. 4, it is acceptable that said absolute value operation unit 2-1 comprises an analog adder 4-1, said analog adder receiving two input analog signals representing absolute values |a| and |b| of the two functions a and b, and performing an arithmetic operation of the sum |a|+|b| of the two absolute values, thereby outputting an analog signal representing an absolute value |c| of an operation result c, and said sign operation unit 2-2 comprises a logic circuit 4-2, said logic circuit receiving digital signals representing signs "sign (a) and sign (b)" of the two functions a and b, and operating a logical exclusive OR on the signs "sign (a) and sign (b)" of the two functions a and b, thereby evaluating a sign "sign (c)" of the operation result c.

Further, in the first correlation arithmetic unit of the present invention, as shown in FIG. 9, it is acceptable that said correlation arithmetic unit has an arithmetic unit 9-0, as an arithmetic unit for performing the operation a*b, said arithmetic unit 9-0 comprising:

an analog arithmetic operator 9-1 for performing an addition or an addition-subtraction for a plurality of analog signals;

an analog inverter 9-2 for receiving analog signals representing two functions a and b, and for evaluating analog signals representing two functions –a and –b; and an analog switch 9-3 for switchingly transmitting at least part of four analog signals representing the functions values a, b, –a and –b respectively to said analog arithmetic operator in accordance with signs "sign (a) and sign (b)" of the two functions a and b, and wherein an analog operation is carried out in such a manner that a sum |a|+|b| of absolute values |a| and |b| of the two functions a and b is given as an absolute value |c| of an operation result c, and a plus and a minus are given as a sign "sign (c)" of the operation result c in compliance with either one of a match and a mismatch of polarities of the two functions a and b and the other, respectively.

FIG. 14 is also a basic block diagram of the second correlation arithmetic unit according to the present invention.

To attain the above mentioned object of the present invention, there is provided the second correlation arithmetic unit in which when two integers satisfying $1 \leq i \leq j$ are denoted by i and j; j variables are given in the form of $x_1, x_2 \ldots, x_j$; and two functions are expressed by $a(x_1, x_2 \ldots, x_j)$ and $b(x_1, x_2 \ldots, x_j)$, an operation set forth below is applied to the two functions $a(x_1, x_2 \ldots, x_j)$ and $b(x_1, x_2 \ldots, x_j)$, $$c(\Delta x_1, \Delta x_2, \ldots, \Delta x_i, x_{i+1}, \ldots, x_j) = \sum_{x1}\sum_{x2}\cdots\sum_{xi} a(x_1, x_2, \ldots, x_j) * b(x_1 + \Delta x_1, x_2 + \Delta x_2, \ldots, x_i + \Delta x_i, x_{i+1}, \ldots, x_j) \quad (3)$$

where an operation g*h between optional two numbers g and h stands for an operation for |g+h|−|g−h|.

It is preferable that the second correlation arithmetic unit comprises convolution arithmetic means for practicing, prior to an operation of equation (3), a convolution arithmetic associated with a differential filter function on each of two functions X $(x_1, x_2 \ldots, x_j)$ and Y $(x_1, x_2 \ldots, x_j)$ in which $x_1, x_2 \ldots, x_j$ are given in the form of variables, thereby evaluating the two functions functions a $(x_1, x_2 \ldots, x_j)$ and b $(x_1, x_2 \ldots, x_j)$ as an object of the operation of equation (3).

Also it is acceptable that the second correlation arithmetic unit comprises convolution arithmetic means for practicing, prior to an operation of equation (3), when a k-dimensional differential filter function ($1 \leq k \leq j$) is expressed by d $(x_1, x_2 \ldots, x_k)$, an operation set forth below on each of two functions X $(x_1, x_2 \ldots, x_j)$ and Y $(x_1, x_2 \ldots, x_j)$ in which $x_1, x_2 \ldots, x_j$ are given in the form of variables, $$a(x_1, x_2, \ldots, x_j) = \sum_{u1}\sum_{u2}\cdots\sum_{uk} X(x_1 - u_1, x_2 - u_2, \ldots, x_k - u_k, x_{k+1}, \ldots, x_j) * d(u_1, u_2, \ldots, u_k)$$

$$b(x_1, x_2, \ldots, x_j) = \sum_{u1}\sum_{u2}\cdots\sum_{uk} Y(x_1 - u_1, x_2 - u_2, \ldots, x_k - u_k, x_{k+1}, \ldots, x_j) * d(u_1, u_2, \ldots, u_k)$$

where an operation g*h between optional two numbers g and h stands for an operation for |g+h|−|g−h|, thereby evaluating the two functions functions a $(x_1, x_2 \ldots, x_j)$ and b $(x_1, x_2 \ldots, x_j)$ as an object of the operation of equation (3).

In the second correlation arithmetic unit of the present invention, as shown in FIG. 5, the second correlation arithmetic unit comprises an absolute value operation unit 2-1 and a sign operation unit 2-2, as an arithmetic unit for performing the operation a*b between the two functions, wherein said absolute value operation unit 2-1 comprises:

an adder unit 5-1 for receiving input signals representing absolute values |a| and |b| of the two functions a and b, and for outputting an addition signal representing a sum |a|+|b| of the two absolute values |a| and |b|;

a first subtracter unit 5-2 for receiving input signals representing absolute values |a| and |b| of the two functions a and b, and for outputting a first subtraction signal representing a difference |a|−|b| between the two absolute values |a| and |b|;

a difference-absolute value operation unit 5-3 for receiving the first subtraction signal, and for outputting an absolute value signal representing an absolute value ||a|−|b|| of the difference |a|−|b|; and a second subtracter unit 5-4 for receiving the addition signal and the absolute value signal, and for outputting a second subtraction signal representing a difference |a|+|b|−||a|−|b|| between the sum |a|+|b| and the absolute value ||a|−|b||, and wherein said sign operation unit 2-2 outputs signals representing a plus and a minus in compliance with either one of a match and a mismatch of polarities "sign (a) and sign (b)" of the two functions a and b and the other, respectively.

Further, the second correlation arithmetic unit of the present invention comprises, as an arithmetic unit for performing the operation a*b between the two functions, as shown in FIG. 6, an absolute value operation unit 6-1 for receiving signals representing absolute values |a| and |b| of the two functions a and b, and outputting a signal representing a smaller one of the absolute values |a| and |b|; and a sign operation unit 6-2 for outputting signals representing a plus and a minus in compliance with either one of a match and a mismatch of signs "sign (a) and sign (b)" of the two functions a and b and the other, respectively.

Further, the second correlation arithmetic unit of the present invention comprises, as an arithmetic unit for performing the operation a*b between the two functions, as shown in FIG. 10, an adder unit 10-1 for receiving input signals representing two functions a and b, and for outputting an addition signal representing a sum a+b of the two functions a and b;

a sum-absolute value operation unit 10-2 for receiving the addition signal, and for outputting a sum-absolute value signal representing an absolute value |a+b| of the sum a+b of the two functions a and b;

a first subtracter unit 10-3 for receiving the input signals representing the two functions a and b and for outputting a subtraction signal representing a difference a−b between the two functions a and b;

a difference-absolute value operation unit 10-4 for receiving the subtraction signal, and for outputting a difference-absolute value signal representing an absolute value |a−b| of the difference a−b between the two functions a and b; and a second subtracter unit 10-5 for receiving the sum-absolute value signal and the difference-absolute value signal, and for outputting a signal representing a difference |a+b|−|a−b| between the absolute value |a+b| of the sum a+b of the two functions a and b and the absolute value |a−b| of the difference a−b.

Further, the second correlation arithmetic unit of the present invention comprises, as an arithmetic unit for performing the operation a*b between the two functions, as shown in FIG. 11, an arithmetic unit, in which upon receipt of signals representing the two functions a and b, said arithmetic unit performs an operation of |a+b|−|a−b| by outputting:

a signal representing the functions b, when a≧−b and a≧b;

a signal representing the functions a, when a≧−b and a≦b;

a signal representing the functions −a, when a≦−b and a≧b; and a signal representing the functions −b, when a≦−b and a≦b.

FIG. 14 is also a basic block diagram of the third correlation arithmetic unit according to the present invention.

To attain the above mentioned object of the present invention, there is provided the third correlation arithmetic unit in which when two integers satisfying $1 \leq i \leq j$ are denoted by i and j; j variables are given in the form of $x_1, x_2 \ldots, x_j$; and two functions are expressed by a $(x_1, x_2 \ldots, x_j)$ and b $(x_1, x_2 \ldots, x_j)$, an operation set forth below is applied to the two functions a $(x_1, x_2 \ldots, x_j)$ and b $(x_1, x_2 \ldots, x_j)$, $$c(\Delta x_1, \Delta x_2, \ldots, \Delta x_i, x_{i+1}, \ldots, x_j) = \sum_{x1}\sum_{x2}\cdots\sum_{xi} a(x_1, x_2, \ldots, x_j) * b(x_1 + \Delta x_1, x_2 + \Delta x_2, \ldots, x_i + \Delta x_i, x_{i+1}, \ldots, x_j)$$

where an operation g*h between optional two numbers g and h stands for an operation of f (g+h)−f (g−h) in which an even function involving a monotone variation when a variable x is in a predetermined positive area, where f $(x) \neq r \cdot x^2 + s$; r and s are constant, is denoted by f (x), wherein said correlation arithmetic unit has an arithmetic unit 12-0, as an arithmetic unit for performing the operation a*b between the two functions, as shown in FIG. 12, said arithmetic unit 12-0 comprising:

an adder unit 12-1 for receiving input signals representing two functions a and b, and for outputting an addition signal representing a sum a+b of the two functions a and b;

a first function generation unit 12-2 for receiving the addition signal, and for applying to the addition signal an even function f (x) involving a monotone variation when a variable x is in a predetermined positive area, where f (x)≠r·x²+s; r and s are constant, thereby generating a first function signal representing f (a+b);

a first subtracter unit 12-3 for receiving input signals representing the two functions a and b, and for outputting a subtraction signal representing a difference a−b between the two functions a and b;

a second function generation unit 12-4 for receiving the subtraction signal, and for applying the even function f (x) to the subtraction signal, thereby generating a second function signal representing f (a−b); and a second subtracter unit 12-5 for receiving the first function signal and the second function signal, and for outputting a signal representing a difference f(a+b)−f(a−b) between f (a+b) and f (a−b).

FIG. 14 is also a basic block diagram of the fourth correlation arithmetic unit according to the present invention.

To attain the above mentioned object of the present invention, there is provided the fourth correlation arithmetic unit in which when two integers satisfying 1≦i≦j are denoted by i and j; j variables are given in the form of $x_1$, $x_2 \ldots, x_j$; and two functions are expressed by a ($x_1$, $x_2 \ldots, x_j$) and b ($x_1$, $x_2 \ldots, x_j$), an operation set forth below is applied to the two functions a ($x_1$, $x_2 \ldots, x_j$) and b ($x_1$, $x_2 \ldots, x_j$), $$c(\Delta x_1, \Delta x_2, \ldots, \Delta x_i, x_{i+1}, \ldots, x_j) = \qquad (3)$$
$$\sum_{x1}\sum_{x2}\cdots\sum_{xi} a(x_1, x_2, \ldots, x_j) * b(x_1 + \Delta x_1,$$
$$x_2 + \Delta x_2, \ldots, x_i + \Delta x_i, x_{i+1}, \ldots, x_j)$$

where an operation g*h between optional two numbers g and h stands for an operation of f (g+h)−f (g−h) in which an even function involving a monotone variation when a variable x is in a predetermined positive area, where f (x)≠r·x²+s; r and s are constant, is denoted by f (x), wherein said correlation arithmetic unit has an arithmetic unit 13-0, as an arithmetic unit for performing the operation a*b between the two functions, as shown in FIG. 13, and upon receipt of two functions a and b, said arithmetic unit 13-0 applies a predetermined function g to the two functions a and b, and performs an operation of g (|a+b|)−g (|a−b|) by outputting:

a signal representing g (a+b) and g (a−b), when a≧−b and a≧b;

a signal representing g (a+b) and g (b−a), when a≧−b and a≦b;

a signal representing g (−a−b) and g (a−b), when a≦−b and a≧b; and a signal representing g (−a−b) and g (b−a), when a≦−b and a≦b.

FIG. 14 is also a basic block diagram of the fifth correlation arithmetic unit according to the present invention.

To attain the above mentioned object of the present invention, there is provided the fifth correlation arithmetic unit in which when two integers satisfying 1≦i≦j are denoted by i and j; j variables are given in the form of $x_1$, $x_2 \ldots, x_j$; and two functions are expressed by a ($x_1$, $x_2 \ldots, x_j$) and b ($x_1$, $x_2 \ldots, x_j$), an operation set forth below is applied to the two functions a ($x_1$, $x_2 \ldots, x_j$) and b ($x_1$, $x_2 \ldots, x_j$), $$c(\Delta x_1, \Delta x_2, \ldots, \Delta x_i, x_{i+1}, \ldots, x_j) = \qquad (3)$$
$$\sum_{x1}\sum_{x2}\cdots\sum_{xi} a(x_1, x_2, \ldots, x_j) * b(x_1 + \Delta x_1,$$
$$x_2 + \Delta x_2, \ldots, x_i + \Delta x_i, x_{i+1}, \ldots, x_j)$$

where an operation g*h between optional two numbers g and h stands for an operation of f (g+h)−f (g−h) in which an even function involving a monotone variation when a variable x is in a predetermined positive area, where f (x)≠r·x²+s; r and s are constant, is denoted by f (x), wherein said correlation arithmetic unit comprises, as shown in FIG. 7, an absolute value operation unit 7-01 and a sign operation unit 7-02, and said absolute value operation unit 7-01 comprises:

an adder unit 7-1 for receiving input signals representing absolute values |a| and |b| of the two numerical values a and b, and for outputting an absolute value addition signal representing a sum |a|+|b| of the two absolute values |a| and |b|;

a first function generation unit 7-2 for receiving the absolute value addition signal, and for applying to the absolute value addition signal an even function f (x) involving a monotone variation when a variable x is in a predetermined positive area, where f (x)≠r·x²+s; r and s are constant, thereby generating a first function signal representing f (|a|+|b|);

a first subtracter unit 7-3 for receiving input signals representing absolute values |a| and |b| of the two numerical values a and b, and for outputting an absolute value subtraction signal representing a difference |a|−|b| between the two absolute values |a| and |b|;

a second function generation unit 7-4 for receiving the absolute value subtraction signal, and for applying the even function f (x) to the absolute value subtraction signal, thereby generating a second function signal representing f (|a|−|b|); and a second subtracter unit 7-5 for receiving the first function signal and the second function signal, and for outputting a signal representing a difference f (|a|+|b|)−f (|a|−|b|) between f (|a|+|b|) and f (|a|−|b|), and wherein said sign operation unit 7-02 outputs signals representing a plus and a minus in compliance with either one of a match and a mismatch of polarities "sign (a) and sign (b)" of the two functions a and b and the other, respectively.

FIG. 14 is also a basic block diagram of the sixth correlation arithmetic unit according to the present invention.

To attain the above mentioned object of the present invention, there is provided the sixth correlation arithmetic unit in which when two integers satisfying 1≦i≦j are denoted by i and j; j variables are given in the form of $x_1$, $x_2 \ldots, x_j$; and two functions are expressed by a ($x_1$, $x_2 \ldots, x_j$) and b ($x_1$, $x_2 \ldots, x_j$), an operation set forth below is applied to the two functions a ($x_1$, $x_2 \ldots, x_j$) and b ($x_1$, $x_2 \ldots, x_j$), $$c(\Delta x_1, \Delta x_2, \ldots, \Delta x_i, x_{i+1}, \ldots, x_j) = \quad (3)$$

$$\sum_{x1}\sum_{x2}\cdots\sum_{xi} a(x_1, x_2, \ldots, x_j) * b(x_1 + \Delta x_1,$$

$$x_2 + \Delta x_2, \ldots, x_i + \Delta x_i, x_{i+1}, \ldots, x_j)$$

where an operation g*h between optional two numbers g and h stands for an operation of f (g+h)–f (g–h) in which an even function involving a monotone variation when a variable x is in a predetermined positive area, where f (x)≠r·x²+s; r and s are constant, is denoted by f (x), wherein said correlation arithmetic unit comprises, as shown in FIG. 8, an absolute value operation unit 8-1 and a sign operation unit 8-2, wherein said absolute value operation unit receives signals representing absolute values |a| and |b| of the two functions a and b, and applies a function g defined by g(|x|)=F (x) to the absolute values |a| and |b|, thereby outputting signals representing g (|a|+|b|)–g (|a| |b|) when |a|≧|b|, and g (|a|+|b|)–g (|b|–|a|) when |a|≦|b|, respectively, and wherein said sign operation unit outputs signals representing a plus and a minus in compliance with either one of a match and a mismatch of signs "sign (a) and sign (b)" of the two functions a and b and the other, respectively.

FIG. 15 is a basic block diagram of the seventh correlation arithmetic unit according to the present invention.

To attain the above mentioned object of the present invention, there is provided the seventh correlation arithmetic unit comprising:

Hough transform means 15-1 for applying a Hough transform to two functions A (x, y) and B (x, y), x and y being variables, to derive two functions a (ρ, θ) and b (ρ, θ),ρ and θ being variables, where ρ is a variable representing a minimum distance between a straight line and an origin on a two-dimensional plane consisting of an x-axis and a y-axis, and θ is a variable representing a slant;

correlation arithmetic means 15-2 for applying to the two functions a (ρ, θ) and b (ρ, θ) an operation set forth below $$c(\Delta, \theta) = \sum_{\rho} a(\rho, \theta) * b(\rho + \Delta, \theta) \quad (2)$$

where an operation g*h between optional two numbers g and h stands for an operation in which a sum |g|+|h| of absolute values of g and h is given as an absolute value |g*h| of an operation result by the operation g*h, and a plus and a minus are assigned to signs of the operation result by the operation g*h in compliance with either one of a match and a mismatch of polarities of g and h and the other, respectively; and inverse Hough transform means 15-3 for applying an inverse Hough transform to an operation result c(Δ, θ) in said correlation arithmetic means to derive a function D(Δx, Δy), Δx, Δy being variables, where Δx is a variable representing a positional difference in an x-axis direction, and Δy is a variable representing a positional difference in a y-axis direction.

In the seventh correlation arithmetic unit according to the present invention, it is preferable that said correlation arithmetic unit comprises convolution arithmetic means 15-4 for practicing, prior to a Hough transform, a convolution arithmetic associated with a differential filter function on each of two functions X (x, y) and Y (x, y) in which x and y are given in the form of variables, thereby evaluating the two functions A (x, y) and B (x, y) as object of the Hough transform. It is also preferable that said correlation arithmetic unit comprises convolution arithmetic means 15-5, instead for the convolution arithmetic means 15-4, for practicing a convolution arithmetic associated with a one-dimensional differential filter function differentiating in a p-axis direction on each of two functions a (ρ, θ) and b (ρ, θ) evaluated through the Hough transform, and transferring the two functions after the convolution arithmetic process to said correlation arithmetic means in the form of the functions a (ρ, θ) and b (ρ, θ) as an object of an operation of equation (2).

In the seventh correlation arithmetic unit according to the present invention, the convolution arithmetic means 15-4 may replaced by convolution arithmetic means for practicing, prior to the Hough transform, when a two-dimensional differential filter function is expressed by d (x, y), an operation set forth below on each of two functions X (x, y) and Y (x, y) in which x and y are given in the form of variables, $$A(x, y) = \sum_u \sum_v X(x - u, y - v) * d(u, v)$$

$$B(x, y) = \sum_u \sum_v Y(x - u, y - v) * d(u, v)$$

where an operation g*h between optional two numbers g and h stands for an operation in which a sum |g|+|h| of absolute values of g and h is given as an absolute value |g*h| of an operation result by the operation g*h, and a plus and a minus are assigned to signs of the operation result by the operation g*h in compliance with either one of a match and a mismatch of polarities of g and h and the other, respectively, thereby evaluating the two functions A (x, y) and B (x, y) as an object of the Hough transform.

In a similar fashion, convolution arithmetic means 15-5 may replaced by convolution arithmetic means for practicing, when a one-dimensional differential filter function differentiating in a ρ-axis direction is expressed by d (ρ), an operation set forth below on each of the two functions a (ρ, θ) and b (ρ, θ) evaluated through the Hough transform, $$a'(\rho, \theta) = \sum_u a(\rho - u, \theta) * d(u)$$

$$b'(\rho, \theta) = \sum_u b(\rho - u, \theta) * d(u)$$

where an operation g*h between optional two numbers g and h stands for an operation in which a sum |g|+|h| of absolute values of g and h is given as an absolute value |g*h| of an operation result by the operation g*h, and a plus and a minus are assigned to signs of the operation result by the operation g*h in compliance with either one of a match and a mismatch of polarities of g and h and the other, respectively, and transferring two functions a' (ρ, θ) and b' (ρ, θ) after the above operation to said correlation arithmetic means in the form of the functions a (ρ, θ) and b (ρ, θ) as an object of an operation of equation (2).

In the seventh correlation arithmetic unit according to the present invention, it is preferable that said operation g*h is assigned to g*h=0, when gh=0, regardless of |g*h|=|g|+|h|.

The seventh correlation arithmetic unit according to the present invention will be explained, hereinafter, referring to the figures which are referred to in the explanation of the arithmetic unit.

In the seventh correlation arithmetic unit according to the present invention, it is preferable that said correlation arithmetic unit comprises, as an arithmetic unit performing the operation a*b between the two functions a and b, an absolute value operation unit 2-1 for evaluating a sum |a|+|b| of absolute values |a| and |b| of said two functions a and b, and a sign operation unit 2-2 for outputting signals representing a plus and a minus in compliance with either one of a match and a mismatch of polarities "sign (a) and sign (b)" of said two functions a and b and the other, respectively.

In this case, it is acceptable that said absolute value operation unit 2-1 comprises, as shown in FIG. 3, a digital adder 3-1, said digital adder receiving two input digital signals representing absolute values |a| and |b| of the two numerical values a and b, and performing an arithmetic operation of a sum |a|+|b| of the absolute values |a| and |b|, thereby outputting a digital signal representing an absolute value |c| of an operation result c, and said sign operation unit 2-2 comprises a logic circuit 3-2, said logic circuit receiving digital signals representing signs "sign (a) and sign (b)" of said two functions a and b, and operating a logical exclusive OR on the signs "sign (a) and sign (b)" of said two functions a and b, thereby evaluating a sign "sign (c)" of the operation result c. It is also acceptable that said absolute value operation unit 2-1 comprises, as shown in FIG. 4, an analog adder 4-1, said analog adder receiving two input analog signals representing absolute values |a| and |b| of the two functions a and b, and performing an arithmetic operation of the sum |a|+|b| of the two absolute values, thereby outputting an analog signal representing an absolute value |c| of an operation result c, and said sign operation unit 2-2 comprises a logic circuit 4-2, said logic circuit receiving digital signals representing signs "sign (a) and sign (b)" of the two functions a and b, and operating a logical exclusive OR on the signs "sign (a) and sign (b)" of the two functions a and b, thereby evaluating a sign "sign (c)" of the operation result c.

In the seventh correlation arithmetic unit according to the present invention, it is acceptable that said correlation arithmetic means 15-2 has an arithmetic unit 9-0, as shown in FIG. 9, said arithmetic unit comprising:

an analog arithmetic operator 9-1 for performing an addition or an addition-subtraction for a plurality of analog signals;

an analog inverter 9-2 for receiving analog signals representing two functions a and b, and for evaluating analog signals representing two functions −a and −b; and an analog switch 9-3 for switchingly transmitting at least part of four analog signals representing the functions values a, b, −a and −b respectively to said analog arithmetic operator in accordance with signs "sign (a) and sign (b)" of the two functions a and b, and wherein an analog operation is carried out in such a manner that a sum |a|+|b| of absolute values |a| and |b| of the two functions a and b is given as an absolute value |c| of an operation result c, and a plus and a minus are given as a sign "sign (c)" of the operation result c in compliance with either one of a match and a mismatch of polarities of the two functions a and b and the other, respectively.

FIG. 15 is a basic block diagram of the eighth correlation arithmetic unit according to the present invention.

To attain the above mentioned object of the present invention, there is provided the eighth correlation arithmetic unit comprising:

Hough transform means 15-1 for applying a Hough transform to two functions A (x, y) and B (x, y), x and y being variables, to derive two functions a (ρ, θ) and b (ρ, θ), ρ and θ being variables, where ρ is a variable representing a minimum distance between a straight line and an origin on a two-dimensional plane consisting of an x-axis and a y-axis, and θ is a variable representing a slant;

correlation arithmetic means 15-2 for applying to the two functions a (ρ, θ) and b (ρ, θ) an operation set forth below $$c(\Delta, \theta) = \sum_\rho a(\rho, \theta) * b(\rho + \Delta, \theta) \qquad (4)$$

where an operation g*h between optional two numbers g and h stands for an operation for |g+h|−|g−h|; and inverse Hough transform means 15-3 for applying an inverse Hough transform to an operation result c(Δ, θ) in said correlation arithmetic means to derive a function D(Δx, Δy), Δx, Δy being variables, where Δx is a variable representing a positional difference in an x-axis direction, and Δy is a variable representing a positional difference in a y-axis direction.

In the eighth correlation arithmetic unit according to the present invention, it is preferable said correlation arithmetic unit comprises convolution arithmetic means 15-4 for practicing, prior to a Hough transform, a convolution arithmetic associated with a differential filter function on each of two functions X (x, y) and Y (x, y) in which x and y are given in the form of variables, thereby evaluating the two functions A (x, y) and B (x, y) as an object of the Hough transform. It is also preferable that said correlation arithmetic unit comprises convolution arithmetic means 15-5, instead of convolution arithmetic means 15-4, for practicing a convolution arithmetic associated with a one-dimensional differential filter function differentiating in a ρ-axis direction on each of two functions a (ρ, θ) and b (ρ, θ) evaluated through the Hough transform, and transferring the two functions after the convolution arithmetic process to said correlation arithmetic means 15-2 in the form of the functions a (ρ, θ) and b (ρ, θ) as an object of an operation of equation (2).

In the eighth correlation arithmetic unit according to the present invention, it is acceptable that said convolution arithmetic means 15-4 is replaced by convolution arithmetic means for practicing, prior to the Hough transform, when a two-dimensional differential filter function is expressed by d (x, y), an operation set forth below on each of two functions X (x, y) and Y (x, y) in which x and y are given in the form of variables, $$A(x, y) = \sum_u \sum_v X(x-u, y-v) * d(u, v)$$

$$B(x, y) = \sum_u \sum_v Y(x-u, y-v) * d(u, v)$$

where an operation g*h between optional two numbers g and h stands for an operation for |g+h|−|g−h|, thereby evaluating the two functions A (x, y) and B (x, y) as an object of the Hough transform. It is also acceptable that said convolution arithmetic means 15-5 is replaced by convolution arithmetic means for practicing, when a one-dimensional differential filter function differentiating in a ρ-axis direction is expressed by d (ρ), an operation set forth below on each of the two functions a (ρ, θ) and b (ρ, θ) evaluated through the Hough transform, $$a'(\rho, \theta) = \sum_u a(\rho - u, \theta) * d(u)$$

$$b'(\rho, \theta) = \sum_u b(\rho - u, \theta) * d(u)$$

where an operation g*h between optional two numbers g and h stands for an operation for |g+h|−|g−h|, and transferring two functions a' (ρ, θ) and b' (ρ, θ) after the above operation to said correlation arithmetic means in the form of the functions a (ρ, θ) and b (ρ, θ) as an object of an operation of equation (2).

In the eighth correlation arithmetic unit according to the present invention, it is acceptable that said correlation arithmetic means 15-2 comprises, as shown in FIG. 5, an absolute value operation unit 5-01 and a sign operation unit 5-02, said absolute value operation unit comprising:

an adder unit 5-1 for receiving input signals representing absolute values |a| and |b| of the two functions a and b, and for outputting an addition signal representing a sum |a|+|b| of the two absolute values |a| and |b|;

a first subtracter unit 5-2 for receiving input signals representing absolute values |a| and |b| of the two functions a and b, and for outputting a first subtraction signal representing a difference |a|−|b| between the two absolute values |a| and |b|;

a difference-absolute value operation unit 5-3 for receiving the first subtraction signal, and for outputting an absolute value signal representing an absolute value ||a|−|b|| of the difference |a|−|b|; and a second subtracter unit 5-4 for receiving the addition signal and the absolute value signal, and for outputting a second subtraction signal representing a difference |a|+|b|−||a|−|b|| between the sum |a|+|b| and the absolute value ||a|−|b||, and wherein said sign operation unit 5-02 outputs signals representing a plus and a minus in compliance with either one of a match and a mismatch of signs "sign (a) and sign (b)" of the two functions a and b and the other, respectively.

It is also acceptable that said correlation arithmetic means 15-2 comprises, as shown in FIG. 6, an absolute value operation unit 6-1 for receiving signals representing absolute values |a| and |b| of the two functions a and b, and outputting a signal representing a smaller one of the absolute values |a| and |b|; and a sign operation unit 6-2 (or 2-2) for outputting signals representing a plus and a minus in compliance with either one of a match and a mismatch of signs "sign (a) and sign (b)" of the two functions a and b and the other, respectively.

It is also acceptable that said correlation arithmetic means 15-2 comprises, as shown in FIG. 10, an adder unit 10-1 for receiving input signals representing two functions a and b, and for outputting an addition signal representing a sum a+b of the two functions a and b;

a sum-absolute value operation unit 10-2 for receiving the addition signal, and for outputting a sum-absolute value signal representing an absolute value |a+b| of the sum a+b of the two functions a and b;

a first subtracter unit 10-3 for receiving the input signals representing the two functions a and b and for outputting a subtraction signal representing a difference a−b between the two functions a and b;

a difference-absolute value operation unit 10-4 for receiving the subtraction signal, and for outputting a difference-absolute value signal representing an absolute value |a−b| of the difference a−b between the two functions a and b; and a second subtracter unit 10-5 for receiving the sum-absolute value signal and the difference-absolute value signal, and for outputting a signal representing a difference |a+b|−|a−b| between the absolute value |a+b| of the sum a+b of the two functions a and b and the absolute value |a−b| of the difference a−b.

In the eighth correlation arithmetic unit according to the present invention, it is acceptable that said correlation arithmetic means 15-2 comprises, as shown in FIG. 11, an arithmetic unit 11-0, in which upon receipt of signals representing the two functions a and b, said arithmetic unit performs an operation of |a+b|−|a−b| by outputting:

a signal representing the functions b, when a≧−b and a≧b;

a signal representing the functions a, when a≧−b and a≦b;

a signal representing the functions −a, when a≦−b and a≧b; and a signal representing the functions −b, when a≦−b and a≦b.

FIG. 16 is a basic block diagram of the first dynamic image compression apparatus according to the present invention.

To attain the above mentioned object of the present invention, there is provided the first dynamic image compression apparatus in which image signals representing a plurality of image frames sequentially generated are inputted, a movement vector of the image frame-to-image frame is evaluated in accordance with the input image signals, and the movement vector can be transmitted instead of transmission of the image signals, said dynamic image compression apparatus comprising:

correlation arithmetic means 16-1 for applying to two functions a (x, y) and b (x, y), which represent two image frames, respectively, an operation set forth below $$c(\Delta x, \Delta y) = \sum_x \sum_y a(x, y) * b(x + \Delta x, y + \Delta y) \tag{1a}$$

where an operation g*h between optional two numbers g and h stands for an operation in which a sum |g|+|h| of absolute values of g and h is given as an absolute value |g*h| of an operation result by the operation g*h, and a plus and a minus are assigned to signs of the operation result by the operation g*h in compliance with either one of a match and a mismatch of polarities of g and h and the other, respectively; and movement vector detection means 16-2 for detecting a peak point of an operation result c(Δ, θ) in said correlation arithmetic means to derive the movement vector between the two image frames.

In the first dynamic image compression apparatus, it is preferable that said dynamic image compression apparatus comprises convolution arithmetic means 16-3 for practicing, prior to an operation of equation (1a), a convolution arithmetic associated with a differential filter function on each of two functions X (x, y) and Y (x, y) in which x and y are given in the form of variables, thereby evaluating the two functions a (x, y) and b (x, y) as an object of the operation of equation (1a).

It is acceptable that the convolution arithmetic means 16-3 is replaced by convolution arithmetic means for practicing, prior to an operation of equation (1a), when a two-dimensional differential filter function is expressed by d (x, y), an operation set forth below on each of two functions X (x, y) and Y (x, y) in which x and y are given in the form of variables, $$a(x, y) = \sum_u \sum_v X(x - u, y - v) * d(u, v)$$

$$b(x, y) = \sum_u \sum_v Y(x - u, y - v) * d(u, v)$$

where an operation g*h between optional two numbers g and h stands for an operation in which a sum |g|+|h| of absolute values of g and h is given as an absolute value |g*h| of an operation result by the operation g*h, and a plus and a minus are assigned to signs of the operation result by the operation g*h in compliance with either one of a match and a mismatch of polarities of g and h and the other, respectively, thereby evaluating the two functions a (x, y) and b (x, y) as an object of the operation of equation (1a).

In the dynamic image compression apparatus, it is preferable that said operation g*h is assigned to g*h=0, when gh=0, regardless of |g*h|=|g|+|h|.

FIG. 17 is a basic block diagram of the second dynamic image compression apparatus according to the present invention.

To attain the above mentioned object of the present invention, there is provided the second dynamic image compression apparatus in which image signals representing a plurality of image frames sequentially generated are inputted, a movement vector of the image frame-to-image frame is evaluated in accordance with the input image signals, and the movement vector can be transmitted instead of transmission of the image signals, said dynamic image compression apparatus comprising:

Hough transform means 17-1 for applying a Hough transform to two functions A (x, y) and B (x, y), which represent two image frames, respectively, to derive two functions a ($\rho$, $\theta$) and b ($\rho$, $\theta$), $\rho$ and $\theta$ being variables, where $\rho$ is a variable representing a minimum distance between a straight line and an origin on a two-dimensional plane consisting of an x-axis and a y-axis, and $\theta$ is a variable representing a slant;

correlation arithmetic means 17-2 for applying to the two functions a ($\rho$, $\theta$) and b ($\rho$, $\theta$) an operation set forth below $$c(\Delta, \theta) = \sum_{\rho} a(\rho, \theta) * b(\rho + \Delta, \theta) \qquad (2)$$

where an operation g*h between optional two numbers g and h stands for an operation in which a sum |g|+|h| of absolute values of g and h is given as an absolute value |g*h| of an operation result by the operation g*h, and a plus and a minus are assigned to signs of the operation result by the operation g*h in compliance with either one of a match and a mismatch of polarities of g and h and the other, respectively;

inverse Hough transform means 17-3 for applying an inverse Hough transform to an operation result c($\Delta$, $\theta$) in said correlation arithmetic means to derive a function D($\Delta$x, $\Delta$y), $\Delta$x, $\Delta$y being variables, where $\Delta$x is a variable representing a positional difference in an x-axis direction, and $\Delta$y is a variable representing a positional difference in a y-axis direction; and movement vector detection means 17-4 for detecting a peak point of the function D($\Delta$x, $\Delta$y) to derive the movement vector between the two image frames.

In the second dynamic image compression apparatus, it is preferable that said dynamic image compression apparatus comprises convolution arithmetic means 17-5 for practicing, prior to a Hough transform, a convolution arithmetic associated with a differential filter function on each of two functions X (x, y) and Y (x, y) in which x and y are given in the form of variables, thereby evaluating the two functions A (x, y) and B (x, y) as an object of the Hough transform.

In the second dynamic image compression apparatus, it is also preferable that said dynamic image compression apparatus comprises convolution arithmetic means 17-6 for practicing a convolution arithmetic associated with a one-dimensional differential filter function differentiating in a $\rho$-axis direction on each of two functions a ($\rho$, $\theta$) and b ($\rho$, $\theta$) evaluated through the Hough transform, and transferring the two functions after the convolution arithmetic process to said correlation arithmetic means in the form of the functions a ($\rho$, $\theta$) and b ($\rho$, $\theta$) as an object of an operation of equation (2).

It is acceptable that convolution arithmetic means 17-5 is replaced by convolution arithmetic means for practicing, prior to the Hough transform, when a two-dimensional differential filter function is expressed by d (x, y), an operation set forth below on each of two functions X (x, y) and Y (x, y) in which x and y are given in the form of variables, $$A(x, y) = \sum_u \sum_v X(x - u, y - v) * d(u, v)$$

$$B(x, y) = \sum_u \sum_v Y(x - u, y - v) * d(u, v)$$

where an operation g*h between optional two numbers g and h stands for an operation in which a sum |g|+|h| of absolute values of g and h is given as an absolute value |g*h| of an operation result by the operation g*h, and a plus and a minus are assigned to signs of the operation result by the operation g*h in compliance with either one of a match and a mismatch of polarities of g and h and the other, respectively, thereby evaluating the two functions A (x, y) and B (x, y) as an object of the Hough transform.

It is acceptable that convolution arithmetic means 17-6 is replaced by convolution arithmetic means for practicing, when a one-dimensional differential filter function differentiating in a $\rho$-axis direction is expressed by d ($\rho$), an operation set forth below on each of the two functions a ($\rho$, $\theta$) and b ($\rho$, $\theta$) evaluated through the Hough transform, $$a'(\rho, \theta) = \sum_u a(\rho - u, \theta) * d(u)$$

$$b'(\rho, \theta) = \sum_u b(\rho - u, \theta) * d(u)$$

where an operation g*h between optional two numbers g and h stands for an operation in which a sum |g|+|h| of absolute values of g and h is given as an absolute value |g*h| of an operation result by the operation g*h, and a plus and a minus are assigned to signs of the operation result by the operation g*h in compliance with either one of a match and a mismatch of polarities of g and h and the other, respectively, and transferring two functions a' ($\rho$, $\theta$) and b' ($\rho$, $\theta$) after the above operation to said correlation arithmetic means in the form of the functions a ($\rho$, $\theta$) and b ($\rho$, $\theta$) as an object of an operation of equation (2).

In the second dynamic image compression apparatus, it is preferable that said operation g*h is assigned to g*h=0, when gh=0, regardless of |g*h|=|g|+|h|.

FIG. 16 is also a basic block diagram of the third dynamic image compression apparatus according to the present invention.

To attain the above mentioned object of the present invention, there is provided the third dynamic image compression apparatus in which image signals representing a plurality of image frames sequentially generated are inputted, a movement vector of the image frame-to-image frame is evaluated in accordance with the input image signals, and the movement vector can be transmitted instead of transmission of the image signals, said dynamic image compression apparatus comprising:

correlation arithmetic means 16-1 for applying to two functions a (x, y) and b (x, y), which represent two image frames, respectively, an operation set forth below $$c(\Delta x, \Delta y) = \sum_{x}\sum_{y} a(x, y) * b(x + \Delta x, y + \Delta y) \quad (3a)$$

where an operation g*h between optional two numbers $\underline{g}$ and $\underline{h}$ stands for an operation for |g+h|−|g−h|; and movement vector detection means 16-2 for detecting a peak point of an operation result c(Δ, θ) in said correlation arithmetic means to derive the movement vector between the two image frames.

In the third dynamic image compression apparatus, it is preferable that said dynamic image compression apparatus comprises convolution arithmetic means 16-3 for practicing, prior to an operation of equation (3a), a convolution arithmetic associated with a differential filter function on each of two functions X (x, y) and Y (x, y) in which x and y are given in the form of variables, thereby evaluating the two functions a (x, y) and b (x, y) as an object of the operation of equation (3a).

It is acceptable that said convolution arithmetic means 16-3 is replaced by convolution arithmetic means for practicing, prior to an operation of equation (3a), when a two-dimensional differential filter function is expressed by d (x, y), an operation set forth below on each of two functions X (x, y) and Y (x, y) in which x and y are given in the form of variables, $$a(x, y) = \sum_{u}\sum_{v} X(x - u, y - v) * d(u, v)$$

$$b(x, y) = \sum_{u}\sum_{v} Y(x - u, y - v) * d(u, v)$$

where an operation g*h between optional two numbers $\underline{g}$ and $\underline{h}$ stands for an operation for |g+h|−|g−h|, thereby evaluating the two functions a (x, y) and b (x, y) as an object of the operation of equation (3a).

FIG. 17 is a basic block diagram of the fourth dynamic image compression apparatus according to the present invention.

To attain the above mentioned object of the present invention, there is provided the fourth dynamic image compression apparatus in which image signals representing a plurality of image frames sequentially generated are inputted, a movement vector of the image frame-to-image frame is evaluated in accordance with the input image signals, and the movement vector can be transmitted instead of transmission of the image signals, said dynamic image compression apparatus comprising:

Hough transform means 17-1 for applying a Hough transform to two functions A (x, y) and B (x, y), which represent two image frames, respectively, to derive two functions a (ρ, θ) and b (ρ, θ), ρ and θ being variables, where ρ is a variable representing a minimum distance between a straight line and an origin on a two-dimensional plane consisting of an x-axis and a y-axis, and θ is a variable representing a slant;

correlation arithmetic means 17-2 for applying to the two functions a (ρ, θ) and b (ρ, θ) an operation set forth below $$c(\Delta, \theta) = \sum_{\rho} a(\rho, \theta) * b(\rho + \Delta, \theta) \quad (4)$$

where an operation g*h between optional two numbers $\underline{g}$ and $\underline{h}$ stands for an operation for |g+h|−|g−h|;

inverse Hough transform means 17-3 for applying an inverse Hough transform to an operation result c(Δ, θ) in said correlation arithmetic means to derive a function D(Δx, Δy), Δx, Δy being variables, where Δx is a variable representing a positional difference in an x-axis direction, and Δy is a variable representing a positional difference in a y-axis direction; and movement vector detection means 17-4 for detecting a peak point of the function D(Δx, Δy) to derive the movement vector between the two image frames.

In the fourth dynamic image compression apparatus, it is preferable that said dynamic image compression apparatus comprises convolution arithmetic means 17-5 for practicing, prior to a Hough transform, a convolution arithmetic associated with a differential filter function on each of two functions X (x, y) and Y (x, y) in which x and y are given in the form of variables, thereby evaluating the two functions A (x, y) and B (x, y) as an object of the Hough transform.

In the fourth dynamic image compression apparatus, it is preferable that said dynamic image compression apparatus comprises convolution arithmetic means 17-6 for practicing a convolution arithmetic associated with a one-dimensional differential filter function differentiating in a ρ-axis direction on each of two functions a (ρ, θ) and b (ρ, θ) evaluated through the Hough transform, and transferring the two functions after the convolution arithmetic process to said correlation arithmetic means in the form of the two functions a (ρ, θ) and b (ρ, θ) as an object of an operation of equation (4).

It is acceptable that said convolution arithmetic means 17-5 is replaced by convolution arithmetic means for practicing, prior to the Hough transform, when a two-dimensional differential filter function is expressed by $\underline{d}$ (x, y), an operation set forth below on each of two functions X (x, y) and Y (x, y) in which x and y are given in the form of variables, $$A(x, y) = \sum_{u}\sum_{v} X(x - u, y - v) * d(u, v)$$

$$B(x, y) = \sum_{u}\sum_{v} Y(x - u, y - v) * d(u, v)$$

where an operation g*h between optional two numbers $\underline{g}$ and $\underline{h}$ stands for an operation for |g+h|−|g−h|, thereby evaluating the two functions A (x, y) and B (x, y) as an object of the Hough transform.

It is also acceptable that said convolution arithmetic means 17-6 is replaced by convolution arithmetic means for practicing, when a one-dimensional differential filter function differentiating in a p-axis direction is expressed by $\underline{d}$ (ρ), an operation set forth below on each of the two functions a (ρ, θ) and b (ρ, θ) evaluated through the Hough transform, $$a'(\rho, \theta) = \sum_{u} a(\rho - u, \theta) * d(u)$$

-continued $$b'(\rho, \theta) = \sum_u b(\rho - u, \theta) * d(u)$$

where an operation g*h between optional two numbers g and h stands for an operation for $|g+h|-|g-h|$, and transferring two functions a' ($\rho$, $\theta$) and b' ($\rho$, $\theta$) after the above operation to said correlation arithmetic means in the form of the functions a ($\rho$, $\theta$) and b ($\rho$, $\theta$) as an object of an operation of equation (4).

The present invention as mentioned above is classified into two groups, that is, the first group using, as an operation a*b between optional two numbers a and b, (A) an operation in which the sum $|a|+|b|$ of the absolute values of the numbers a and b is given in the form of the absolute value $|a*b|$ of an operation result according to the operation a*b, and a plus and a minus are assigned to signs of the operation result according to the operation a*b in compliance with either one of a match and a mismatch of polarities of two functions a and b and the other, respectively; and the second group using (B) an operation of f (a+b)-f (a-b) where an even function involving a monotone variation when the variation x is in a predetermined positive area is expressed by f (x) (where f (x)$\neq$r·x$^2$+s; r and s are constant). In the following explanation, these are referred to as "first group" and "second group", respectively.

According to the first group of the present invention, it is intended to implement the "correlation analogous to equation (5)", which permits a movement vector to be detected on a stable basis, with the use of sum but not the product.

Here, let us compare a digital multiplier for computing the product with a digital adder for computing the sum. An adder for computing binary data of N bits comprises, as shown in FIG. 18(A), N pieces of element adders. On the other hand, a multiplier for computing binary data of N bits comprises, as shown in FIG. 18(B), N×N pieces of element adders. It would be understood that a multiplier for 256 (=2$^8$) data needs the element adders of which the number is 8 times as many as that of the adder. Therefore, it is great significant that the correlation is implemented by the adder.

Now let us consider a meaning of using the product in the correlation of equation (5). What is required for the correlation between a (x, y) and b (x+$\Delta_x$, y+$\Delta_y$) is that a large value appears when a matches with b, while a small value appears when a mismatches with b. In the study of the property of the product, as shown in Table 1, it would be understood that the positive (large value) appears when a matches with b in their polarities, while the negative (small value) appears when a mismatches with b in their polarities. This property is the essence of the correlation of equation (5).

TABLE 1

| a | b > 0 | b < 0 | b = 0 |
|---|---|---|---|
| a > 0 | P | −P | 0 |
| a < 0 | −P | P | 0 |
| a = 0 | 0 | 0 | 0 |

P = |ab|

The value (absolute value P) in the multiplication is less in meaning in the correlation for a match determination. Specifically, there is no need that 10×10 is exactly 100, and even 20 (=10+10), it is not so different in the match determination. In effect, what is required for the correlation between a and b is the "property (Table 1) of the polarity identical to the product", and it is sufficient that "the absolute value is not important, a monotone increasing function of the absolute value of a and the absolute value of b". Further, it is preferable that when either of a and b is zero, an output becomes zero. However, this property is not always required.

From this study, as the simplest "monotone increasing function of the absolute value of a and the absolute value of b", we take notice of the sum ($|a|+|b|$) of their absolute values, and adopt an operation in which the polarity is identical to the product (Table 2). According to this correlation, it is possible to implement the excellent correlation similar to the product with adders which is extremely few in the amount of hardware as compared with the multiplier.

TABLE 2

| a | b > 0 | b < 0 | b = 0 |
|---|---|---|---|
| a > 0 | Q | −Q | 0 |
| a < 0 | −Q | Q | 0 |
| a = 0 | 0 | 0 | 0 |

Q = |a| + |b|

The operation (Table 2) of the present invention is defined by the symbol *. Assuming that two inputs are denoted by a and b, the operation is expressed by a*b.

Specifically, it is computed in accordance with the following equations:

$a*b=(|a|+|b|)$: when a and b match with one another in their polarities (7a)

$a*b=-(|a|+|b|)$: when a and b does not match with one another in their polarities (7b)

$a*b=0$: when either of a and b is zero (7c)

where equation (7c) is not always necessary.

Two-dimensional correlation according to this operation is expressed, using a new operation symbol *, by the following equation (8).

$$C(\Delta_x, \Delta_y) = \Sigma_x \Sigma_y a (x, y) * b (x+\Delta_x, y+\Delta_y) \quad (8)$$

The correlation of the present invention shows a preferable property similar to that of equation (5) using the product. Specifically, when small areas of both the screens match with one another, the maximum value appears, while when they do not match with one another, the small value appears. Particularly, when the small areas of both the screens are different from each other in their polarities, the negative value appears. This distinctly shows that a mismatch is large. The negative correlation value is an excellent property which is not involved in the correlation of equation (6).

Next, there will be explained the second group of the present invention. For the purpose of simplification of the explanation, there will be explained, as the function f(x), f(x)=|x|. That is, when f(x)=|x|, $$a*b=f(a+b)=f(a-b)=|a+b|-|a-b| \quad (9)$$

According to the second group of the present invention, it is intended to implement the "correlation analogous to equation (5)", which permits a movement vector to be detected on a stable basis, with the use of the combination of two-input linear operation such as the sum or the difference, but not the product, and one-input linear operation. Also in this case, the argument as to the scale of the hardware of the digital multiplier for computing the product and the digital adder for computing the sum, which were explained referring to FIG. 28, stand for as it is. Further, it is possible to implement also the absolute value with a simple hardware. Thus, it is possible to extremely reduce the amount of the hardware as compared with the operation of the "product" according to the prior art.

According to the second group of the present invention, as mentioned above, using the optional even function f (x), the operation * is defined as follows.

$$a*b = f(a+b) - f(a-b) \quad (10)$$

This operation is the odd function on each of a and b, and is in the symmetry as to the exchange of a and b. That is, from equation (10) and the following equation $$f(a) = f(-a) = f(|a|) \quad (11)$$

the following equations are derived.

$$a*b = b*a \quad (12a)$$

$$a*b = -\{(-a)*b\} \quad (12b)$$
$$= -\{(a)*(-b)\}$$
$$= (-a)*(-b)$$

$$a*0 = 0*b \quad (12c)$$

$$a*b = \text{sign}(ab)\,|a|*|b| \quad (12d)$$

where |x| denotes the absolute value of x; and sign (x) denotes the function involving 1 at x>0, −1 at x<0, and 0 at x=0.

Considering the case that f (x) is of a monotone increasing in the positive area on x, that is, the following equation stands up, $$f(x) > f(y) \quad (|x|>|y|) \quad (13)$$

taking into account $|a|+|b| > ||a|-|b||$ to $ab \neq 0$, the following equations stand up.

$$a*b = f(|a|+|b|) - f(|a|-|b|) \quad (14)$$
$$= f(|a|+|b|) - f(||a|-|b||) > 0$$
$$ab \neq 0$$

Therefore, it is understood from equation (12d) that a*b is always the same as ab in the polarity (Table 3). Reversely, to satisfy the condition that a*b is always the same as ab in the polarity, the function f (x) should be of a monotone increasing in the positive area on x.

TABLE 3

| a | b > 0 | b < 0 | b = 0 |
|---|---|---|---|
| a > 0 | Q | −Q | 0 |
| a < 0 | −Q | Q | 0 |
| a = 0 | 0 | 0 | 0 |

$Q = f(|a|+|b|) - f(|a|-|b|)$

From the above-mentioned matter, it would be understood that when the operation * is defined with equation (10) with respect to an optional even function involving a monotone increasing in the positive area, this operation almost satisfies the property of the product which is needed for the correlation. Of course, also in case of the even function involving a monotone decreasing in the positive area, it becomes the monotone increasing function, when taking into account −f(x). Thus, it is the same as that of the even function involving a monotone increasing in the positive area, except for the inversion of the polarity of the output. Hence, hereinafter, for the purpose of simplification of the explanation, the case of the monotone increasing will be mainly explained.

Of the operations * as mentioned above the simplest one is a case that as f (x) the absolute value |x| of x is given. In this case, the above-mentioned equation (9) is given.

$$a*b = |a+b| - |a-b| \quad (9)$$

In this case, even in a case where equation (9) is implemented in its present form, it is possible to implement the system with only the simple hardware such as adders, complementers, and absolute circuits. Thus, it is possible to reduce the amount of the hardware as compared with the multiplier. As will be described later, the outputs in this case can be expressed as in Table 4.

TABLE 4

| a − b | a + b ≥ 0 | a + b ≤ 0 |
|---|---|---|
| a − b ≥ 0 | 2b | −2a |
| a − b ≤ 0 | 2a | −2b | a * b = |a + b| − |a − b|

In this manner, according to the correlation defined by equation (10), a suitable selection of the function f(x) makes it possible to implement the correlation excellent same as in the product with adders which are extremely reduced in the amount of hardware as compared with the multiplier. Further, in some cases, depending on the property of input signals, there is a possibility that a suitable selection of the function f(x) makes it possible to implement the correlation having a more excellent property than that of the usual correlation according to the product.

The two-dimensional correlation according to the above-mentioned operation * is expressed by $$C(\Delta X, \Delta Y) = \Sigma_x \Sigma_y\, a\,(x,y) * b\,(x+\Delta X, y+\Delta Y) \quad (15)$$

Of the properties which are preferable for a computation of the correlation ones which the operation * according to equation (10) does not satisfy are a distribution law to the linear addition and an associative law to the scalar product.

$$(a+b) * c \neq a * c + b * c \quad (16a)$$

$$(ca) * b \neq (a * c) \quad (16b)$$

However, in a case where this is a problem, it is possible to avoid this problem through practicing the pre-processing as will be described latter. Thus, this problem is not so important.

In a similar fashion to that of the first group of correlation, the second group of the correlation provides a preferable property similar to equation (5) using the product. Specifically, in case of the use of the even function involving the monotone increasing, when small areas of both the screens match with one another, the maximum value appears, while when they do not match with one another, the small value appears. Particularly, when the small areas of both the screens are different from each other in their polarities, the negative value appears. This distinctly shows that a mismatch is large. The negative correlation value is an excellent property which is not involved in the correlation of equation (6). Of course, in case of the monotone decreasing function, this is reversed.

BRIEF DESCRIPTION OF THE DRAWINGS

FIG. 1 is an explanatory view useful for understanding a movement vector;

FIG. 17 is a basic block diagram of the second and fourth dynamic image compression apparatuses according to the present invention;

FIG. 25 is a view showing exemplarily an analog switching circuit;

FIGS. 26–28 are each a view showing exemplarily an analog adder circuit;

FIG. 42 is an explanatory view useful for understanding a binocular parallax;

FIG. 43 is an explanatory view useful for understanding a scheme of detecting an interval of straight line-to-straight line using Hough transform;

DESCRIPTION OF THE PREFERRED EMBODIMENTS

Hereinafter, there will be described embodiments of the present invention.

Here, first, there will be described embodiments of the first group of the present invention. Consequently, the arithmetic operation a * b basically implies the operation of the above-mentioned paragraph (A), that is, the operation defined by equations (7a)–(7c), throughout the explanation of the embodiments of the first group of the present invention.

Of the present invention the first group is based on the arithmetic operation shown in Table 2. This feature makes it possible to obtain a preferable character similar to the correlation using the product, and also to implement the operation units with the extremely reduced amount of hardware as compared with the multiplier. This operation is useful for not only the two-dimensional correlation expressed by equation (8), but also a one-dimensional correlation which will be described later. The essential matter that such an operation is applied to the correlation resides, as described above, in equations (7a) and (7b). It is acceptable that the polarity of the output is inverted, and "when both the inputs match in the polarity, it is determined as the negative, whereas when both the inputs do not match in the polarity, it is determined as the positive".

Figure 19:
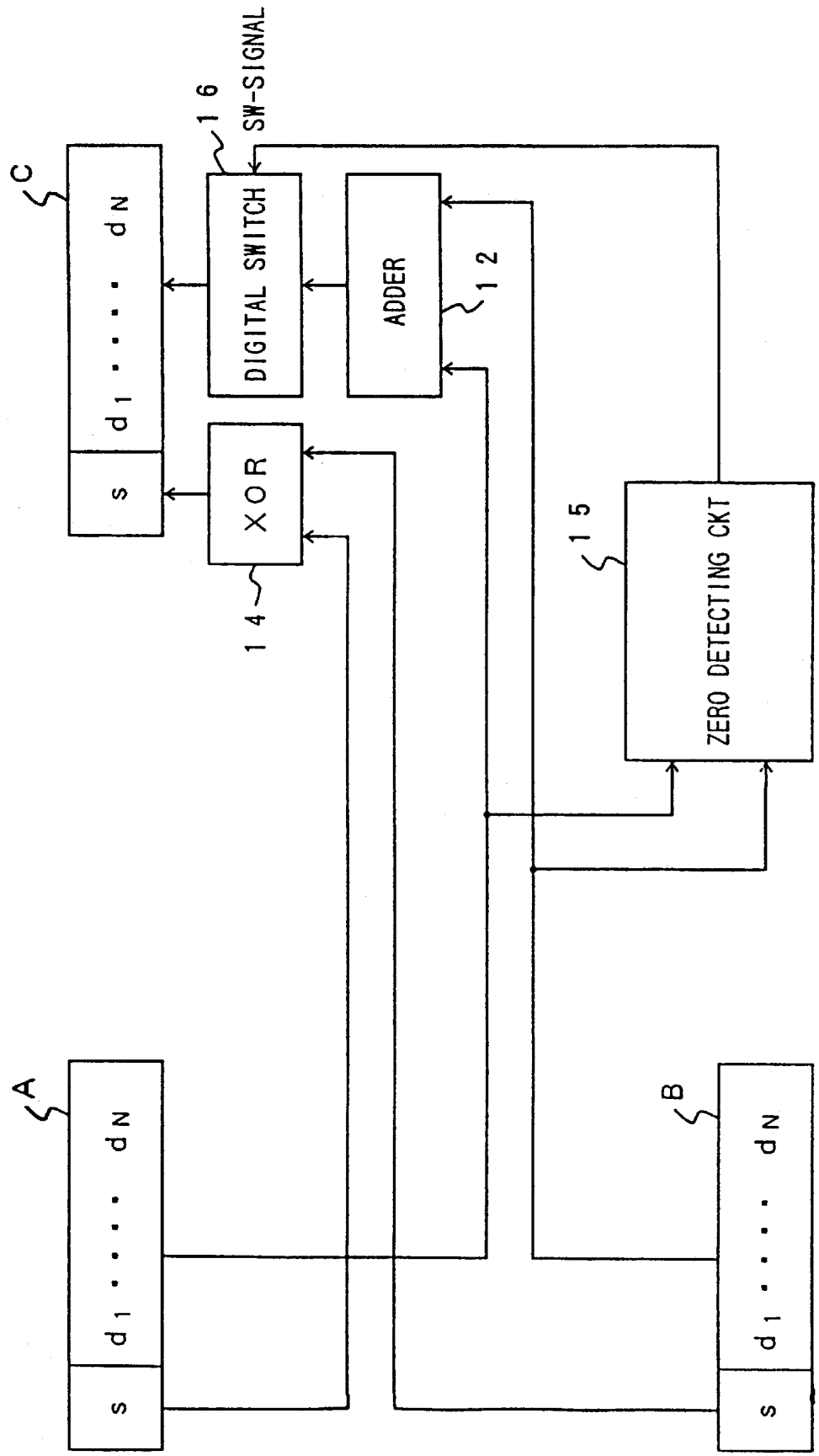
FIG. 19 is a circuit block diagram of a digital circuit for performing a basic operation of the first group according to the present invention.
Figure 20:
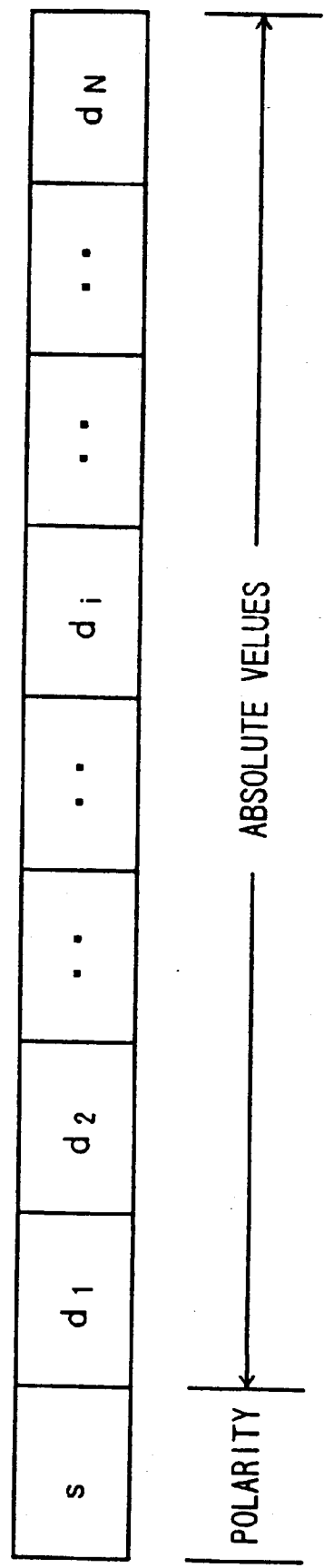
FIG. 20 is an illustration showing a data format of a register.
Figure 21:
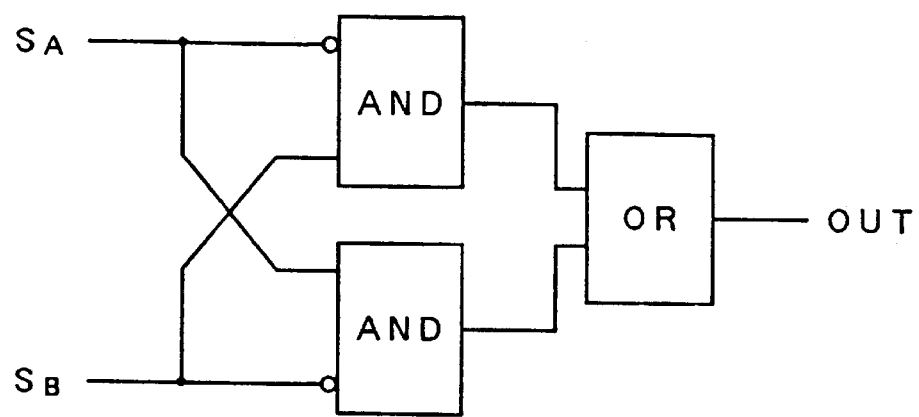
FIG. 21 is a circuit block diagram of an XOR circuit.
Figure 22:
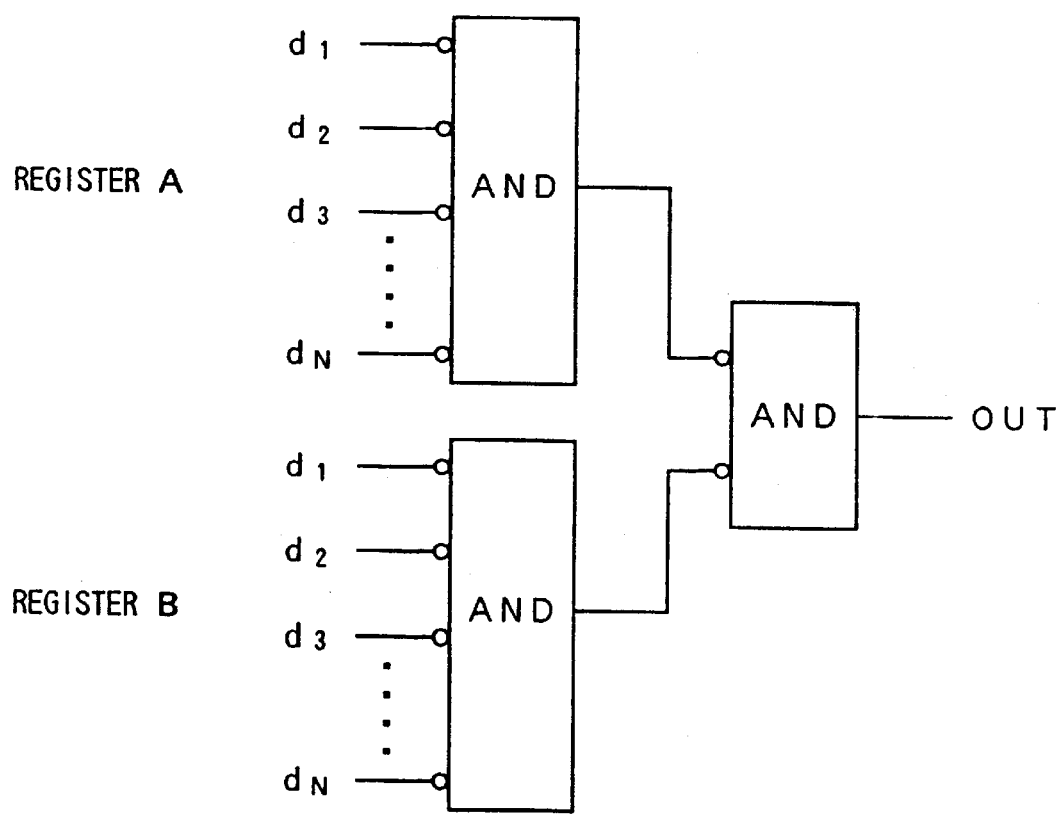
FIG. 22 is a circuit block diagram of a zero detection circuit.
Figure 23:
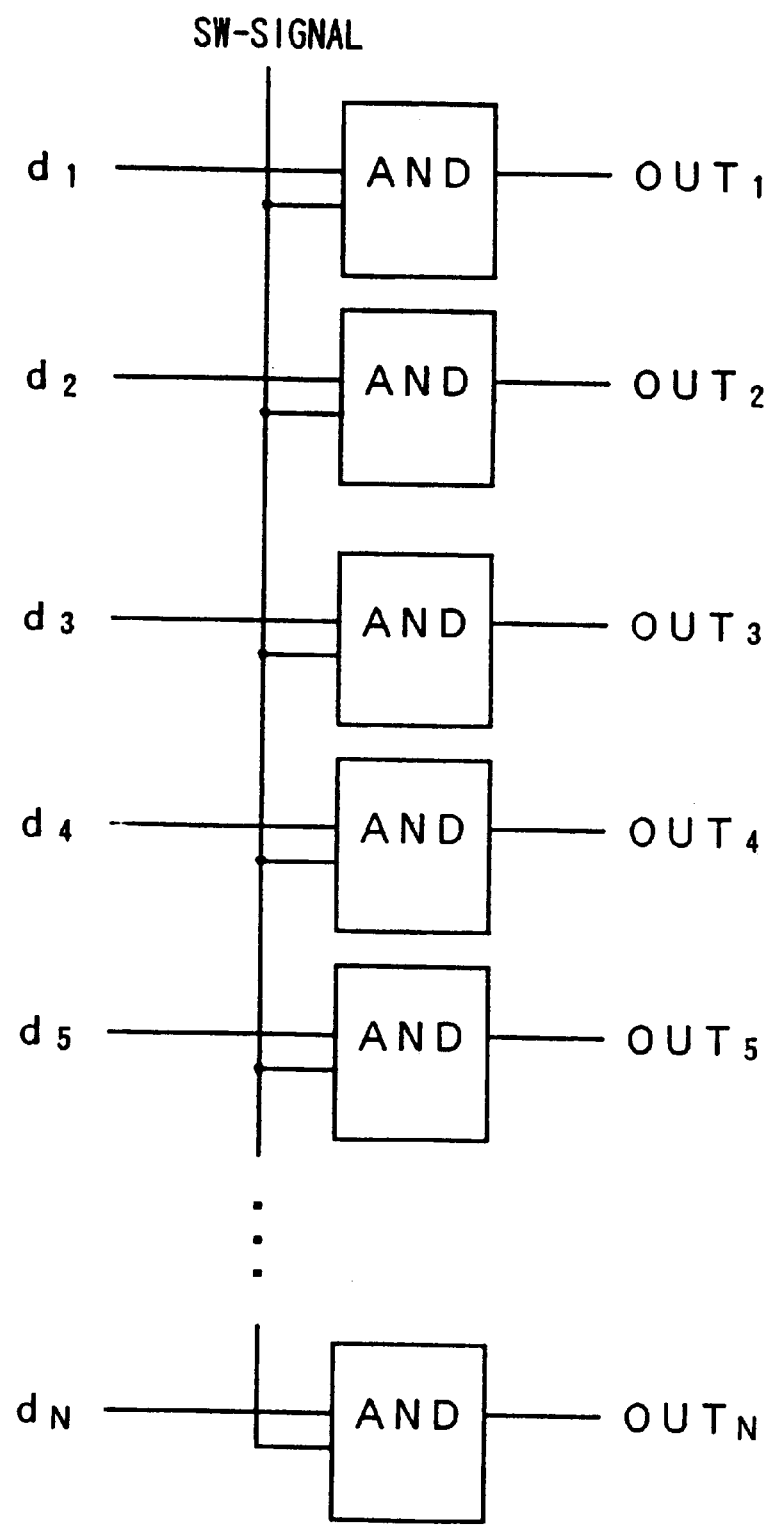
FIG. 23 is a circuit block diagram of a digital switch.

The scheme according to Table 2 can be implemented with a simple digital circuit (FIG. 19). Input data a and b are set to input registers A and B, respectively. The data format of the registers is, as shown in FIG. 20, a "binary format having code" in which a polarity bit is added to absolute value bits. With respect to the polarity, the positive is represented by "0" and the negative by "1". The operation of Table 2 is carried out in such a way that the absolute value bits of both the input registers A and B are added by a digital adder 12 and then set to an absolute value bit of an output register C. Simultaneously, the polarity bits of both the input registers A and B are fed to an exclusive OR (XOR) circuit 14 and the output of the XOR circuit 14 is set to a polarity bit of the output register C. The use of a zero detection circuit 15 and a digital switch 16 causes the output register C to be set to zero when the zero detection circuit 15 receives a zero input from either of the input registers A or B. In this manner, the operation of Table 2 is carried out on the basis of the adder. The XOR circuit 14, the zero detection circuit 15 and the digital switch 16 are shown in FIGS. 21, 22 and 23, respectively. In FIGS. 21 and 22, a small circle of the left side of AND gate denotes a logic NOT. Table 5 shows an operation logic of the XOR circuit 14 shown in FIG. 21.

TABLE 5

| | $S_a$ | |
|---|---|---|
| $S_A$ | 1 | 0 |
| 1 | 0 | 1 |
| 0 | 1 | 0 |

As explained above, there is no need to always satisfy equation (7c). It is acceptable that the zero detection circuit 15 and the digital switch 16 shown in FIG. 19 is deleted.

Even if the data format of the register is a "complementary type of binary format", it is possible to provide a circuit for performing the operation of Table 2 in the similar fashion. Further, even if the definition of the polarity is given with the positive "1" and the negative "0", it is possible to provide a circuit for performing the operation of Table 2 with the use of "NOT of Exclusive logical OR" in the similar fashion.

The scheme according to Table 2 can be implemented also with an analog circuit. The operation of Table 2 is rewritten into Table 6. This is obtained in the form of the sum of the respective operations of Tables 7 and 8.

TABLE 6

| | b | | |
|---|---|---|---|
| a | b > 0 | b < 0 | b = 0 |
| a > 0 | a + b | −a + b | 0 |
| a < 0 | a − b | −a − b | 0 |
| a = 0 | 0 | 0 | 0 |

TABLE 7

| | b | | |
|---|---|---|---|
| a | b > 0 | b < 0 | b = 0 |
| a > 0 | a + b | b | 0 |
| a < 0 | a | 0 | 0 |
| a = 0 | 0 | 0 | 0 |

TABLE 8

| | b | | |
|---|---|---|---|
| a | b > 0 | b < 0 | b = 0 |
| a > 0 | 0 | −a | 0 |
| a < 0 | −b | −a − b | 0 |
| a = 0 | 0 | 0 | 0 |

Figure 2:
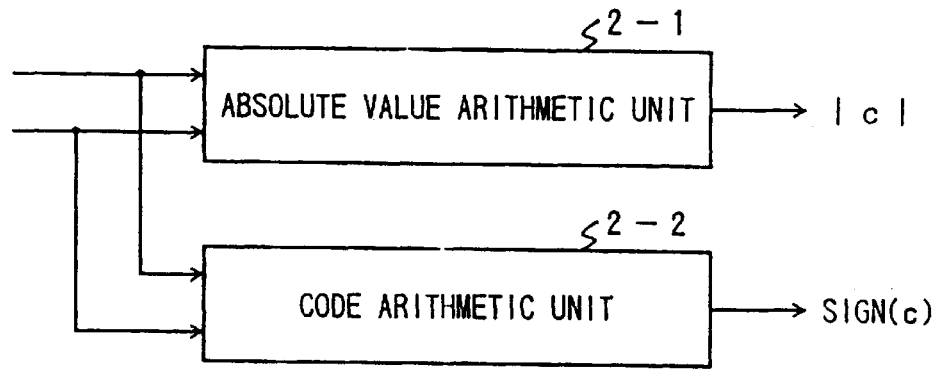
FIG. 2 is a basic block diagram of the first arithmetic unit according to the present invention.
Figure 3:
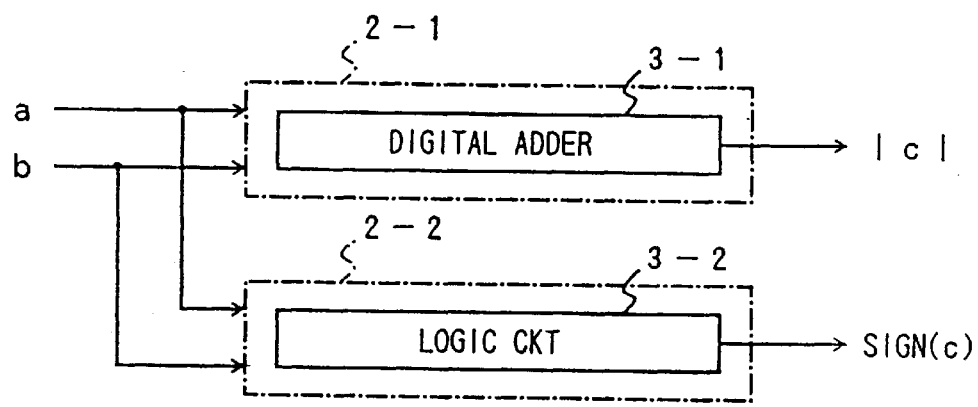
FIGS. 3–8 are each a basic block diagram of the first arithmetic unit according to an embodiment of the present invention.
Figure 4:
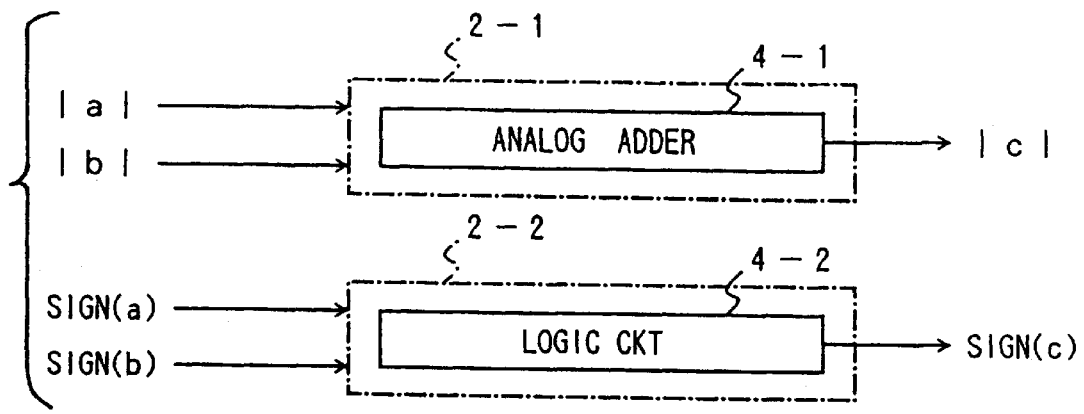
Figure 5:
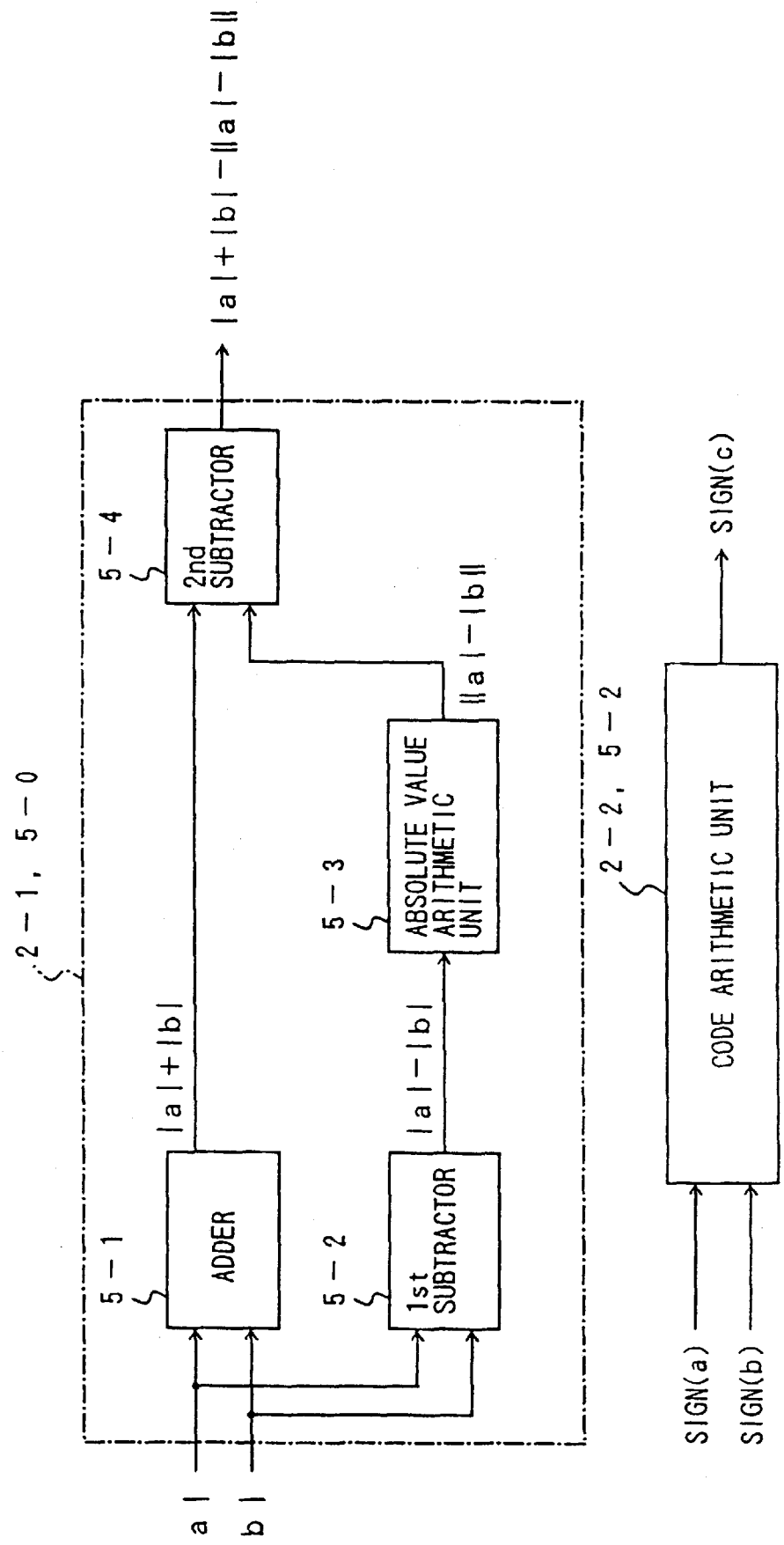
Figure 6:
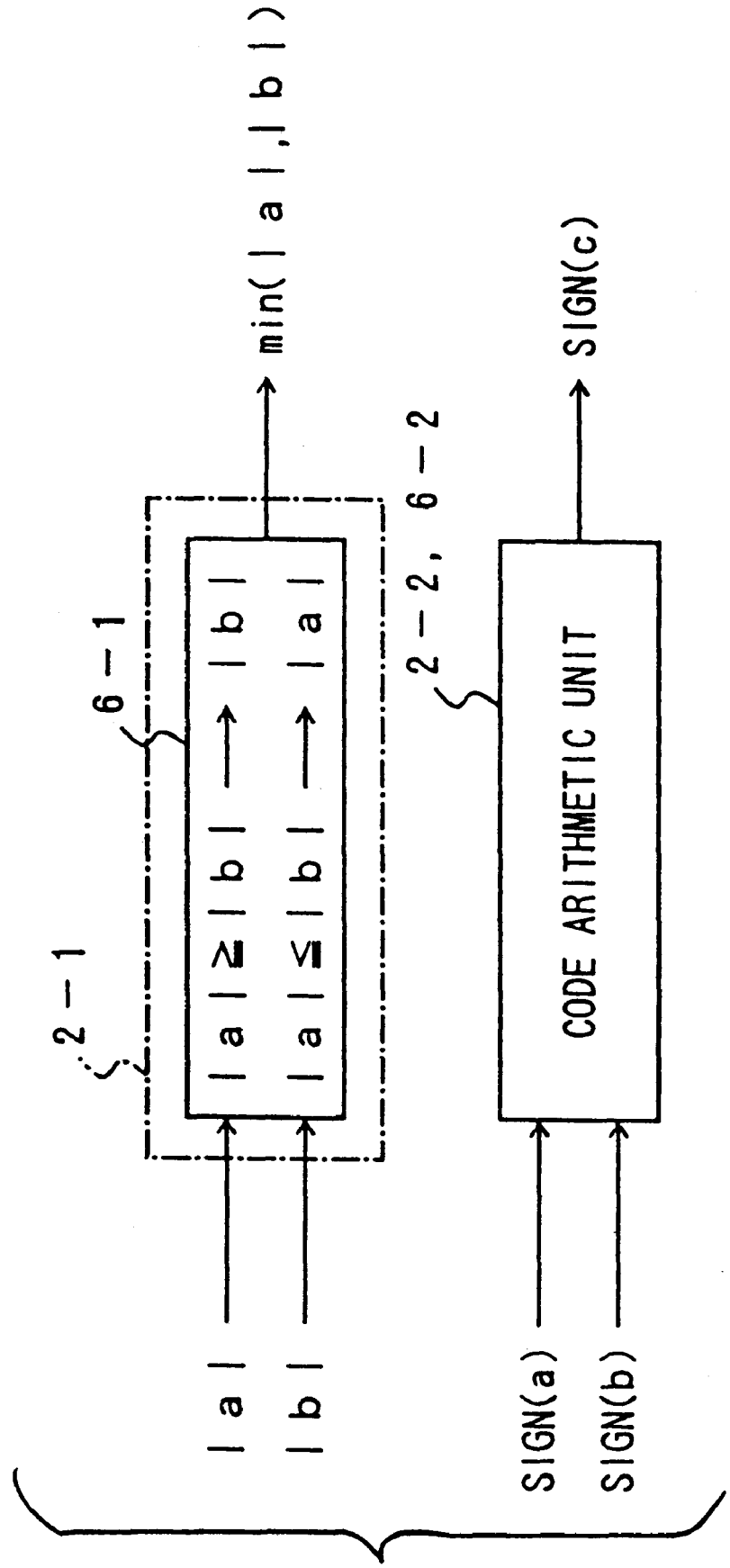
Figure 7:
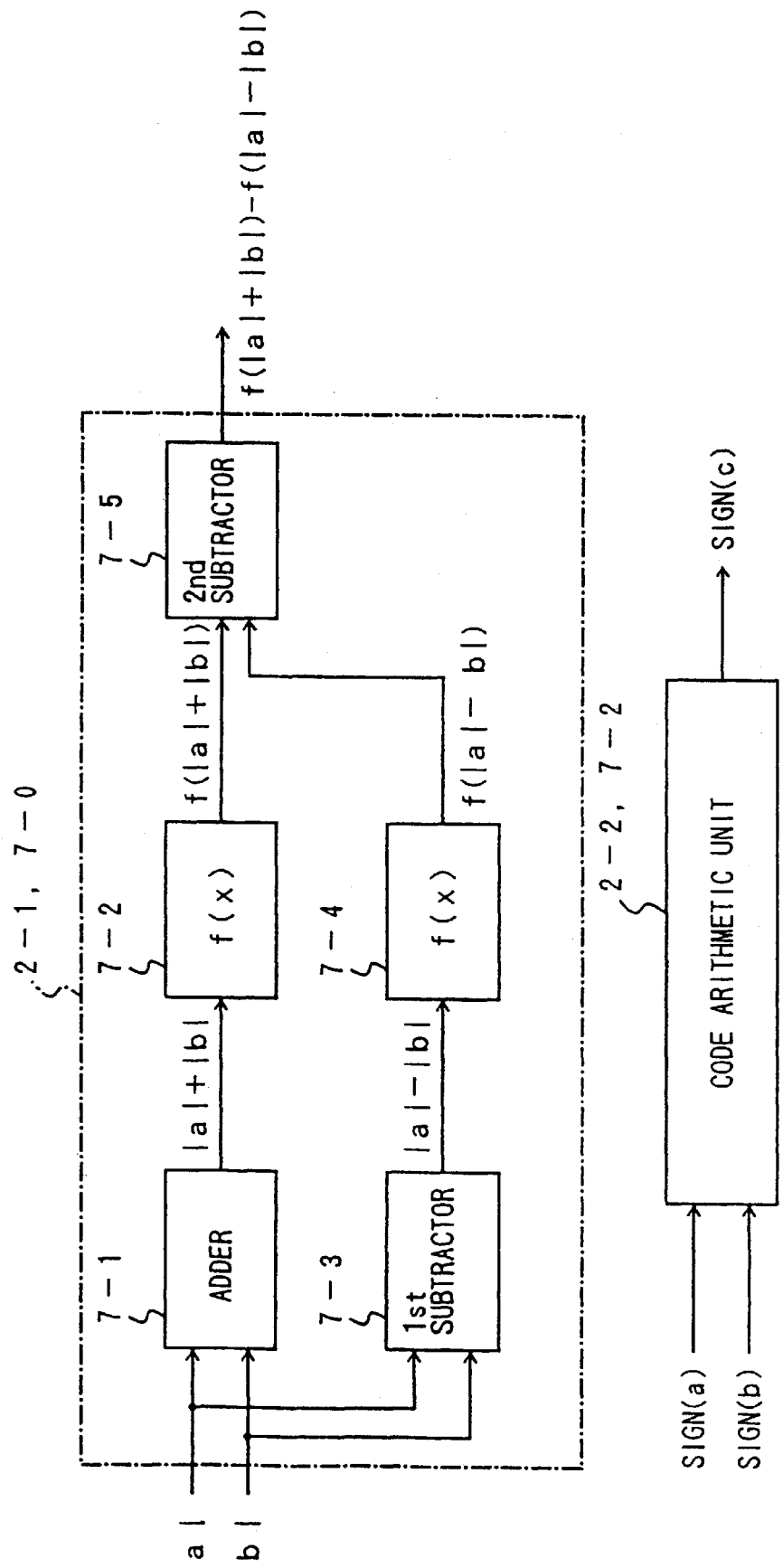
Figure 8:
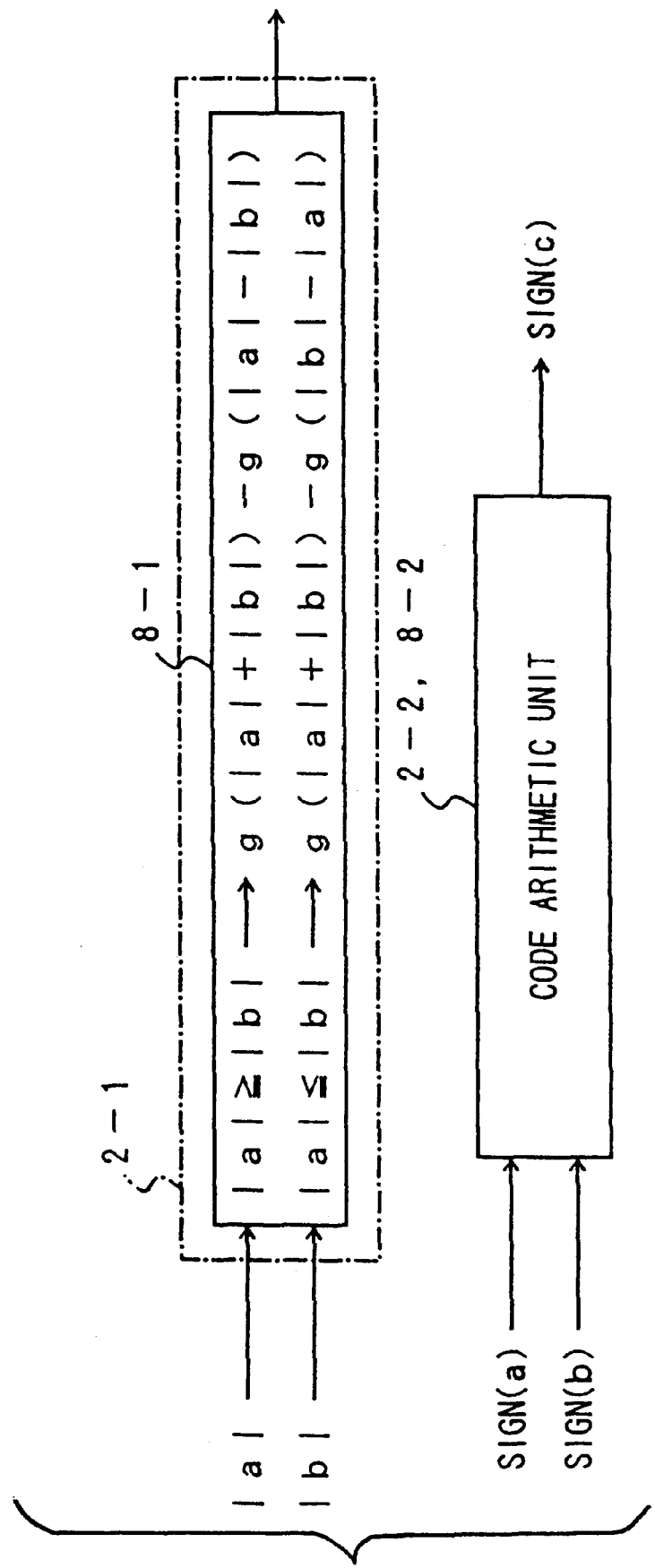
Figure 9:
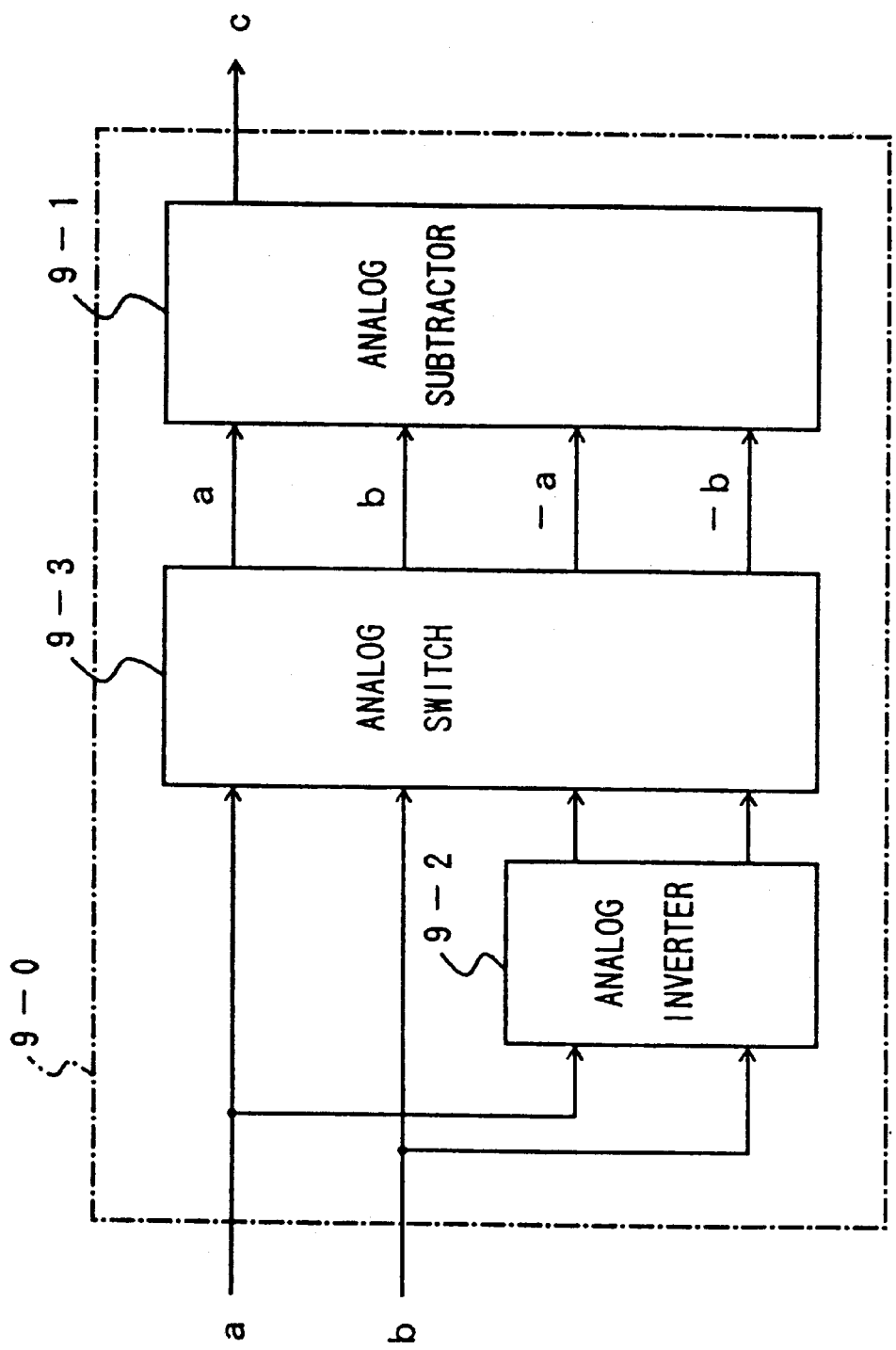
FIG. 9 is a basic block diagram of the second arithmetic unit according to the present invention.
Figure 10:
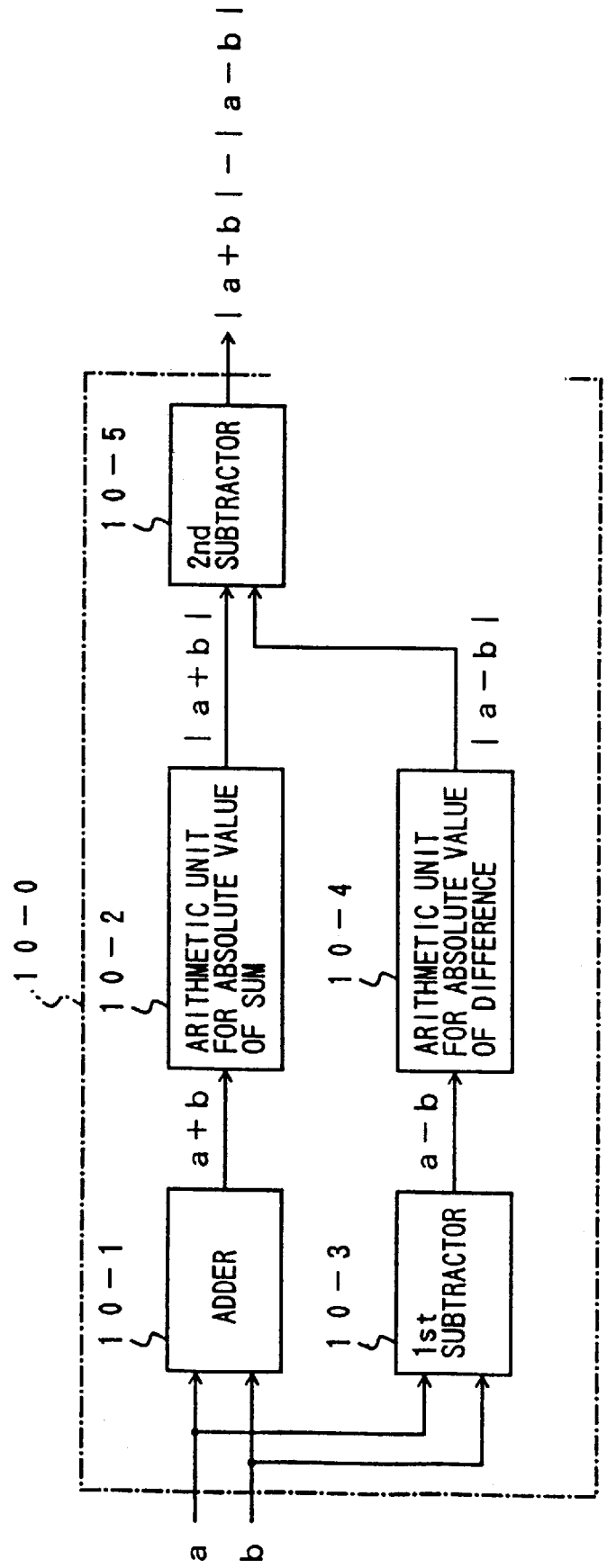
FIG. 10 is a basic block diagram of the third arithmetic unit according to the present invention.
Figure 11:
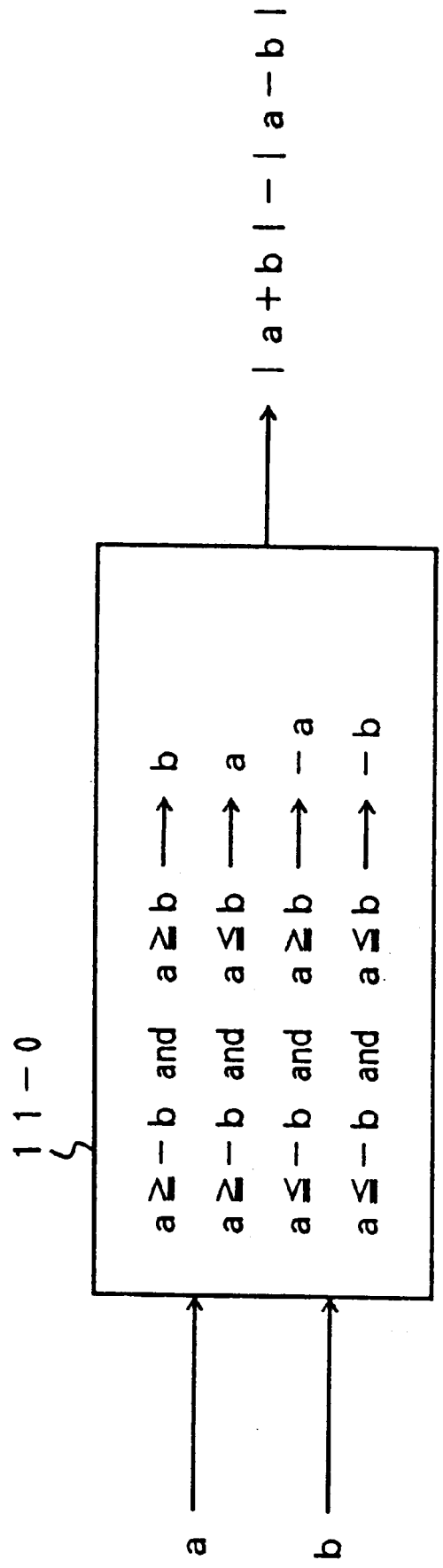
FIG. 11 is a basic block diagram of the fourth arithmetic unit according to the present invention.
Figure 12:
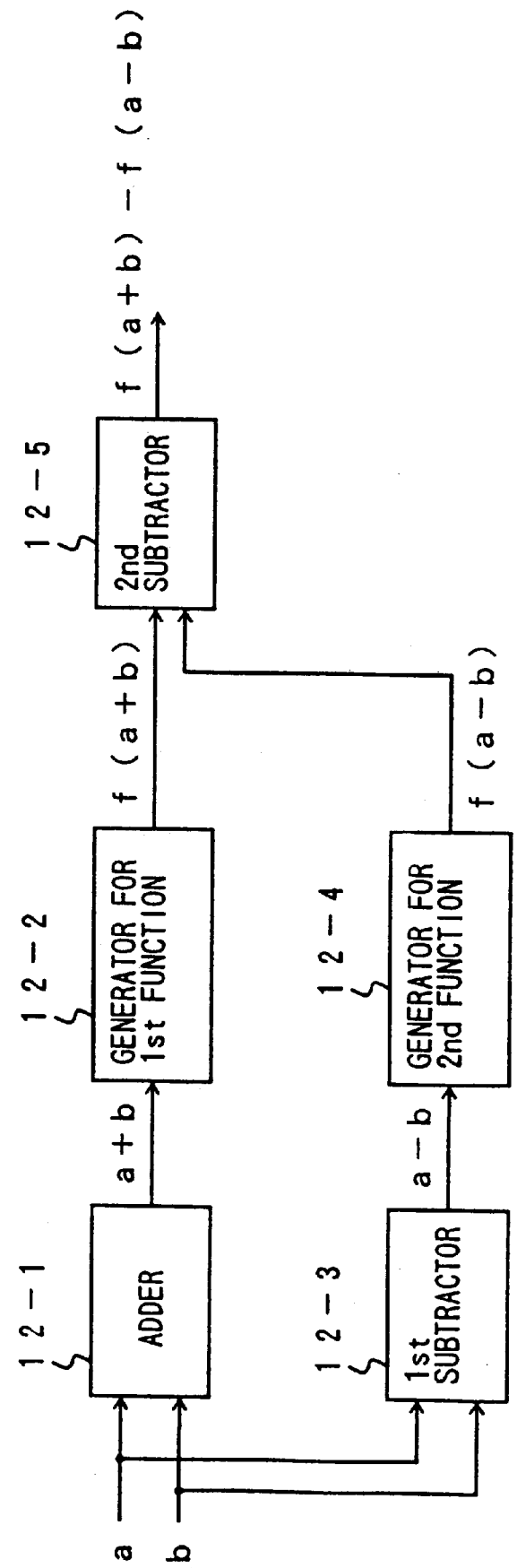
FIG. 12 is a basic block diagram of the fifth arithmetic unit according to the present invention.
Figure 13:
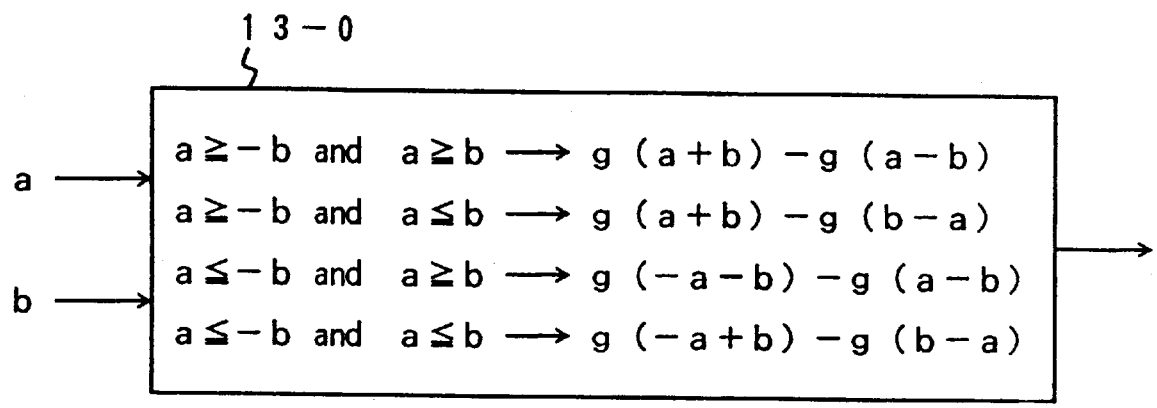
FIG. 13 is a basic block diagram of the sixth arithmetic unit according to the present invention.
Figure 14:
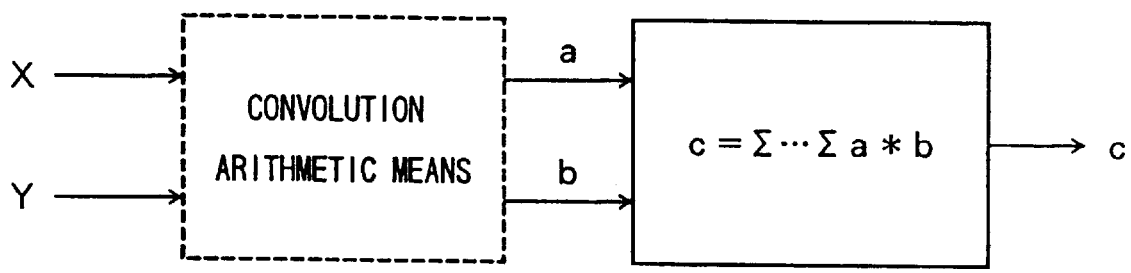
FIG. 14 is a basic block diagram of the first to sixth correlation arithmetic units according to the present invention.
Figure 15:
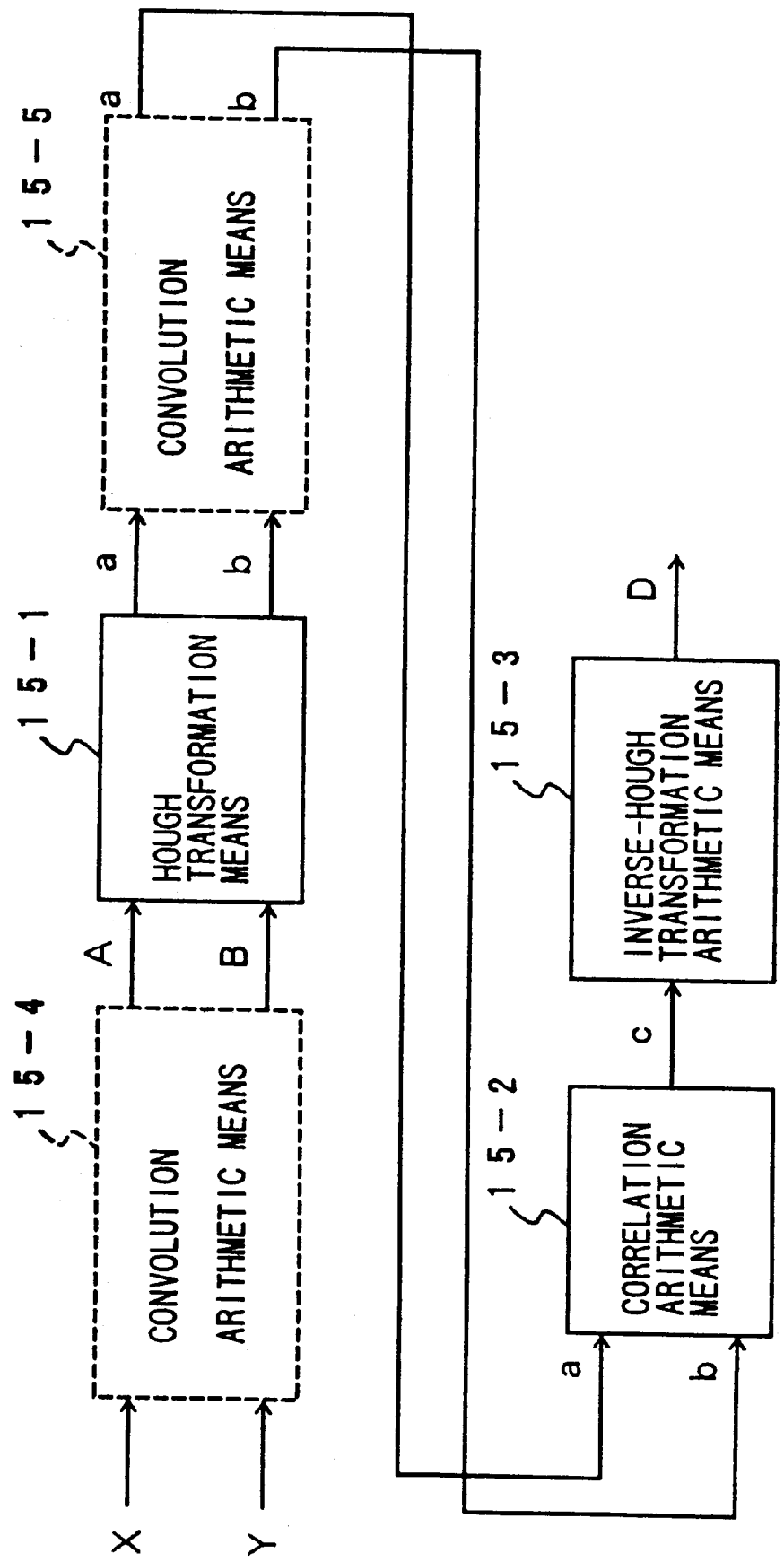
FIG. 15 is a basic block diagram of the seventh to eighth correlation arithmetic units according to the present invention.
Figure 16:
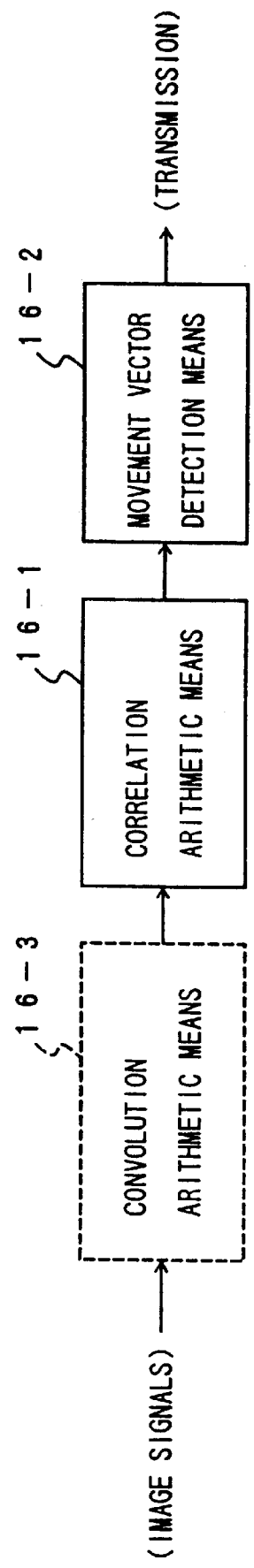
FIG. 16 is a basic block diagram of the first and third dynamic image compression apparatuses according to the present invention.
Figure 18A:
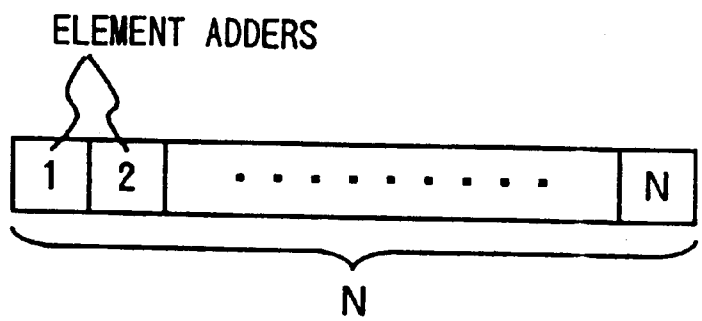
FIGS. 18(A) and 18(B) are a view showing a comparison of a digital adder with a digital multiplier in a hardware scale.
Figure 18B:
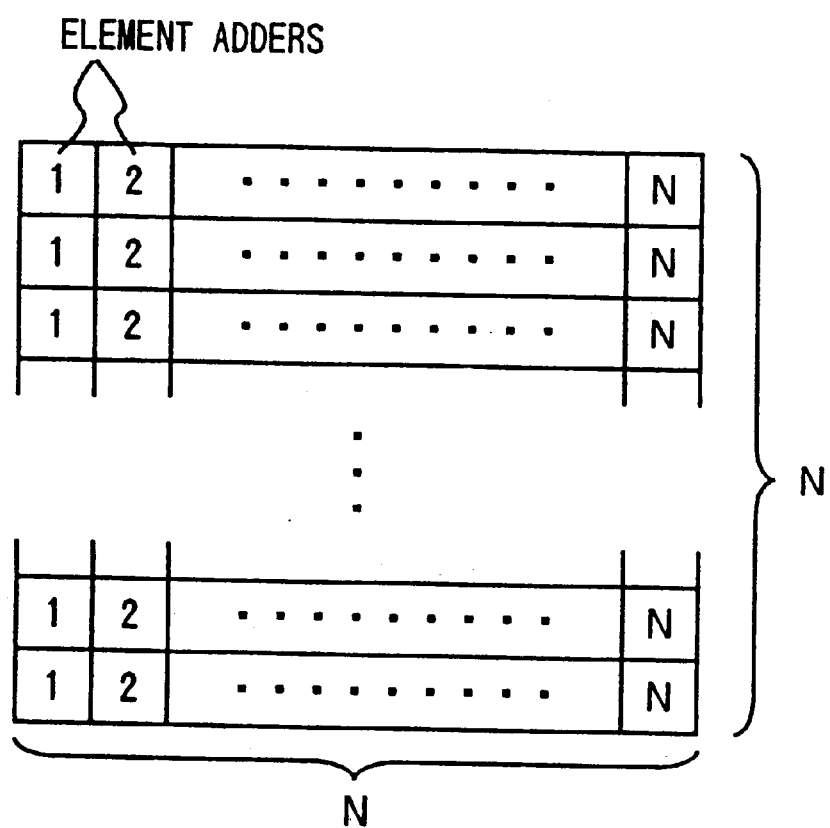

There may be provided an analog circuit (FIG. 24) on the basis of the concept such as the sum of the respective operations of Tables 7 and 8. When inputs a and b are applied to inverters 21 in FIG. 24, the operation of Table 7 is outputted. The circuit 20 encircled with the dotted line comprises the inverters 21, analog switches 22 and an analog adder 23. On the other hand, when inputs a and b are applied to inverters 24 and then applied to the circuit 20, the operation of Table 8 is outputted. When the output of both the blocks 20 are added through an analog adder 25, the twice operation shown in FIG. 6 is outputted. In the exemplary circuit (FIG. 25) of the analog switch 22, as shown in Table 9, it turns on when the control input g is of negative and zero, and turns off with positive.

TABLE 9

| control input g | output out |
|---|---|
| positive | 0 (switch OFF) |
| zero | a (switch ON) |
| negative | a (switch ON) |

Here, while there is provided the analog switch operative for Table 9, the operation for Table 6 may be performed even with the use of a switch which is indefinite in the switch on and off in the state of the control input "zero".

Further, the use of a switch operative in the inverting type also allows arranging a circuit for performing the operation for Table 6 in the similar fashion.

Figure 27:
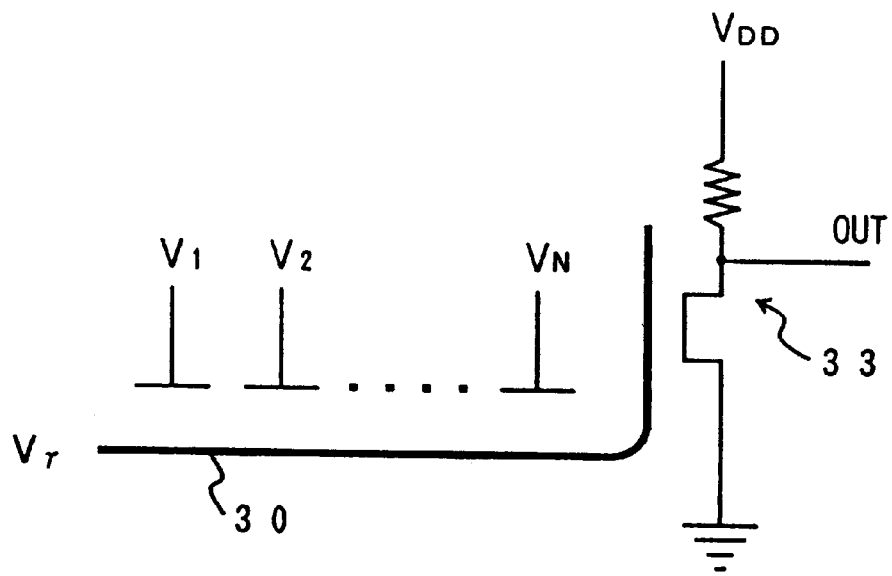
Figure 28:
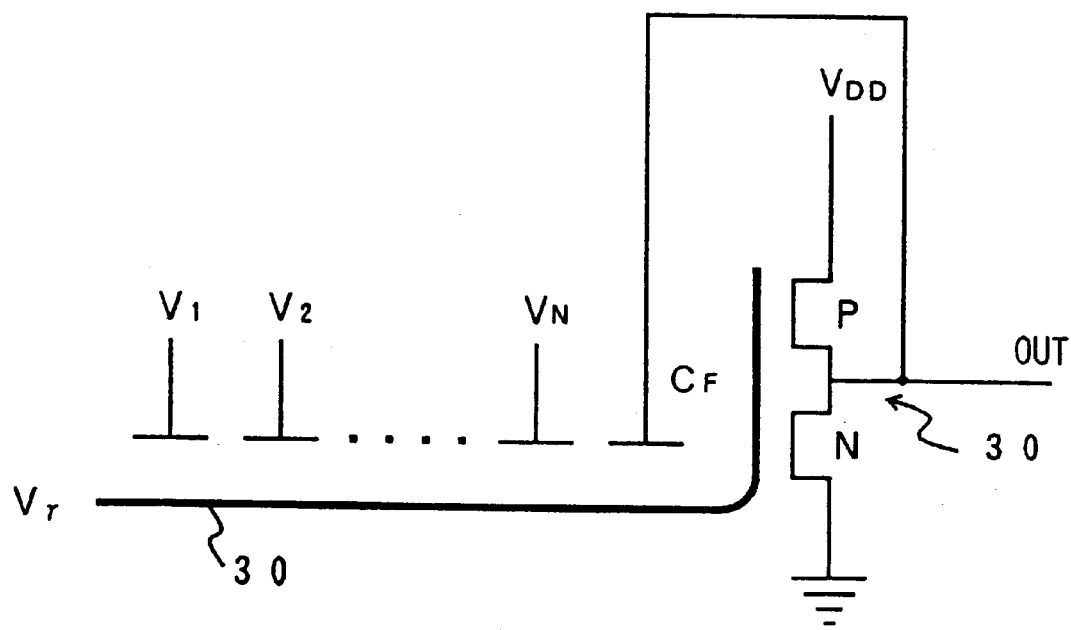
Figure 29:
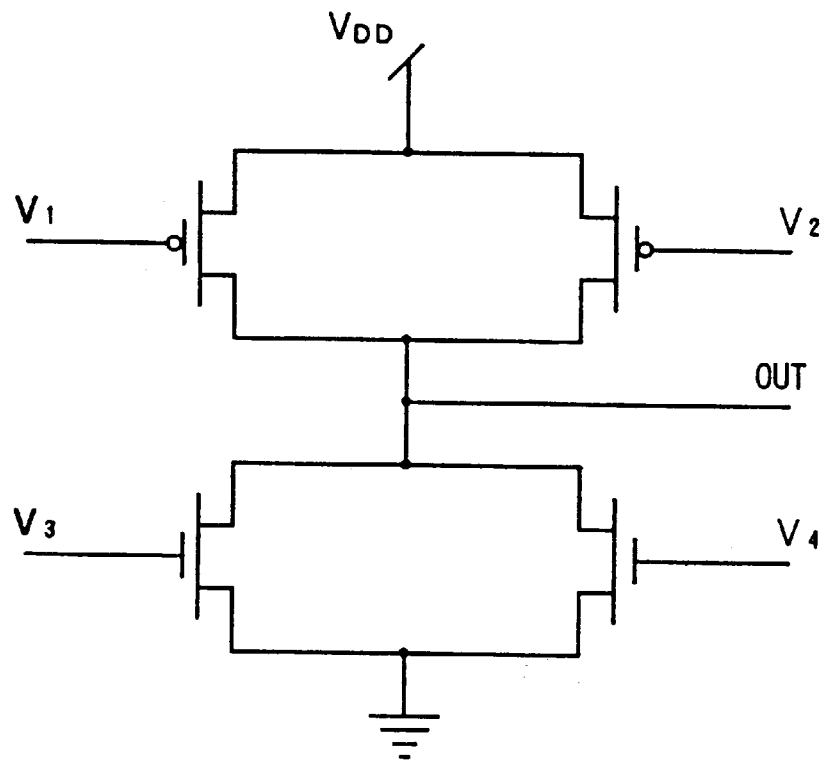
FIGS. 29–30 are each a view showing exemplarily an analog adder and subtracter circuit.
Figure 30:
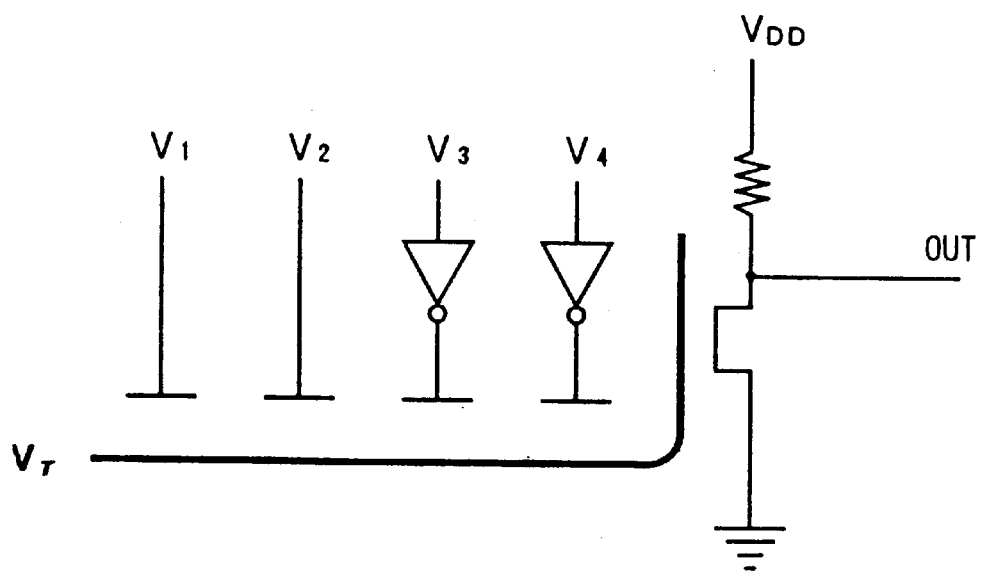

FIGS. 26–28 are each a view showing exemplarily an analog adder circuit. FIGS. 29–30 are each a view showing exemplarily an analog adder and subtracter circuit.

FIG. 26 shows exemplarily an analog adder circuit in which the respective inputs are connected through electrostatic capacity of small electrodes 31 to a large floating electrode 30, and the floating electrode 30 is connected to an analog amplifier 32. Assuming that a capacitance between the floating electrode 30 and the ground is expressed by $C_T$, and capacitances between the small electrodes 31 are each equal to one another and expressed by $C_1$, the potential $V_T$ is obtained through addition of the respective input potentials $V_1, V_2, \ldots, V_N$, as follows.

$$V_T = C_1(V_1 + V_2 + \ldots + V_N)/C_T$$

Thus, the the output of the analog amplifier 32 is equivalent to an analog addition value of the input potentials.

FIG. 27 shows exemplarily an analog adder circuit in which the floating electrode 30 mentioned above is coupled to a MOS transistor 33. Also in this case, the analog addition is performed in the similar fashion to that of FIG. 26.

FIG. 28 shows exemplarily an analog adder circuit in which a linearity of the output is improved through a feedback, specifically, the most linear output characteristic is obtained when $C_F = NC_1$.

FIG. 29 shows exemplarily an analog adder and subtracter circuit in which a P-MOS transistor and a N-MOS transistor are combined. According to such a circuit, the output thereof is proportional to $V_1 + V_2 - V_3 - V_4$, and it is possible to perform the addition and the subtraction.

FIG. 30 shows exemplarily an analog adder and subtracter circuit which is equivalent.to the modification of that of FIG. 27. The output thereof is proportional to Vhd $1 + V_2 - V_3 - V_4$, and it is possible to perform the addition and the subtraction.

Figure 24:
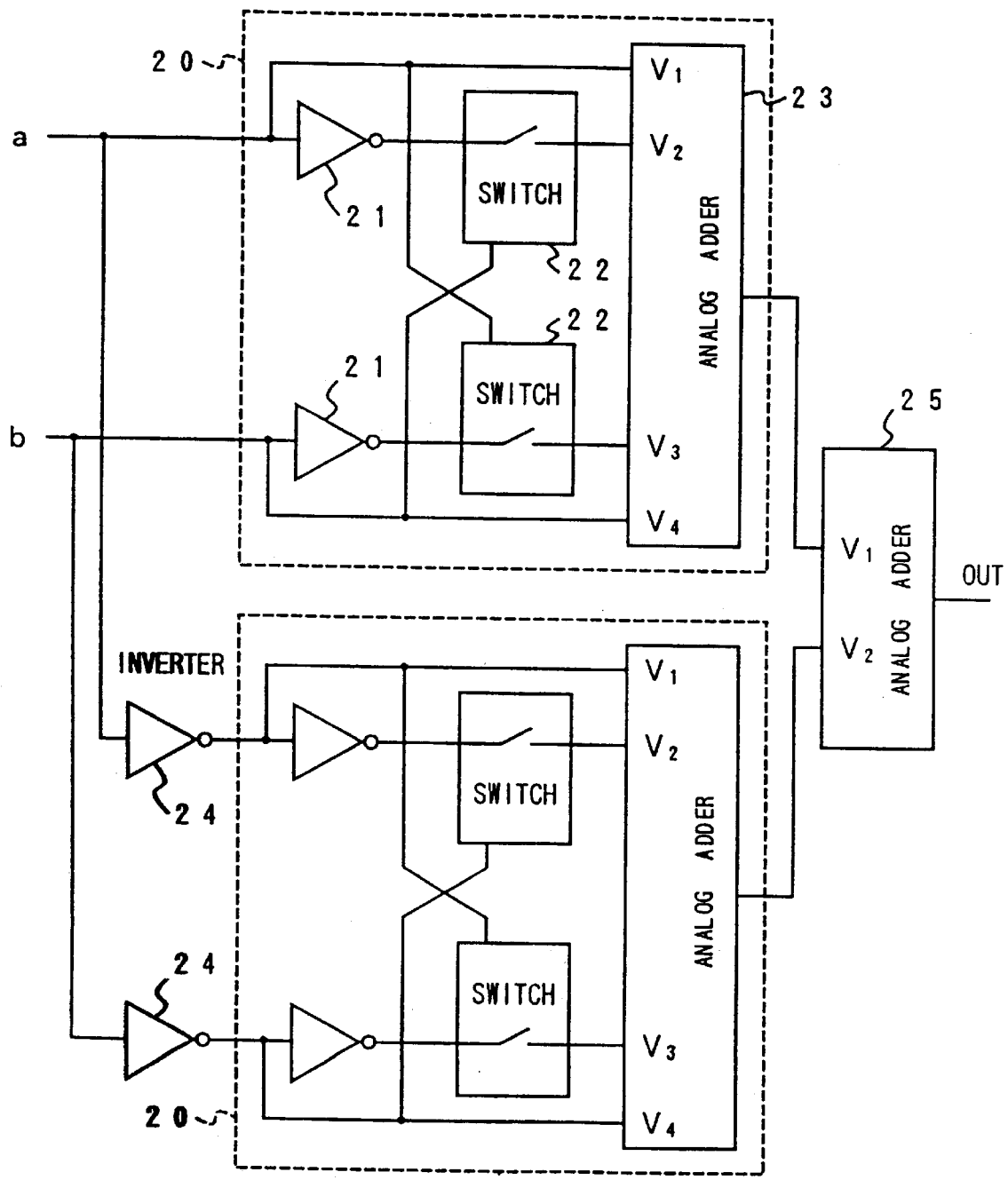
FIG. 24 is a circuit block diagram of an analog circuit for performing a basic operation of the first group according to the present invention.

The circuit of FIG. 24 can be simplified. The analog circuit of FIG. 24 is obtained through rearrangement of the inverters.

Figure 31:
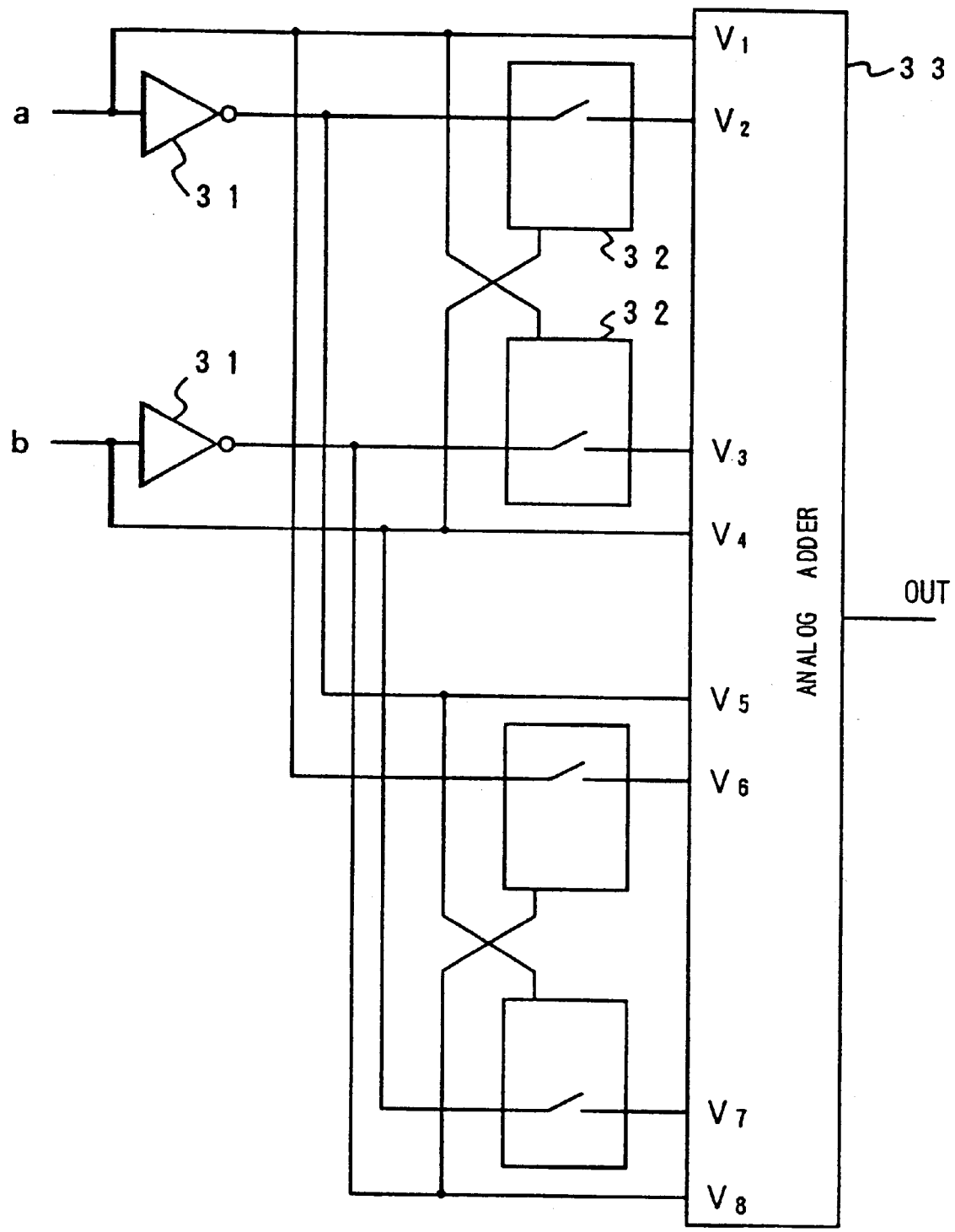
FIG. 31 is a circuit block diagram of an analog circuit in which the circuit shown in FIG. 24 is simplified.
Figure 32:
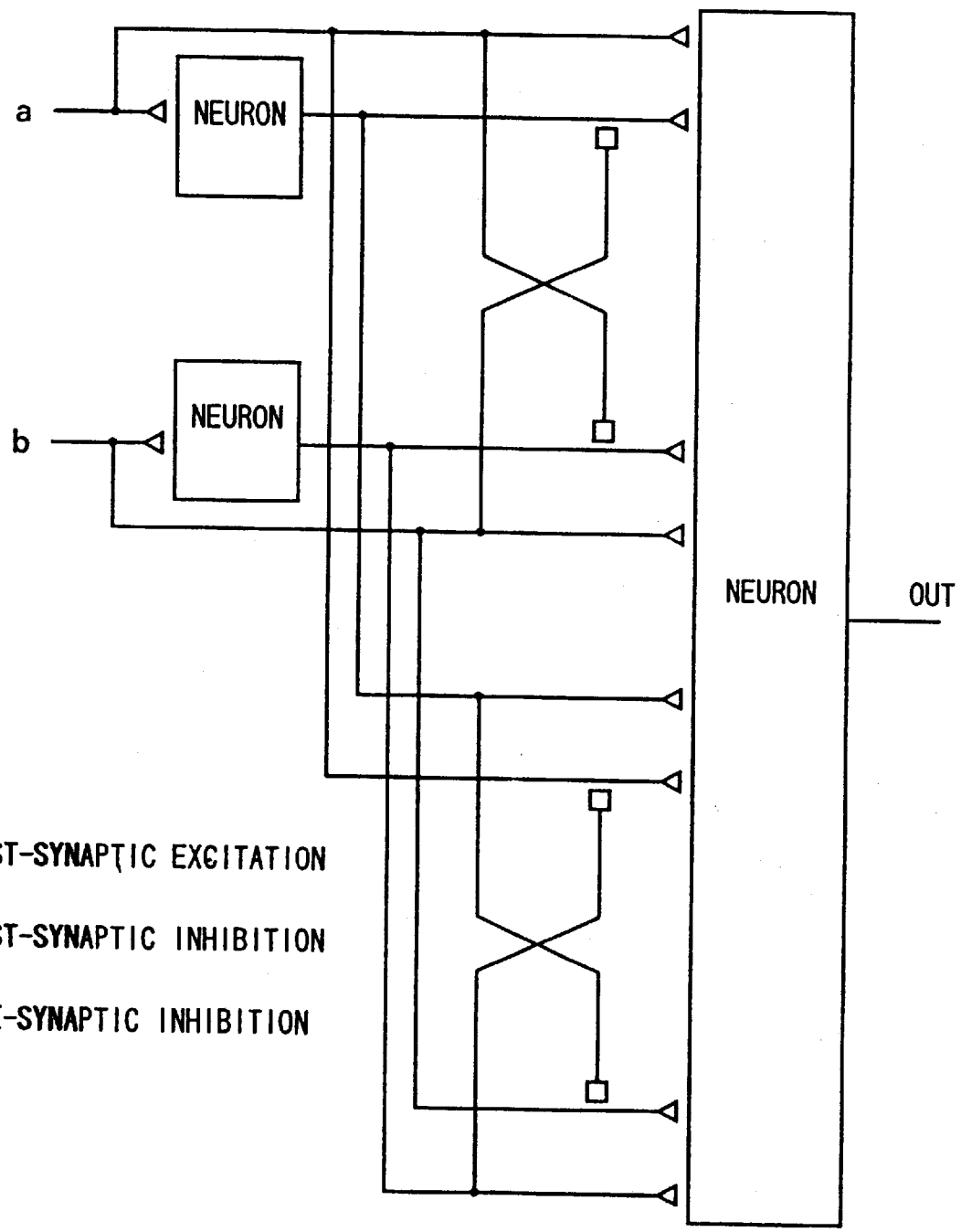
FIG. 32 is a view showing a neural circuit corresponding to the circuit shown in FIG. 31.

This analog circuit corresponds to a "neural circuit for performing a multiplying operation" of cerebrum neurons (FIG. 32). An element operation of the neural circuit is performed by "three types of neuron synapse" corresponding to the electric circuit. That is, the analog adder 33 of the electric circuit (FIG. 31) is implemented by a synapse, which emits an exciting (additional) transfer substance, in the from of a "post-synaptic excitation". The inverter 31 is implemented by a synapse, which emits an inhibitory (subtractive) transfer substance, in the from of a "post-synaptic inhibition". The analog switch 32 is implemented in accordance with a "pre-synaptic inhibition" which shunts an emission of the above-mentioned transfer substance. In the "pre-synaptic inhibition", the positive neural signal serves to shunt the emission of the transfer substance, and the negative and zero signals serve to shunt the emission of the transfer substance. Thus, the "pre-synaptic inhibition" performs the same operation (Table 9) of the analog switch 32. In this manner, the operation of Table 6 is implemented by these synapse functions.

Figure 33:
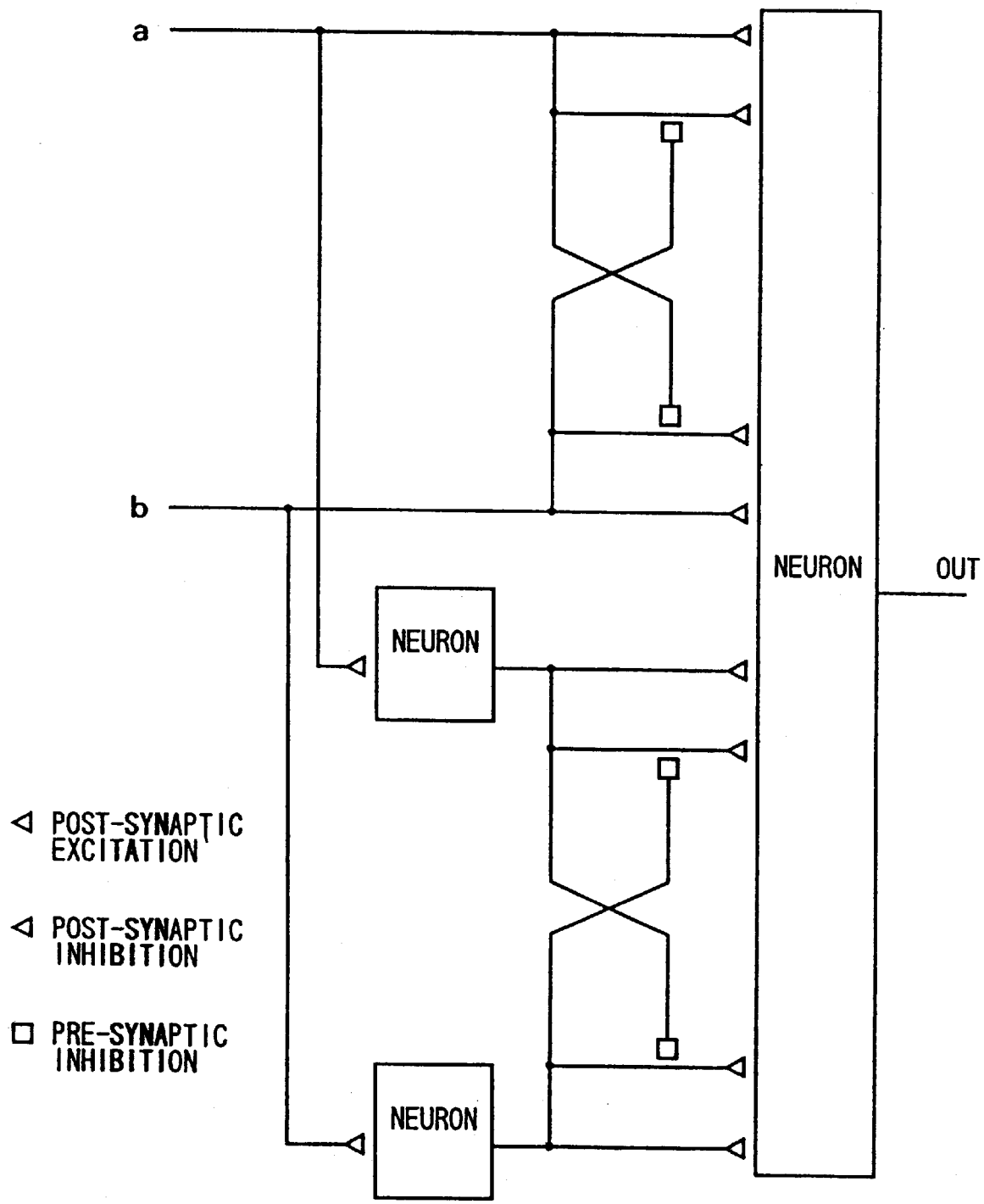
FIG. 33 is a view showing a neural circuit equivalent to the neural circuit shown in FIG. 32.

The circuit of FIG. 32 may be rearranged into a neural circuit shown in FIG. 33. The neurons of this neural circuit are simultaneously subjected to the post-synaptic excitation (additional input) and the post-synaptic inhibition (subtractive input). The neurons of the this neural circuit can be electrically implemented with the adder and subtracter circuits shown in FIG. 29 and 30. Consequently, this neural circuit can be implemented with an electric circuit using the adder and subtracter circuit and an analog switch.

Figure 34:
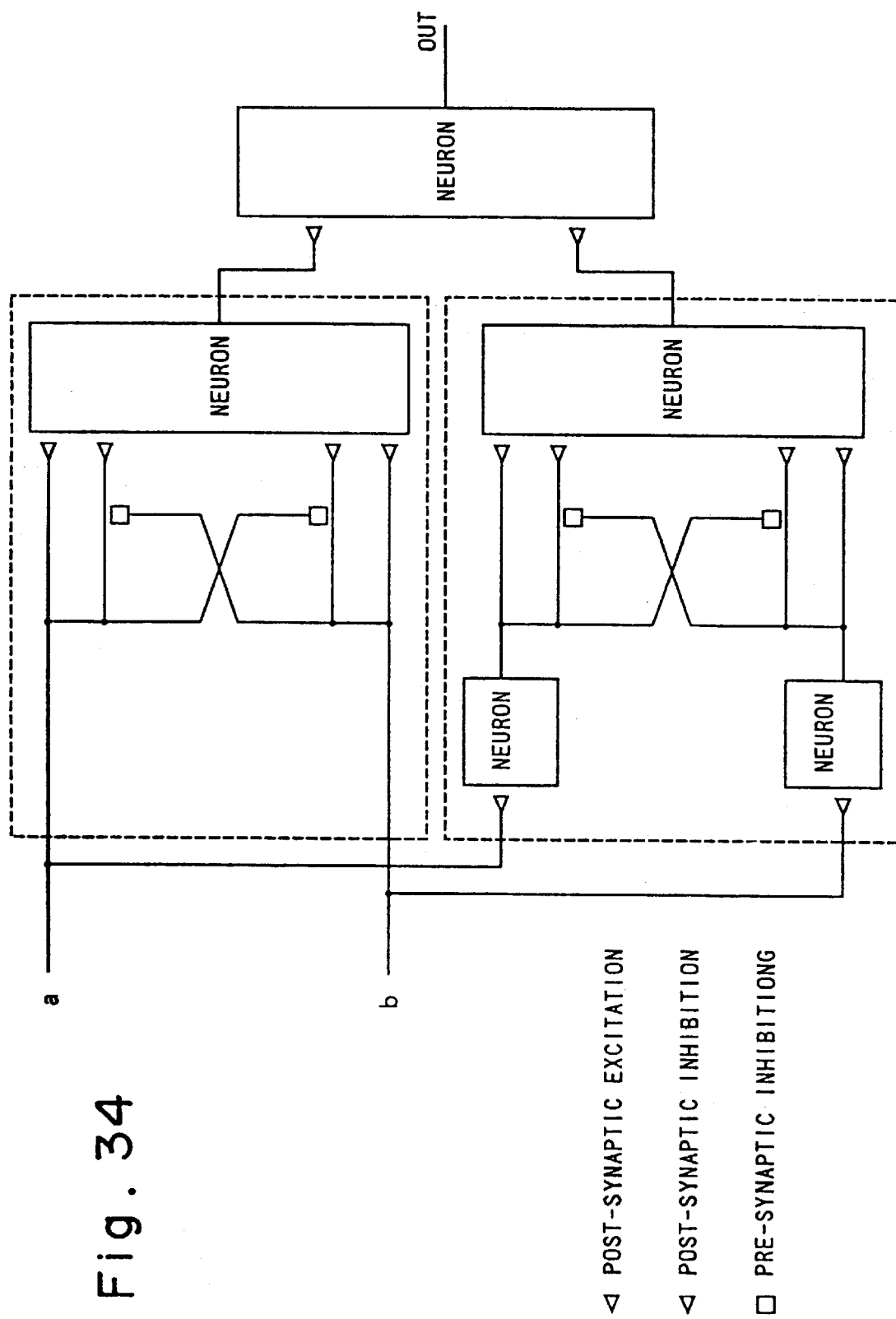
FIG. 34 is a view showing a neural circuit equivalent to the neural circuits shown in FIGS. 32 and 33.

The circuit shown in FIG. 33 is modified into a neural circuit shown in FIG. 34. FIG. 34 represents three types of simple cells to which a response of "cells on which the Hough transform is to be carried out (part (b) of FIG. 43)" is applied. That is, the upper portion encircled with dotted line represents a neural circuit of "'directionally selective (DS) simple cells" which like a light slit impulse', and the lower portion encircled with dotted line represents a circuit of 'DS simple cells which like a dark slit impulse'. The total of the addition of these cells represents a circuit of 'DS simple cells (referred to as a B type simple cell) which respond to slit impulses regardless of light and dark'. This neural circuit can be implemented with an electric circuit using the adder and subtracter circuit and an analog switch, and corresponds to the electric circuit shown in FIG. 24.

Figure 35:
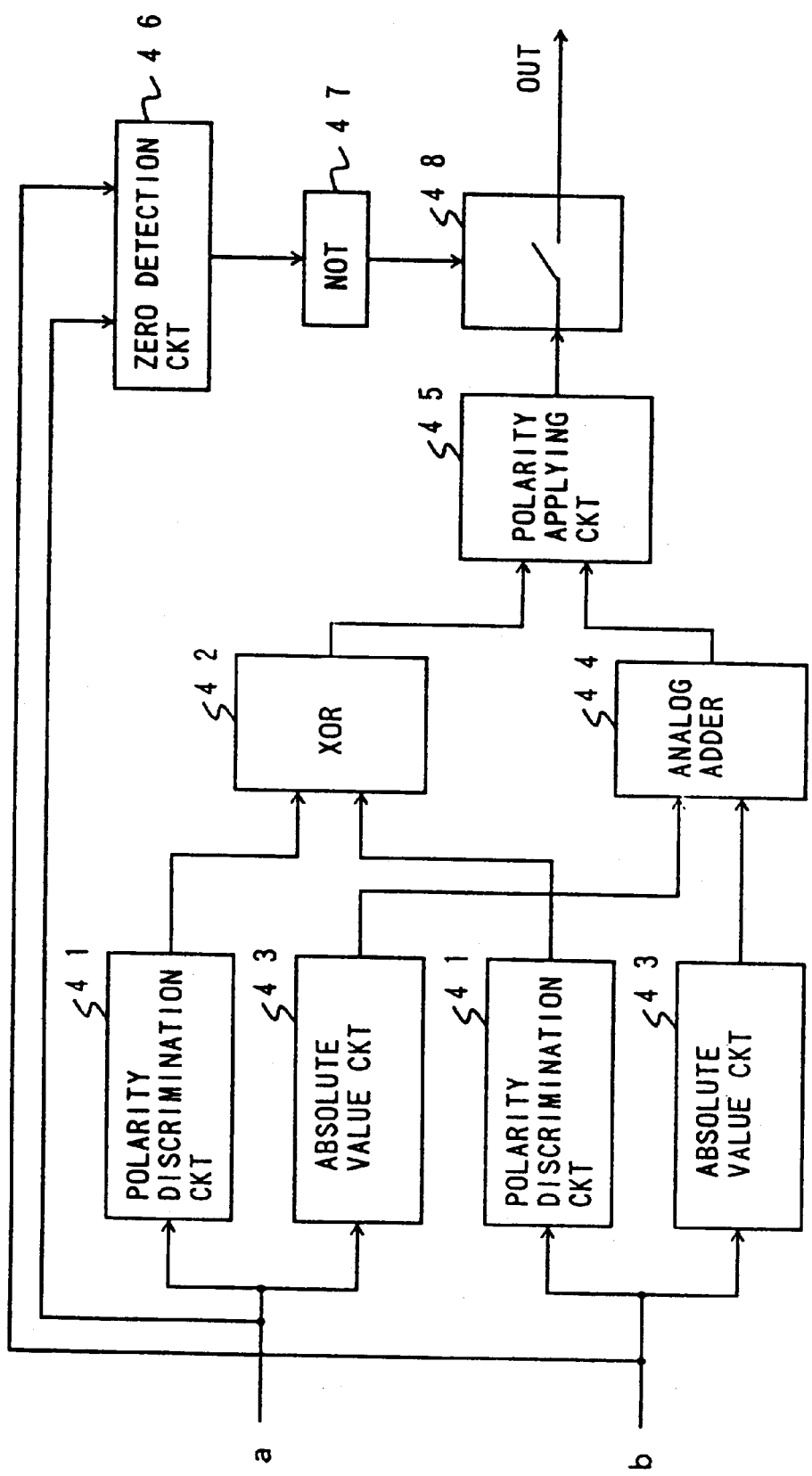
FIG. 35 is a circuit block diagram of a hybrid circuit for performing a basic operation of the first group according to the present invention.
Figure 36:
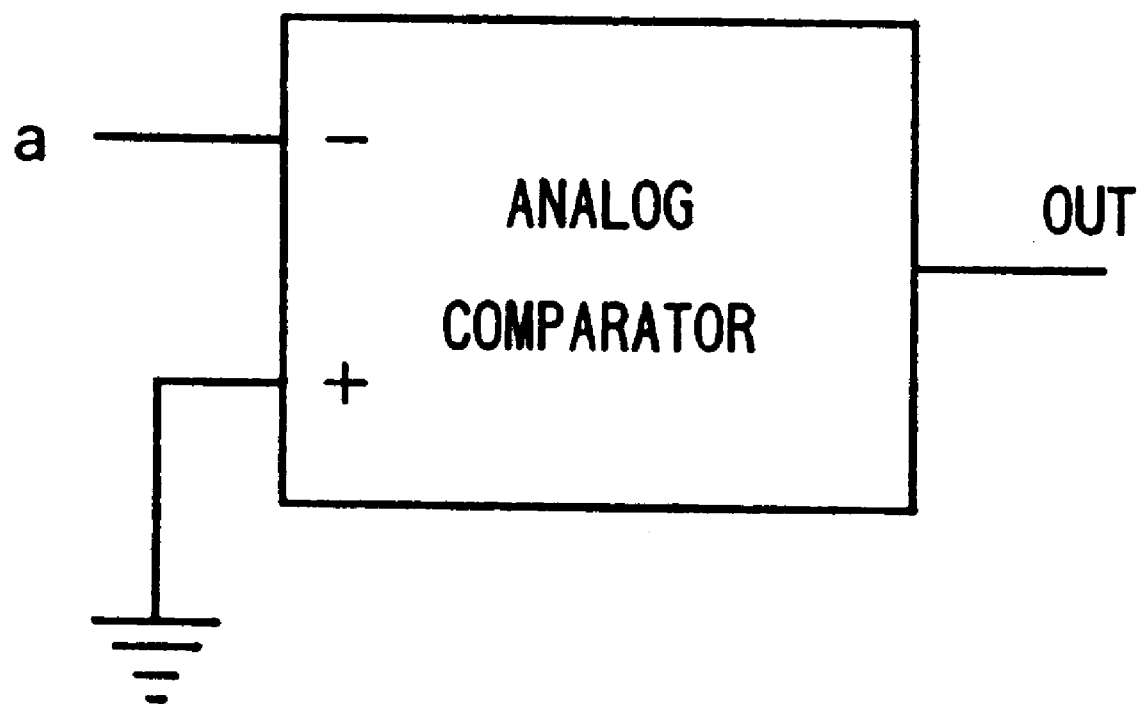
FIG. 36 is a block diagram of an analog comparator.

Incidentally, the operations (Tables 2 and 6) of the first group of the present invention are made by getting a hint from these neural circuits A scheme of Table 2 may be implemented with a hybrid circuit through a combination of the digital basis and the analog basis (FIG. 35). The polarity of the analog input is converted by a polarity discrimination circuit 41 (FIG. 36, Table 10) into the logical signal "0" when the polarity is of the positive and the logical signal "1" when the polarity is of the negative.

TABLE 10

| input a | a > 0 | a $\leq$ 0 |
|---------|-------|-----------|
| output  | 0     | 1         |

Figure 37:
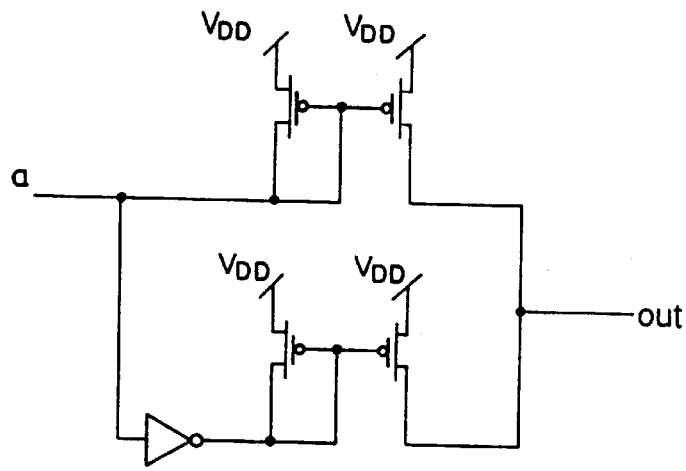
FIG. 37 is a circuit diagram showing exemplarily an absolute value circuit.
Figure 38:
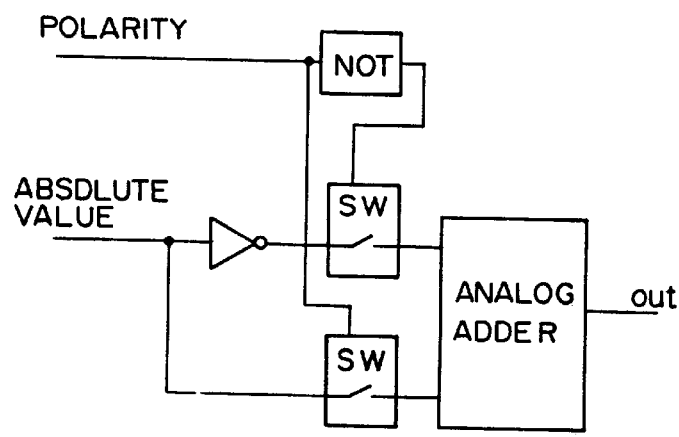
FIG. 38 is a block diagram showing exemplarily a polarity applying circuit.

The output of the polarity discrimination circuit 41 is applied to an XOR circuit 42 to produce a logical signal as an output thereof. On the other hand, the analog inputs a and b are converted by an absolute value circuit 43 (FIG. 37) into the absolute values and then added by an analog adder 44 on an analog basis. Those logical signals and the analog absolute values are fed to a polarity applying circuit 45 (FIG. 38). Finally, through a zero detection circuit 46, a NOT logical circuit 47 and an analog switch 48, the hybrid circuit shown in FIG. 35 generates in its output an output of the polarity applying circuit 45 when both the inputs are not zero, and if not so, generates in its output zero. This hybrid circuit may be used to perform the operation of Table 2.

As mentioned above, there is no need to always satisfy equation (7c). It is acceptable to delete the zero detection circuit 46, the NOT logical circuit 47 and the analog s witch 48 in FIG. 35.

According to the above-mentioned schemes or circuits for implementing the basic operation of the first group of the present invention, it is possible to compute a one-dimensional correlation between two one-dimensional data.

It is assumed that two one-dimensional data sequences are given by $\{a(x)\}$ and $\{b(x)\}$. The one-dimensional correlation between a data sequence in which $\{b(x)\}$ is shifted byA and the data sequence $\{a(x)\}$ is computed, using the operation symbol *, in accordance with the following expression.

$$\Sigma_x a(x) * b(x+\Delta)$$

Here, x is integrated throughout the data or a predetermined area. This makes it possible to obtain the correlation rate similar to the one-dimensional correlation by the product or $\Sigma_x a(x) b(x+\Delta)$.

According to the above-mentioned schemes or circuits for implementing the basic operation of the present invention, it is possible to compute a two-dimensional correlation between two input screens: a (x, y) and b (x, y).

A picture element of one of the two input screens is shifted by $(\Delta_x + \Delta_y)$ on a two-dimensional basis, and the operation * (7(a)–7(c)) referred to in the present invention is carried out with respect to the shifted picture element and a picture element of another of the input screens. When an integration of this operation is performed throughout the picture elements for example, the two-dimensional correlation referred to in the present invention is implemented. This correlation is expressed by equation (8). It is possible to perform a pattern matching through detecting the maximum value of such a correlation. Further, it is possible to measure based on the pattern matching a "movement vector", a "binocular parallax", and a "shift velocity" derived from the movement vector, which are examples of the "difference" as the detection object in the present invention. This respect will be described hereinafter.

Incidentally, it is acceptable that the "screen" mentioned above is generally a two-dimensional data.

It is possible, with the use of the above-mentioned two-dimensional correlation, to detect (pattern matching) small areas, which match with one another between two screens or two two-dimensional data, and also to measure interval vectors between those small areas.

Hereinafter, referring to FIG. 1, there will be explained a method of detecting a small area or a pattern of a screen B which match with a small area or a pattern of a screen A. The small area of the screen B is shifted by $(\Delta_x, \Delta_y)$ on a two-dimensional basis, and the two-dimensional correlation (equation (8)) is calculated with respect to the shifted area and the small area of the screen A. When both the small areas match with one another, the correlation value becomes the maximum. Thus, it is possible to detect the matching between both the small areas. Further, the interval vector between both the small areas is measured in the form of a shift vector $(\Delta_{x0}, \Delta_{y0})$ in which the correlation value becomes the maximum.

Figure 39A:
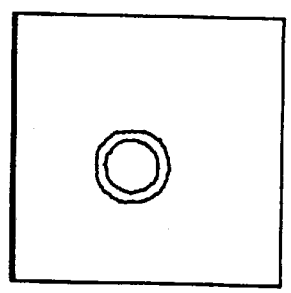
FIG. 39(A) and FIG. 39(B) are each an illustration of a screen for a simulation.
Figure 39B:
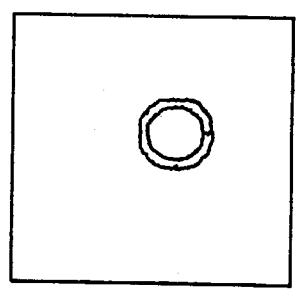
Figure 40:
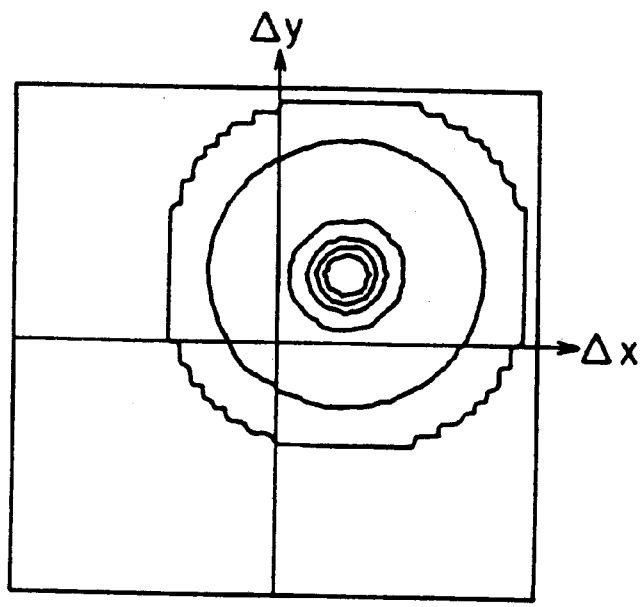
FIG. 40 is a contour map of a correlation rate obtained through a simulation according to the present invention.

FIG. 39(A) and FIG. 39(B) to FIG. 41 show each a result of a computer simulation for the two-dimensional correlation mentioned above. FIG. 39(A) and FIG. 39(B) show illustrations in which the circles of screens A and B locate at mutually different positions. The correlation of equation (8) is computed through moving the screen B by various shift vectors $(\Delta_x, \Delta_y)$. FIG. 40 is a contour map of correlation values thus obtained. A peak appears at the position $(\Delta_{x0}, \Delta_{y0})$ on the contour map. This peak indicates that when the screen B is shifted by $(\Delta_{x0}, \Delta_{y0})$, the screen B matches with the screen A. Consequently, detection of this peak makes it possible to detect that the matching patterns (circles) exist in both the screens. Further, it is possible to measure the interval vector between the matching patterns in the form of the coordinate of the peak position. It has been confirmed that according to the operations of the present invention the pattern matching is performed exactly.

Figure 41:
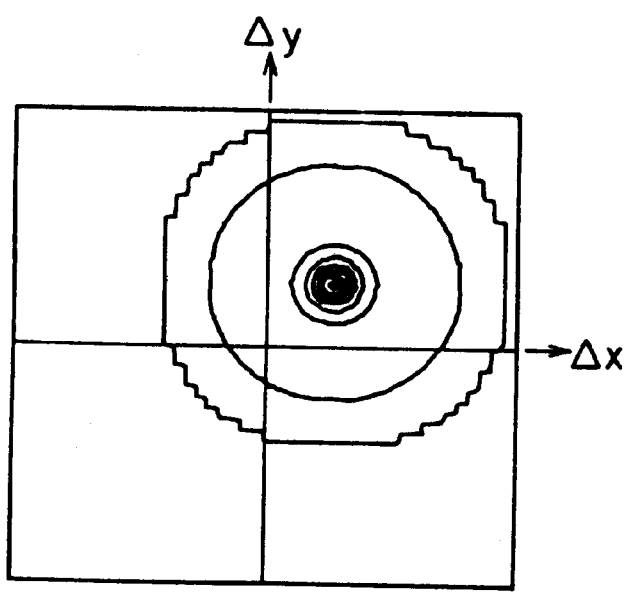
FIG. 41 is a contour map of a correlation rate obtained through a simulation using the product according to the conventional scheme.
Figure 55:
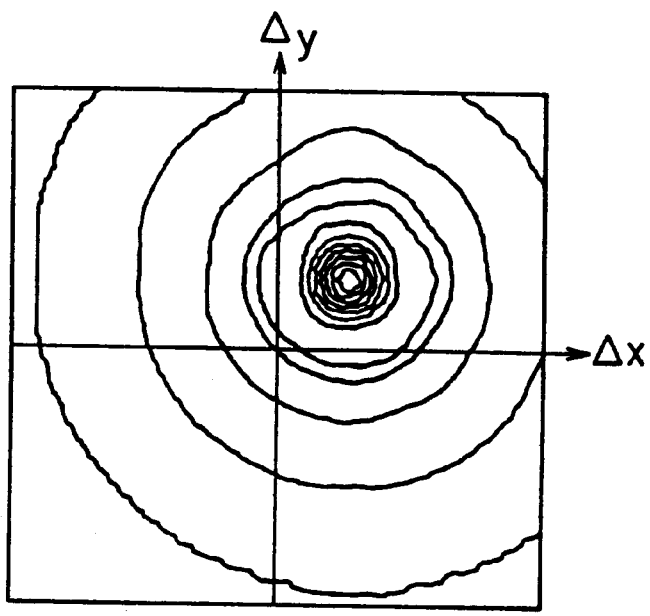
FIG. 55 is a contour map of a correlation rate obtained through a simulation according to the present invention.
Figure 56:
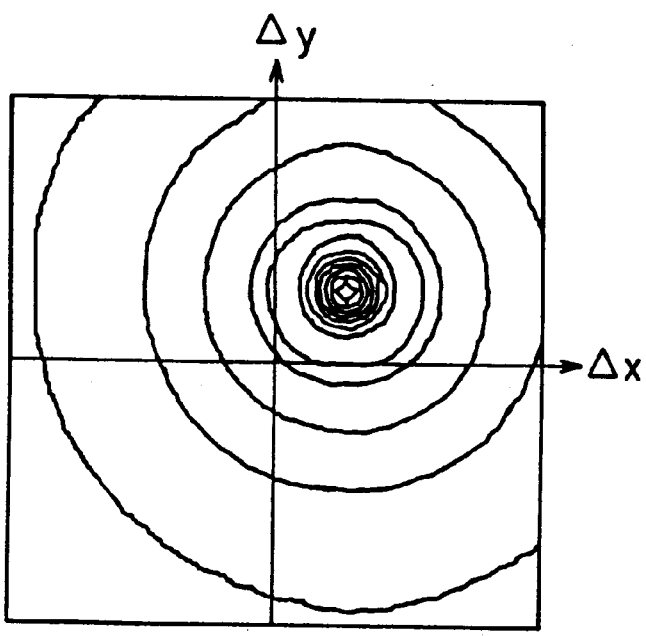
FIG. 56 is a contour map of a correlation rate obtained through a simulation using the product according to the conventional scheme.

FIG. 41 shows a result of a simulation of a correlation (equation (5)) using the product. As compared with that of FIG. 40, it would be understood that while the peak position is identical, the shape is different in such a way that the sharp peak appears. This difference is caused by a difference between the computations according to the "product" and the "sum of absolute values of both the inputs". However, when the image is inputted through a differentiation, there is obtained the almost same map as one another including the shape of the peak. Consequently, it is understood that the operations (equation (7a)–(7c)) of the present invention is analogous to the function of the "product". This will be described later (FIGS. 55 and 56).

The above-mentioned pattern matching makes it possible to detect small areas, which match with one another in the previous screen and the present screen, with respect to the dynamic image, and also to measure the "movement vector" in the form of the interval vector between those small areas.

The small area of the previous screen is shifted by $(\Delta_x, \Delta_y)$, and the two-dimensional correlation (equation (8)) with the small area of the present screen is computed. Through the pattern matching, it is detected in the form of the peak of the correlation value that the matching small areas exist in both the screens. Further, it is possible in the form of the peak position $(\Delta_{x0}, \Delta_{y0})$ to measure the interval vector (or movement vector) between the matching small areas.

It is possible to use the movement vector thus determined for a dynamic picture compression.

The small area of the previous screen is shifted by the determined movement vector and is displayed in the form of the small area of the present screen. Thus, the "movement compensation" of the dynamic picture is effected, so that an amount of communication can be extremely compressed.

When the movement vector is divided by the time interval between both the screens, a shift velocity is measured. It is possible to control a mobile robot and a motorcar on the basis of the shift velocity. When arithmetic on the two-dimensional correlation is performed, it is acceptable that a screen to be shifted by $(\Delta_x, \Delta_y)$ is selected as the present screen, and also that both the screens are simultaneously shifted.

The above-mentioned pattern matching makes it possible to detect small areas, which match with one another in the screens of the right and left cameras, and also to measure the "binocular parallax" in the form of the interval vector between those small areas. The small area of the left screen is shifted by $(\Delta_x, \Delta_y)$, and the two-dimensional correlation (equation (8)) with the small area of the right screen is computed (cf. FIG. 42). Through the above-mentioned pattern matching, it is detected in the form of the peak of the correlation value that the matching small areas exist in both the screens. Further, it is possible in the form of the peak position $(\Delta_{x0}, \Delta_{y0})$ to measure the interval vector (or binocular disparity) between the matching small areas. It is acceptable that a screen to be shifted by $(\Delta_x, \Delta_y)$ is selected as the right screen, and also that both the screens are simultaneously shifted.

There is proposed a method in which the Hough transform and the element correlation are used to measure a distance between the straight lines having the same slant in two screens (cf. Japanese Patent Application Laid Open Gazette Hei.6-44364, and Transaction J78-D-II of the IEICE of Japan, pp.147–157, 1995). According to that proposals, when a matching of the straight line pattern is performed, the correlation is computed using the "product". This may be also done using the scheme and the circuit according to the present invention.

This scheme will be schematically explained referring to FIG. 43. It is assumed that the straight lines of the input screens A and B are spaced apart from one another by $\Delta d$ (part (a) of FIG. 43). A dotted line in screen A denotes a straight line of screen B in order to clearly show the distance $\Delta d$. Both the screens are subjected to the Hough transform processing (part (b) of FIG. 43). In accordance with the characteristic of Hough transform, the straight lines of the input screens are converted into one point of the Hough plane $(\rho, \theta)$. The $\rho$-coordinate is equivalent to the position (speaking exactly, the shortest length from the original point to the straight line) of the straight line, and the $\theta$-coordinate is equivalent to the slant (direction) of the straight line. The parallel straight lines on the input screens are converted into the points each having the same $\theta$-coordinate on the Hough plane. Consequently, the interval $\Delta d$ between the parallel lines is converted into the difference $\Delta d$ between the $\rho$-coordinates of "two points each having the same $\theta$-coordinate". This property makes it possible to measure on a one-dimensional basis the interval or the distance between the "straight lines having the same slant within the input screens" in the form of a difference between the ρ-coordinates.

It is possible to measure a difference in ρ-coordinates in accordance with the element correlation. According to the above-mentioned proposal, there is used the element correlation according to the product. It is assumed that the signal intensity on the Hough plane corresponding to screen A is expressed by a (ρ, θ) and the signal intensity on the Hough plane corresponding to screen B is expressed by b (ρ, θ). Further, assuming that the signal intensity at the position where b (ρ, θ) is shifted by Δ in the ρ-direction is expressed by b (ρ+Δ, θ), the element correlation is expressed in the form of the product of a(ρ, θ) and b(ρ+Δ, θ) as follows.

$$C(\rho, \theta, \Delta) = a(\rho, \theta) b(\rho+\Delta, \theta) \quad (17)$$

Since this correlation has three parameters (ρ, θ, Δ), it is displayed on a three-dimensional space (part (c) of FIG. 43).

This element correlation becomes the maximum when the shift vector Δ equals "straight line interval Δd of input screen". Consequently, the interval or the space between the straight lines is measured in the form of the coordinateΔ of the point where the maximum correlation appears in a three-dimensional space. The coordinates ρ and θ involved in the maximum correlation are equivalent to the position and the slant of the straight line in screen A, respectively. Thus, it is possible to measure the straight line interval in both the screens, the position and the slant through the Hough transform and the element correlation of equation (17).

Now, let us adopt the operation * according to the present invention instead of the "product" used in the correlation mentioned above. In this case, the element correlation is expressed by $$C(\rho, \theta, \Delta) = a(\rho, \theta) * b(\rho+\Delta, \theta) \quad (18)$$

where the operation * is defined by equations (7a)–(7c).

Figure 44A:
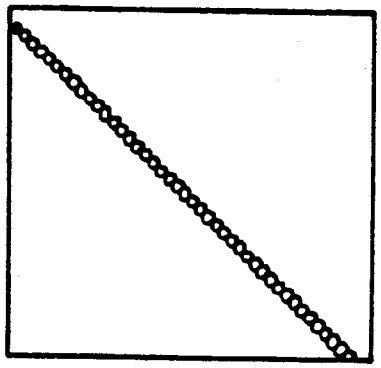
FIGS. 44(A) and FIG. 44(B) are each an illustration of a screen for a simulation.
Figure 44B:
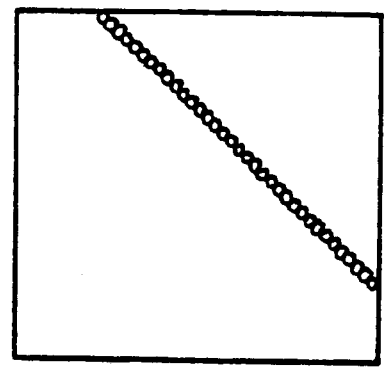
Figure 45:
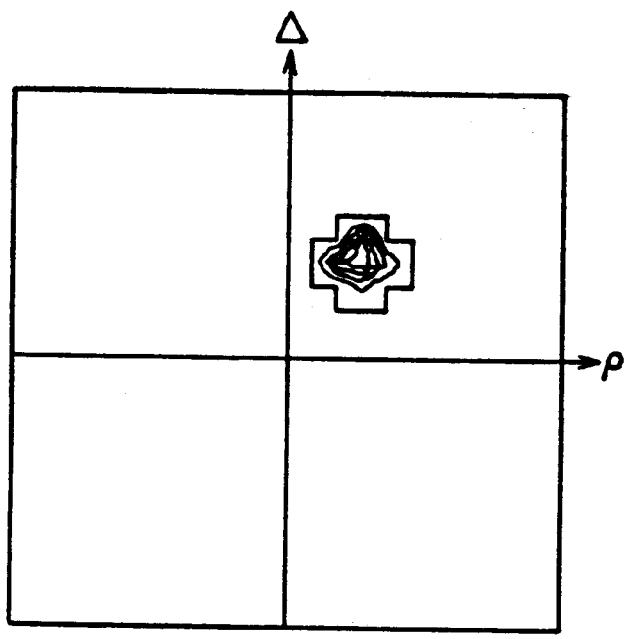
FIG. 45 is a contour map of a correlation rate obtained through a simulation according to the present invention.

FIG. 44(A) and FIG. 44(B) to FIG. 45 show each a result of a computer simulation for the element correlation mentioned above. FIG. 44(A) and FIG. 44(B) show illustrations in which the straight lines of screens A and B are the same as one another in the slant, but different from one another in the position. The screens A and B were subjected to the Hough transform. The element correlation of equation (18) was performed on ρ-coordinate data having the sameθ-coordinate value. The section (ρ, Δ) of the correlation C(ρ, θ, Δ) is indicated in FIG. 45 by the contour map. The peak appears in the contour map. The Δ-coordinate of this peak equals the straight line interval of the input screens. Thus, it is possible to measure the straight line interval of both the input screens in the form of the coordinate Δ of the point where the maximum correlation appears through the Hough transform and the element correlation.

Figure 46:
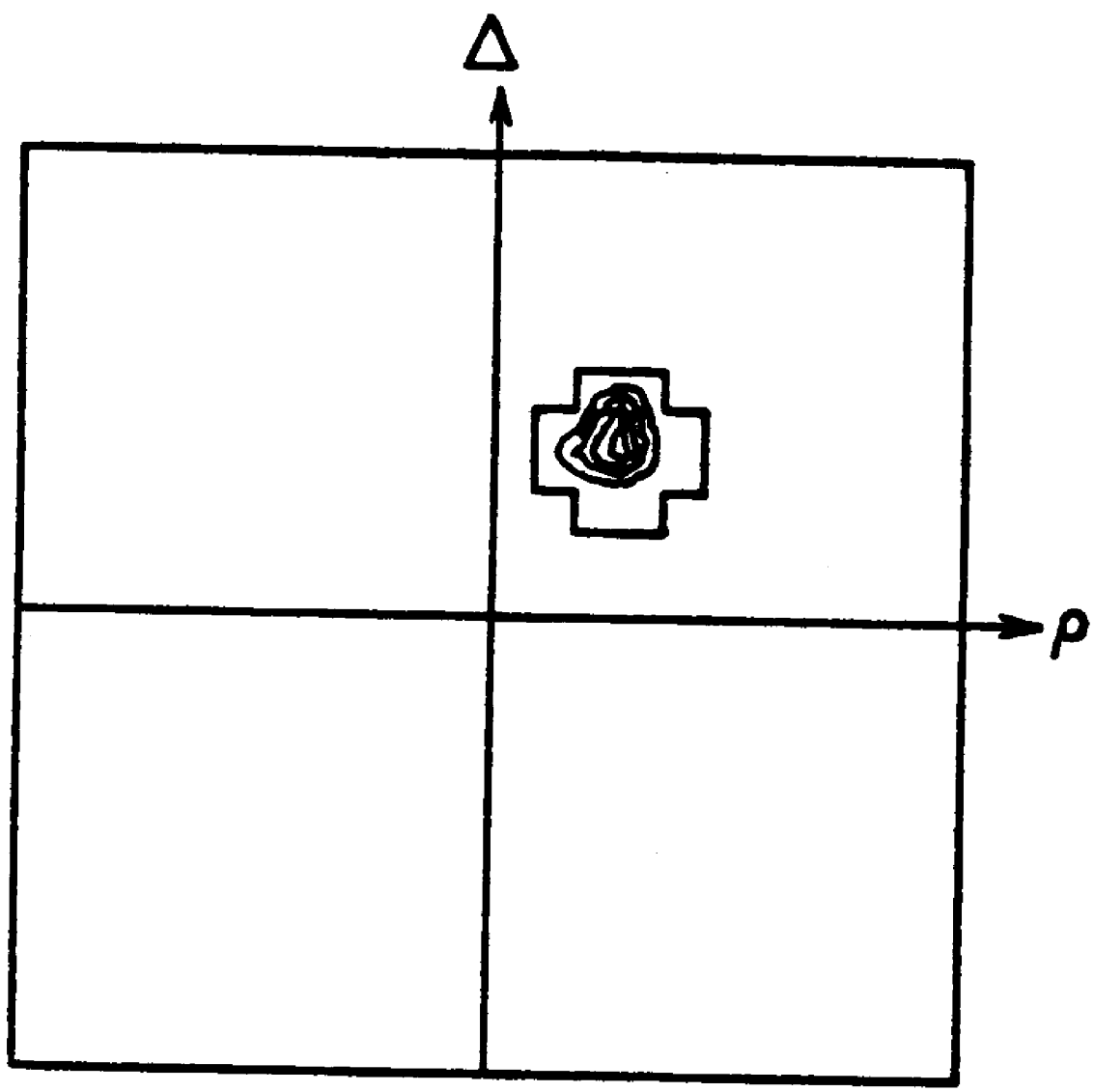
FIG. 46 is a contour map of a correlation rate obtained through a simulation using the product according to the conventional scheme.

FIG. 46 shows a result of a simulation for the correlation (equation (17)) using the product for the purpose of comparison. Its contour map is very similar to the map (FIG. 45) obtained through the operation according to the present invention. The operation according to the present invention is based on the "sum of absolute values (equations (7a)–(7c))". Hence, the peak in FIG. 45 is somewhat loose in the sharpness.

When the three-dimensional data (ρ, θ, Δ) obtained through the above-mentioned manner are integrated in the ρ-axis direction and then subjected to the inverse-Hough transform, a result approximately equivalent to the two-dimensional correlation can be obtained (cf. Technical Report NC92-47 of the IEICE of Japan, 1992, Transaction J78-D-II of the IEICE of Japan, pp.147–157, 1995, and Japanese Patent Application Laid Open Gazette Hei.6-44364). According to those documents, the correlation is computed using the "product". The similar two-dimensional element correlation may be also done using the operation * according to the present invention, instead of the "product".

Using the above-mentioned series of transforms (Hough transform+element correlation+theρ -axis direction accumulation and the inverse-Hough transform), it is possible to detect small areas matched in two screens (pattern matching), and also to measure the interval vector between those small areas.

This scheme will be explained schematically referring to FIG. 47. Let us consider an input screen including five straight lines (part (a) of FIG. 47). Only screen A is indicated. Through the Hough transform and the element correlation, five straight lines are transformed into five points in the three-dimensional space (ρ, θ, Δ)(part (b) of FIG. 47). The three-dimensional data are integrated in the ρ-axis direction so that they are transformed into five points along the sine wave in the (θ, Δ) plane (part (c) of FIG. 47). The (θ, Δ) plane data are subjected to the inverse-Hough transform so as to be transformed into ($\Delta_x$, $\Delta_y$) plane data. The signal intensity of each point of this plane corresponds to the associated two-dimensional correlation rate of equations (5) or (8). The sine wave on the (θ, Δ) plane is extracted through the inverse-Hough transform, so that a large signal intensity appears on one point on the ($\Delta_x$, $\Delta_y$) plane (part (d) of FIG. 47). The coordinate ($\Delta_{x0}$, $\Delta_{y0}$) equals the interval vector between the matched small areas in both the screens. Consequently, in accordance with a series of transformation mentioned above, it is possible to detect the small areas matched with one another in two screens through the existence of a peak of the plane. Further, it is possible to measure the interval vector between the small areas in the form of the coordinate ($\Delta_{x0}$, $\Delta_{y0}$) of the peak. Incidentally, the signal obtained through the above-mentioned "accumulation" is the same as one in which the "ρ-axis data on the (ρ, θ) plane subjected to the Hough transform as to the input screen" is subjected to the one-dimensional correlation process using the operation of the present invention.

Figure 48:
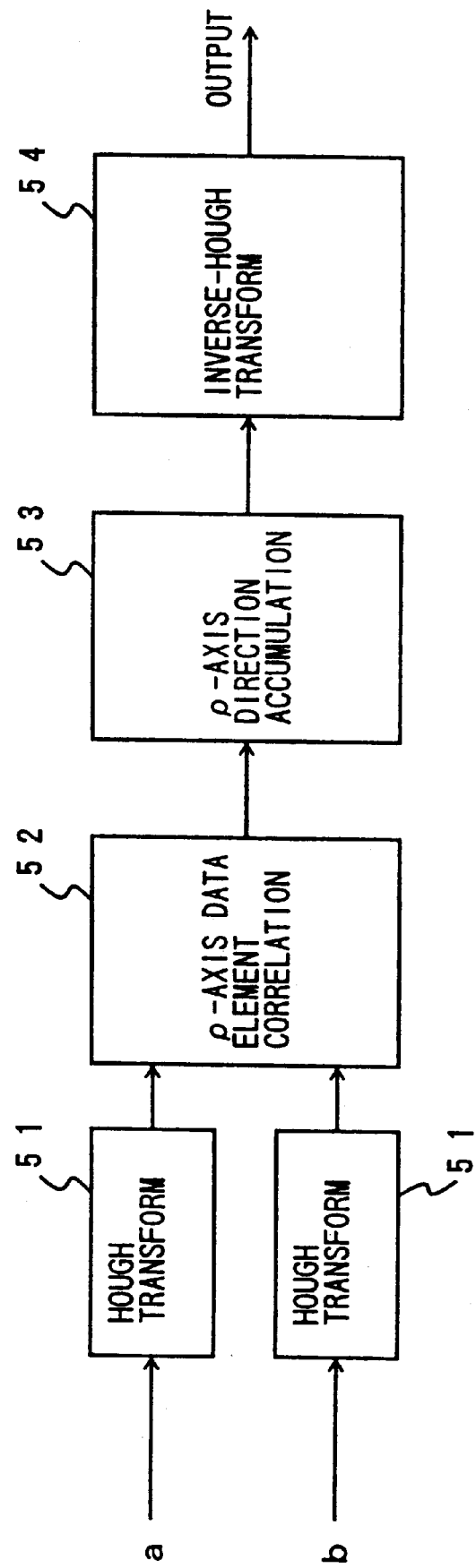
FIG. 48 is a block diagram useful for understanding a scheme of detecting a locational difference using the Hough transform.

FIG. 48 shows an embodiment for implementing this processing. Inputs a and b are processed by Hough transform units 51, respectively, and then the element correlation of "ρ-axis data having the sameθ coordinate value" is computed by a ρ-axis data element correlation unit 52. A ρ-axis direction accumulation unit 53 performs an accumulation in the ρ-axis direction. An inverse-Hough transform unit 54 processes the output of the ρ-axis direction accumulation unit 53. The Hough transform, the ρ-axis direction accumulation and the inverse-Hough transform are implemented on an addition basis only. Hence, this embodiment can be implemented also with the analog circuit using the analog adders shown in FIGS. 26–30. The combination of the ρ-axis data element correlation unit 52 and the ρ-axis direction accumulation unit 53 may provide a one-dimensional correlation unit for performing a one-dimensional correlation using the operation of the present invention.

Figure 49:
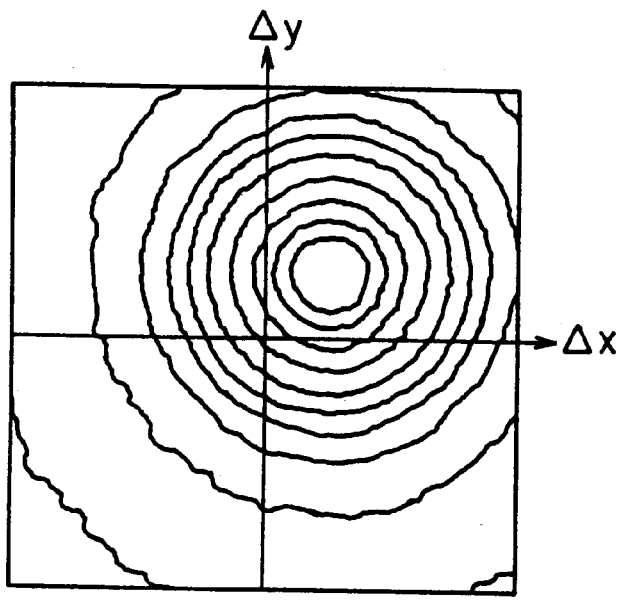
FIG. 49 is a contour map of a correlation rate obtained through a simulation according to the present invention.

FIG. 49 shows a result of a computer simulation for a series of transform as mentioned above. In this simulation, the element correlation was computed in accordance with equation (18) using the operation * of the present invention. As the input screen, one shown in FIG. 39 was used. A peak appear on the ($\Delta_x$, $\Delta_y$) plane. The peak position ($\Delta_{x0}$, $\Delta_{y0}$) equals the interval vector of the circular figure, and the pattern matching is exactly performed.

Figure 50:
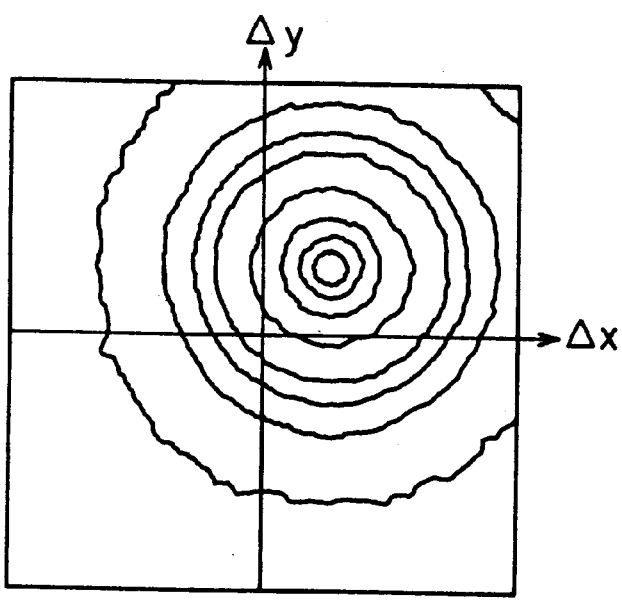
FIG. 50 is a contour map of a correlation rate obtained through a simulation using the product according to the conventional scheme.
Figure 68:
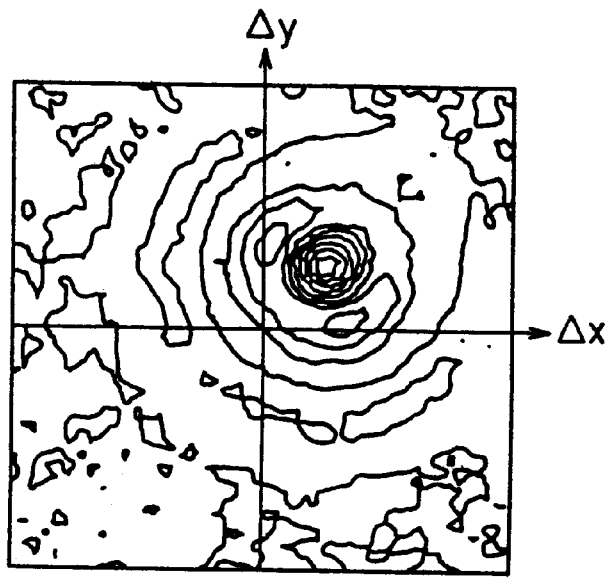
FIG. 68 is a contour map of a correlation rate obtained through a simulation according to the present invention.
Figure 69:
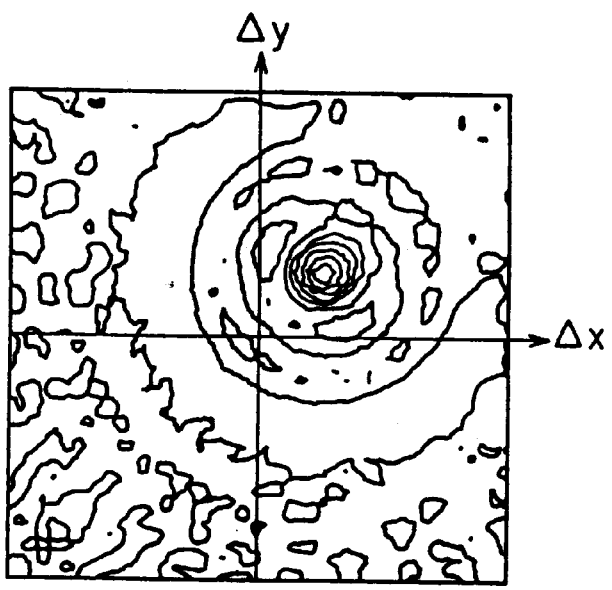
FIG. 69 is a contour map of a correlation rate obtained through a simulation using the product according to the conventional scheme.

FIG. 50 shows a result of a simulation according to the correlation (equation (17)) using the product. Its contour map is very similar to the map (FIG. 49) obtained through the operation according to the present invention. In other words, the product can be replaced by the operation according to the present invention. The operation according to the present invention is based on the "sum of absolute values of both the inputs". Hence, the peak in FIG. 45 is somewhat loose in the sharpness. However, when the image is inputted through a differentiation, there is obtained the almost same map as one another. Consequently, it is understood that the operations of the present invention is analogous to the function of the "product". This will be described later (FIGS. 68 and 69).

Now let us compare a series of transform mentioned above with the two-dimensional correlation (equations (5) and (8)) directly performed using no Hough transform. In the comparison of the maps of FIGS. 49 and 50 with the maps of FIGS. 40 and 41 according to the two-dimensional correlation performed using no Hough transform, it would be understood that while the peak position is identical, the shape is different. However, when the image is inputted through a differentiation, there is obtained the almost same map as one another. Consequently, it is understood that both the processings are almost equivalent to one another. This will be described later.

Figure 47:
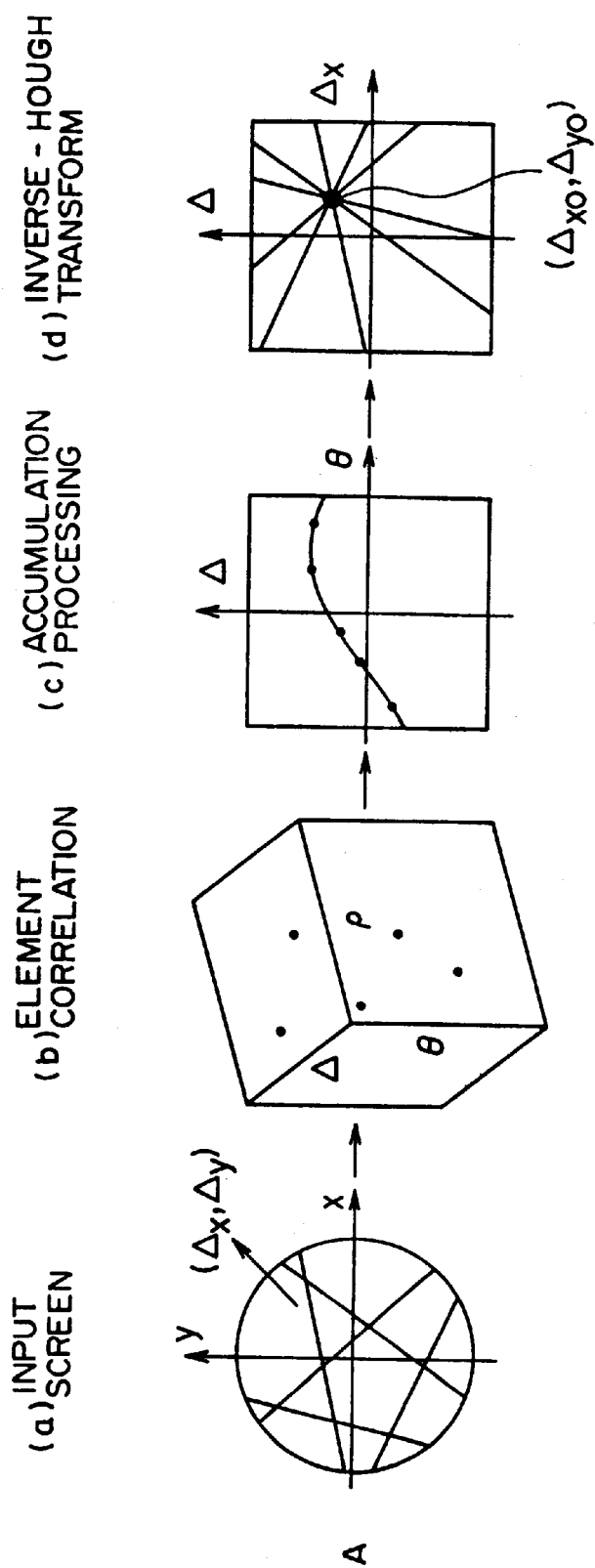
FIG. 47 is an explanatory view useful for understanding a scheme of detecting a locational difference using the Hough transform.

It is possible to measure the "movement vector" of the dynamic image also in accordance with a scheme of the pattern matching using the Hough transform, which was explained referring to FIGS. 47 and 48, instead of the scheme of the pattern matching using no Hough transform. This allows a dynamic image compression system in which a movement is compensated. Further, it is possible to measure also the "binocular disparity" from the screens of the right and left cameras.

After the Hough transform is carried out on two screens, the element correlation is computed on θ-coordinate data having the identical ρ-coordinate value.

There is proposed a method (cf. Japanese Patent Application Laid Open Gazette Hei.6-44364) of measuring a difference between the straight lines having the identical ρ-coordinate in their slant in the two screens. According to this document, the element correlation is defined using the product as follows.

$$C(\rho, \theta, \Delta)a(\rho, \theta)b(\rho, \Delta+\theta) \quad (19)$$

Using the operation of the present invention, this is computed in the form of $$C(\rho, \Delta)=a(\rho, \theta)*b(\rho, \Delta+\theta) \quad (20)$$

Figure 51:
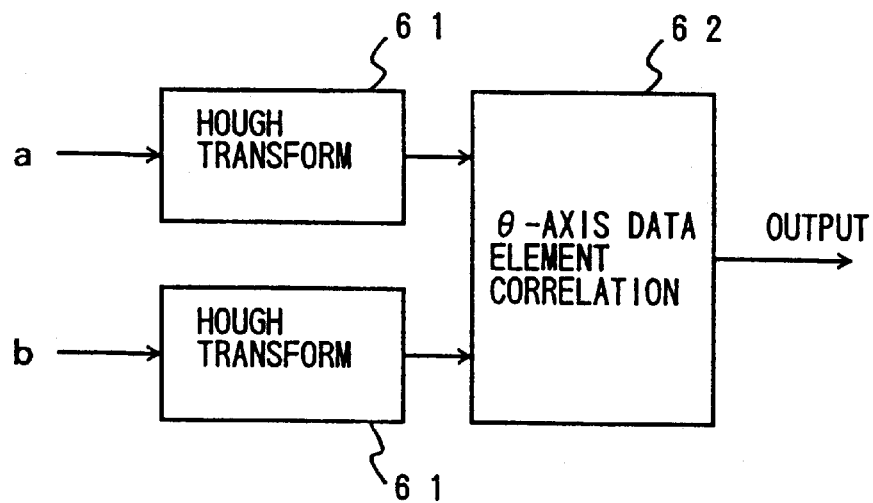
FIGS. 51 and 52 are each a block diagram useful for understanding a scheme of detecting a rotational difference using the Hough transform.
Figure 52:
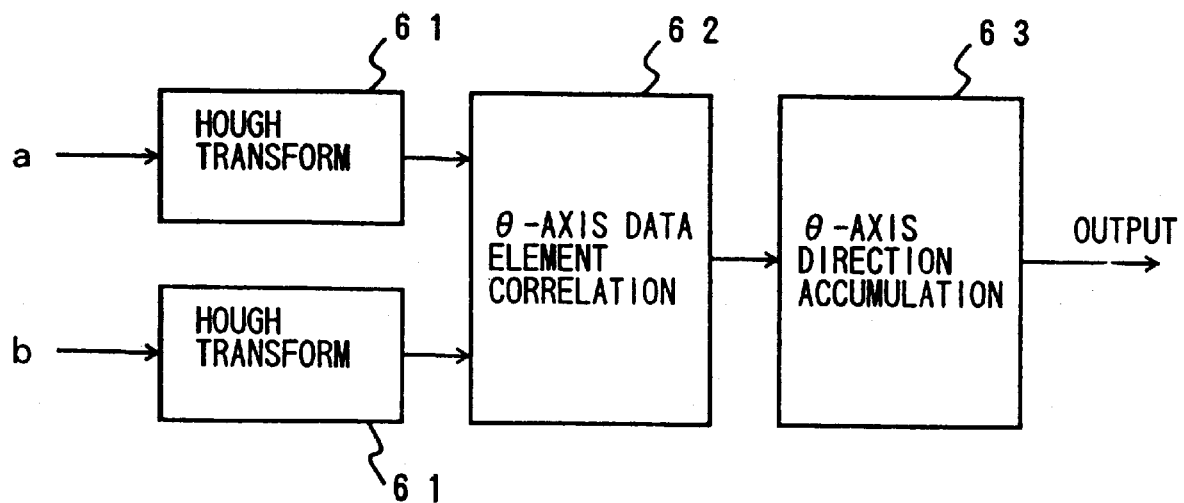

FIG. 51 shows an embodiment for this processing. A Hough transform unit 61 processes inputs a and b. Then, an element correlation unit 62 computes the element correlation on the "θ-coordinate data having the identical ρ-coordinate value". Thus, it is possible to measure an angle of rotation as to straight line-to-straight line which equalone another in distance ρ from the original point. As shown in FIG. 52, a θ-axis direction accumulation unit 63 accumulates the element correlation $C(\rho, \theta, \Delta)$ in the θ-axis direction and computes aθ-axis direction one-dimensional correlation. Thus, it is possible to detect from among straight line groups each having the identical ρ-coordinate the "all straight line pairs different in the slant by Δ in two screens".

Image data fed from a camera generally comprises only positive signals, but does not the negative. If the above-mentioned correlation is practiced on such image data, only the positive signals are outputted. This involves some problems to be solved. The first of all relates to such a problem that the correlation value is affected by a luminance. The correlation value increases as the luminance increases, thereby involving overflow. This is a problem in detection of the maximum correlation. The second problem is that the correlation value is affected by noises. The output of the positive signals only does not serve to cancel the noises. This causes the correlation values to be biased according as the noise intensity increases, whereby a detection of the maximum correlation becomes insecure. The third problem is that the image having a slow change in luminance involves a loose peak of the maximum correlation. This arises a problem as to accuracy in the peak extraction.

These problems are solved when the input data are differentiated and then the correlation is performed. The variation in the uniform luminance is removed through a space differentiation, and thus the first problem is solved. Next, dealing with the second problem, when the noises are differentiated, the noises are converted into signals which are of the positive and negative ones. The correlation using the "product" or the "operation of the present invention (Table 2)" is performed on the resultant signals involved in both the positive and the negative. As a result, in accordance with the properties of Table 1 and Table 2, matching in polarity causes the positive signal to be derived, and mismatching in polarity causes the negative signal to be derived. In case of the noises, the pixels matched in polarity and the pixels mismatched in polarity are approximately even in the number. Consequently, the positive and the negative are mutually cancelled, so that the correlation due to the noises is cancelled. On the other hand, with respect to the signals, there is outputted the correlation rate which is not varied in magnitude as compared with that involving no noises. In this manner, the second problem is also solved. In the "correlation (equation (6)) using the absolute value of difference", it is noted that the noises are not cancelled because the negative correlation value is not derived. Regarding the third problem, input data is differentiated so as to be converted into the sharp data. The use of such sharp data makes it possible to derive a sharp correlation peak. Further, the differentiation of the input data is effective also in the point that a plurality of objects in the image are separated for a pattern matching. Since the negative signals are generated around each object through the differentiation, there is suppressed an interference among the "two-dimensional correlation peak corresponding to the plurality of objects". Thus, a degree of separation of the pattern matching is improved. While the above embodiment is explained referring to the image data, it is acceptable to replace the image data by the general two-dimensional data.

While the above explanation was made simply with the differentiation, generally, the "convolution with the filter function" is adopted. A one-dimensional convolution is expressed as follows.

$$conv\ (x)=\Sigma_u a(x-u)f(u) \quad (21)$$

where f (x) is a filter function a (x) is a one-dimensional data u is accumulated throughout data A two-dimensional convolution is expressed as follows.

$$conv\ (x, y)=\Sigma_u\Sigma_v a(x-u, y-v)F\ (u, v) \quad (22)$$

where F (x, y) is a filter function a (x, y) is a two-dimensional data u and v are accumulated throughout data The one-dimensional correlation, which is carried out after two pieces of one-dimensional data are differentiated, is useful for a signal processing in communications.

Figure 53:
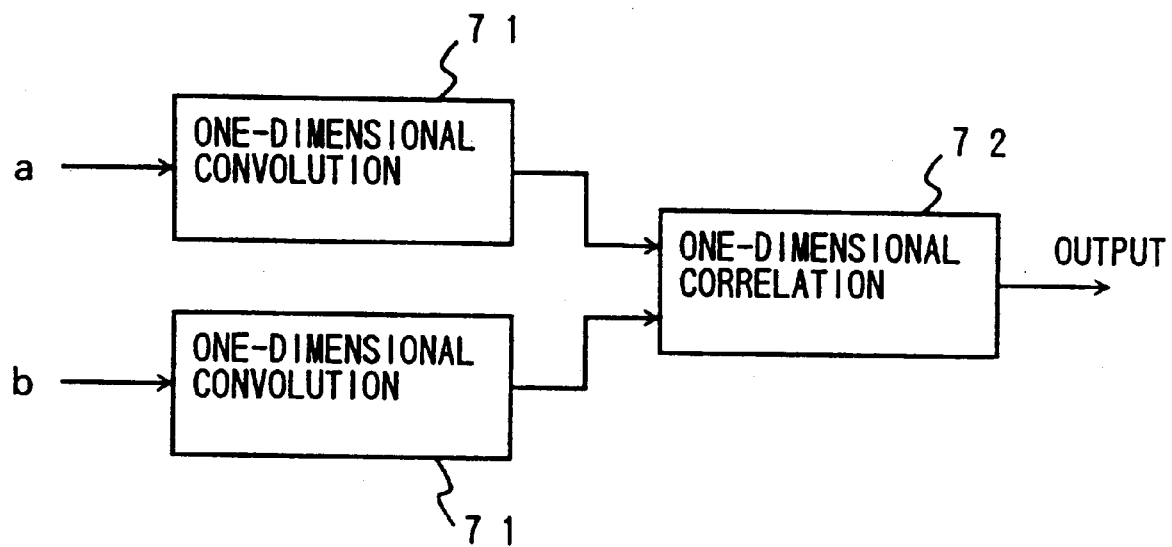
FIG. 53 is a block diagram useful for understanding a one-dimensional correlation scheme involving a convolution operation.

FIG. 53 shows an embodiment as to the one-dimensional correlation. One-dimensional data a and b are applied to a one-dimensional convolution arithmetic unit 71 to perform the one-dimensional convolution (equation (21)). Thereafter, a one-dimensional correlation unit 72 computes and outputs the one-dimensional correlation.

Figure 54:
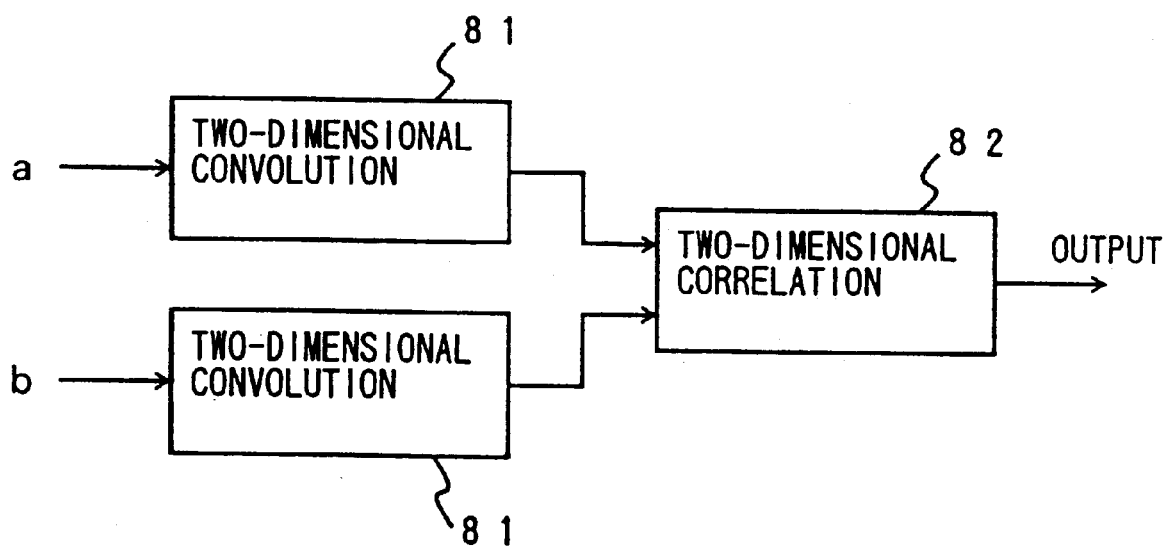
FIG. 54 is a block diagram useful for understanding a two-dimensional correlation scheme involving a convolution operation.

FIG. 54 shows an embodiment as to the two-dimensional correlation. Two-dimensional data a and b are applied to a two-dimensional convolution arithmetic unit 81 to perform the two-dimensional convolution (equation (22)). Thereafter, a two-dimensional correlation unit 82 computes and outputs the two-dimensional correlation.

FIG. 55 shows a result of the computer simulation for this correlation. In the simulation, as the input screens, the same ones shown in FIGS. 39 (A) and 39(B) were adopted, and as the filter function of the convolution, the following equation (23) was used.

$$F(x, y) = exp(-(x^2+y^2)/s^2) - 0.326\, exp(-(x^2+y^2)/(1.75s)^2) \qquad (23)$$

Equation (23) is the "difference of Gaussian function" known as the outline emphasis filter. Where parameter s is 2.

First, both the screens are converted into the differentiation screens through practicing the convolution according to equation (22). Next, the screen B is moved by various shift vectors ($\Delta_x$, $\Delta_y$) and the correlation of equation (8) is computed. The correlation rate thus obtained is plotted with respect to shift vectors ($\Delta_x$, $\Delta_y$) so as to tabulate the contour map (FIG. 55). The netting portion indicates the negative signal intensity, and the non-netting portion indicates the positive signal intensity. In the contour map (FIG. 55), there appears a positive sharp peak. The peak position ($\Delta_{x0}$, $\Delta_{y0}$) equals the interval vector of the circular figure, and it is indicated that the pattern matching is exactly performed.

It will be noticed that this peak is different in the pattern from the peak (FIG. 40) involved in the process of only the two-dimensional correlation. First, there appear the negative rings around the peak. This negative response is induced with the differentiation by the convolution, and serves to solve the above-mentioned second problem (noise inhibition). This effect is confirmed by FIGS. 58 and 59. It is noted that this negative response does not appear on the correlation (equation (6)) by the "absolute value of the difference". Next, it is pointed out that the sharp peak appears owing to the differentiation. This makes it possible to solve the third problem.

Now, let us compare the "two-dimensional correlation (equation (8)) according to the operation of the present invention" with the "two-dimensional correlation (equation (5)) according to the product". The two-dimensional correlation according to the product was computed (FIG. 56) after the two-dimensional convolution (equation (22)). As seen from both the maps, the contour map of FIG. 56 is almost the same as that of the FIG. 55. This indicates that the operations (equations(7a)–(7c)) of the present invention is analogous to the function of the "product". The sharpness of the peak is approximately the same as the diameter of the center of the differential filter (equation (23)).

Figure 57A:
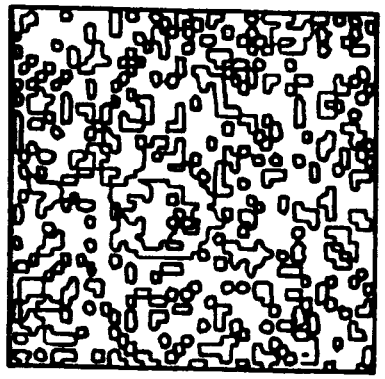
FIG. 57(A) and FIG. 57(B) are each an illustration of a screen for a simulation in which noises are superposed.
Figure 57B:
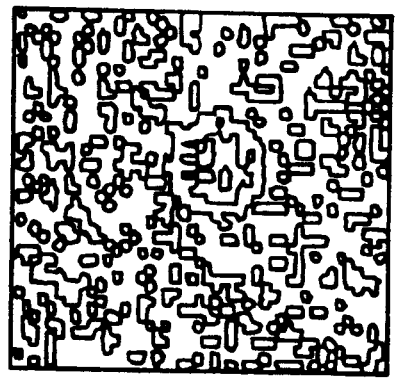
Figure 58:
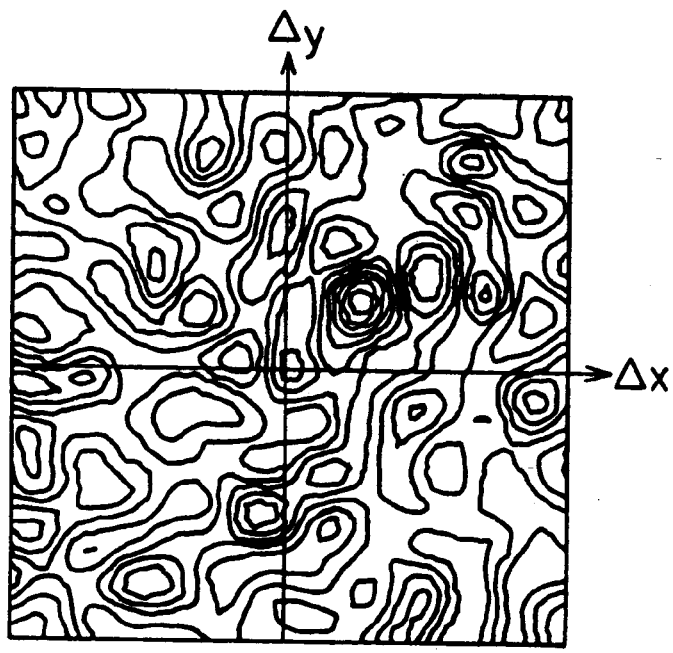
FIG. 58 is a contour map of a correlation rate obtained through a simulation according to the present invention.
Figure 59:
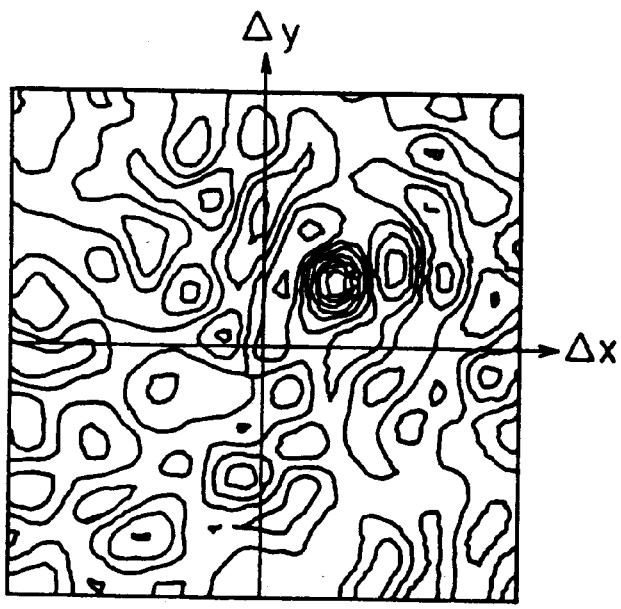
FIG. 59 is a contour map of a correlation rate obtained through a simulation using the product according to the conventional scheme.

Now let us estimate an influence of noises. The input image (FIG. 57) is formed by means of superposing noises on the image shown in FIG. 39. FIG. 58 shows a contour map made up through computing two-dimensional correlation. From the contour map of FIG. 58, it will be understood that the correlation of the positive and the negative is cancelled to be small as mentioned above, and the positive sharp peak appears at the same position as that in case of no noises existing (FIG. 55). In this manner, according to the "two-dimensional correlation after the differentiation", it is possible to remarkably improve noise resistance property. Next, the two-dimensional correlation according to the operation of the present invention is compared with the two-dimensional correlation according to the product. FIG. 59 shows a contour map made up through computing the "two-dimensional correlation (equation (5)) according to the product" after the two-dimensional convolution (equation (22)). As seen from both the maps, the contour map of FIG. 59 is almost the same as that of the FIG. 58. This indicates that the operations (equations (7a)–(7c)) of the present invention is analogous to the function of the "product" also in case of the existence of noises.

Figure 60:
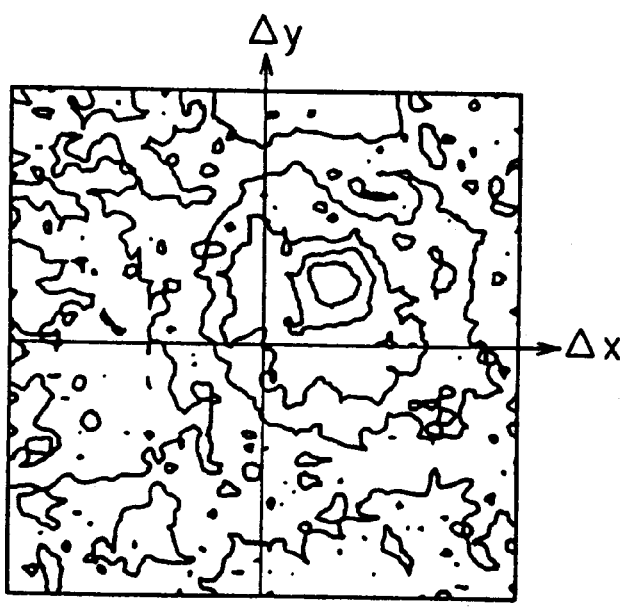
FIG. 60 is a contour map of a correlation rate obtained through a simulation according to the present invention.
Figures 61, 62, 63:
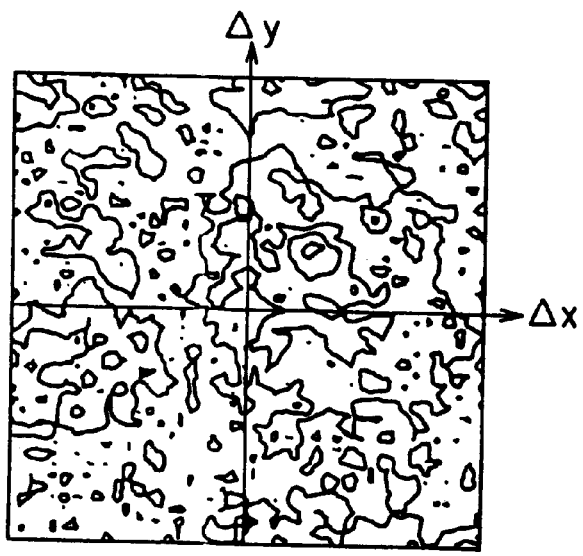
FIG. 61 is a contour map of a correlation rate obtained through a simulation using the product according to the conventional scheme.
FIGS. 62 and 63 are each an illustration of a filter given with an integer in the value.

In order to confirm the effect of the differentiation to noises (two-dimensional convolution), FIG. 60 shows a contour map involved in case (equation (5)) of the two-dimensional correlation only without performing the differentiation. In this case, as mentioned above, there appears no negative correlation value. As a result, noises are not cancelled. The large two-dimensional correlation value is biased owing to the noises, so that the peak becomes relatively very small. And it is "noisy" in its entirety. As compared with FIG. 58, it will be understood that the effect of the differentiation is great. FIG. 61 shows the map associated with the two-dimensional correlation (equation (5)) by the product. As compared with FIG. 59, likewise, it will be understood that the effect of the differentiation is great. Also according to the map associated with the "two-dimensional correlation (equation (6)) by the absolute value of the difference", the large two-dimensional correlation value is biased owing to the noises, so that the peak becomes relatively very small. And it is "noisy" in its entirety. In this case, for the reasons as mentioned above, the differentiation of the image does not so serve to reduce an influence of noises.

In accordance with the above-mentioned embodiments, the two-dimensional convolution (equation (22)) using the product is computed. On the other hand, with respect to the filter (for example, FIG. 62) given with an integer in the value, an adder-subtracter can be used to perform the convolution. It is sufficient for the filter value "−1" to perform the subtraction, and for the filter value "8" to perform the addition eight times. Hence, the addition and subtraction are performed 16 times for each pixel. The number of times (16 times) is very few as compared with the number of times of addition of the "two-dimensional convolution (equation (8)) to be carried out next". This involves no neck in processing. In the analog circuit, the use of an adder-subtracter (FIG. 29 and FIG. 30) having 16 inputs permits such a computation to be performed at one time of operation.

A filter shown in FIG. 63 is useful for the image in which the variation is loose in a luminance. This filter is formed in such a manner that its corners are rounded similar to the concentric filter associated with equation (8). In accordance with this filter, for the filter value "−1", the subtraction is performed, and for the filter value "12", the addition is performed twelve times. For parts of the blank, nothing is done. Hence, the addition and subtraction are performed 24 times for each pixel.

Figure 64:
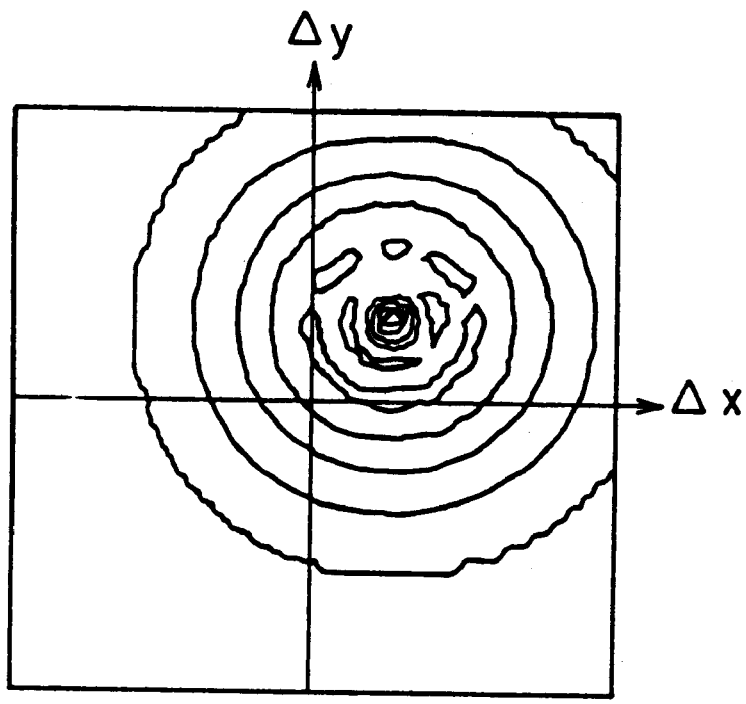
FIG. 64 is a contour map of a correlation rate obtained through a simulation according to the present invention.

FIG. 64 shows a contour map which is made up through performing a computation explained referring to FIG. 54 using the integer value filter shown in FIG. 63. As the input images, ones shown in FIGS. 39 (A) and 39 (B) were used. In the map, the positive sharp peak appears involving the negative ring around the positive sharp peak. This indicates that the differentiation has been performed also on the integer value filter. The peak position ($\Delta_{x0}$, $\Delta_{y0}$) equals the interval vector of the circular figure, and it is indicated that the pattern matching is exactly performed.

Figure 65:
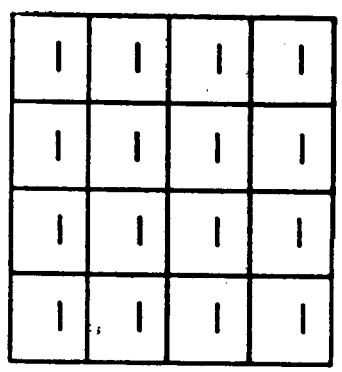
FIG. 65 is an illustration of a low-pass filter.

As compared with the map (FIG. 55) which is associated with a real number value filter, it will be understood that the peak has become further sharp. The reason why this is so down is that the central part (the value: 12) of the filter used is small (one pixel). If there is a need to provide a map which is similar to that shown in FIG. 55, it is sufficient to arrange the "low-pass filter (e.g. FIG. 65) having the same width as the central part of the real number value filter (equation (23))" after the integer value filter.

Consequently, the pattern matching is exactly performed using the adder-subtracter and the adder (without using the multiplier) in accordance with the integer value filter.

Figure 66:
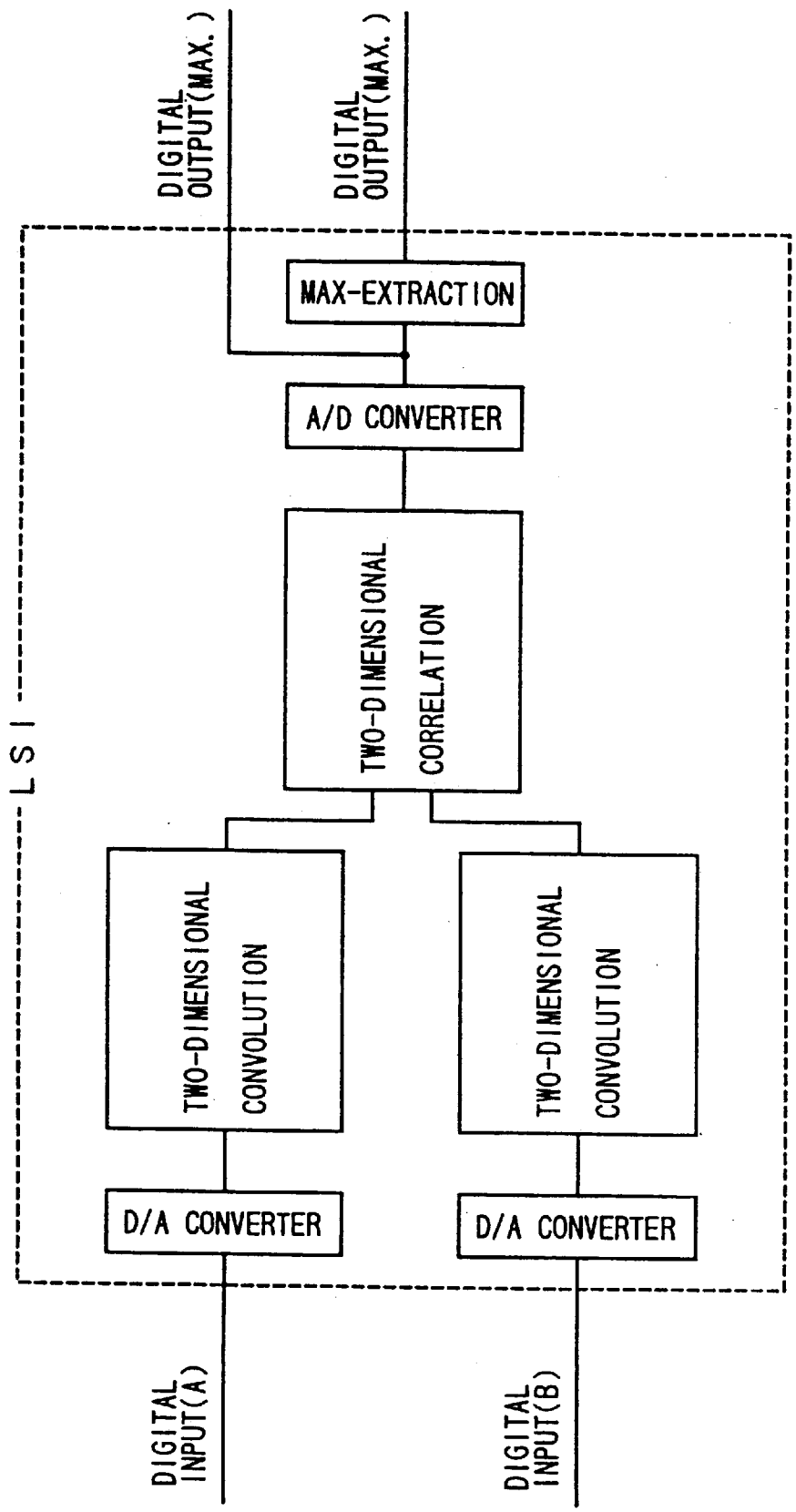
FIG. 66 is a circuit block diagram showing exemplarily an arrangement of the analog LSI adapted to perform an arithmetic operation involved in FIG. 54.

FIG. 66 shows exemplarily an arrangement of an analog LSI adapted to perform an arithmetic operation involved in FIG. 54. Input and output to the analog LSI are performed on a digital basis. The digital input is converted into an analog component by a D/A converter. Next, a two-dimensional convolution of the integer value filter (e.g. the filter used in the simulation) is carried out by a multi-input analog adder-subtracter (e.g. FIGS. 29 and 30). In case of the filter value "−1", the input is applied to a subtraction terminal. On the other hand, in case of the filter value "12", the input is separated into 12 branches and then applied to the associated one of the addition terminals. Thus, the convolution is computed at one time operation of the analog adder-subtracter. The signals thus obtained are fed to a two-dimensional correlation unit so that the correlation expressed by equation (8) is executed by an analog circuit. Finally, the correlation is outputted in the digital form through conversion by an A/D converter, and also the maximum value is extracted and outputted in the digital form. In this manner, the use of the analog adder-subtracter, the analog adder and the analog switch permits the operation of FIG. 54 to be carried out, without using the multiplier.

Figure 67:
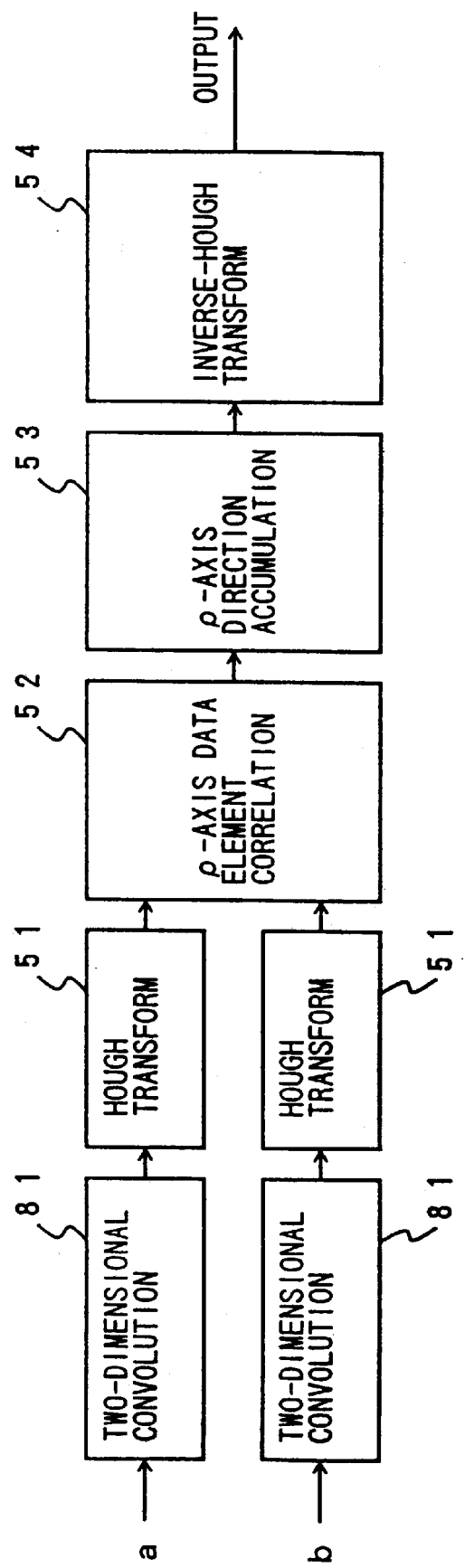
FIG. 67 is a block diagram useful for understanding a scheme of detecting a locational difference using the Hough transform.

FIG. 67 shows an arrangement having a two-dimensional convolution arithmetic unit at the preceding stage of the system shown in FIG. 48. Two-dimensional data a and b are fed to a two-dimensional convolution arithmetic unit 81 so that a two-dimensional convolution (equation (22)) are carried out. Thereafter, in a similar fashion to that of the scheme explained referring to FIG. 48, the two-dimensional correlation is computed and outputted.

FIG. 68 shows a result of the computer simulation for this correlation. In the computer simulation, as the input screens, ones shown in FIGS. 39(A) and 39(B) were used. Regarding the filter function of the convolution, equation (23) was used. A positive sharp peak appears on the plane ($\Delta_x$, $\Delta_y$). The peak position ($\Delta_{x0}$, $\Delta_{y0}$) equals the interval vector of the circular figure, and it is indicated that the pattern matching is exactly performed.

FIG. 69 shows a contour map which is made up through performing a computation of the element correlation (equation (17))using the product. This map is very much like that shown in FIG. 68. This indicates that the operation of the present invention is analogous to the computation of the element correlation using the product.

Now let us confirm that the processing of FIG. 54 is approximately equivalent to that of FIG. 67. The contour maps (FIGS. 55 and 56) according to the operating system of FIG. 54 and the contour maps (FIGS. 68 and 69) according to the operating system of FIG. 67 are equal to one another in their peak position, and also similar in their pattern. With respect to other portions, they are somewhat different from one another. However, it is possible to neglect those differences, since the signal intensity is very small as compared with the peak. Thus, it would be understood that the processing of FIG. 54 and the processing of FIG. 67 are approximately equivalent to one another in the two-dimensional correlation processing.

When the two-dimensional convolution is not applied, both the schemes are identical in the peak value but different in pattern (FIGS. 40 and 41; FIGS. 49 and 59). Whereas introduction of the differentiation (two-dimensional convolution) may bring about the approximately identical pattern as well (FIGS. 55 and 56; FIGS. 68 and 69).

The two-dimensional convolutions of FIGS. 54 and 67 can be computed on a one-dimensional processing basis.

Figure 70:
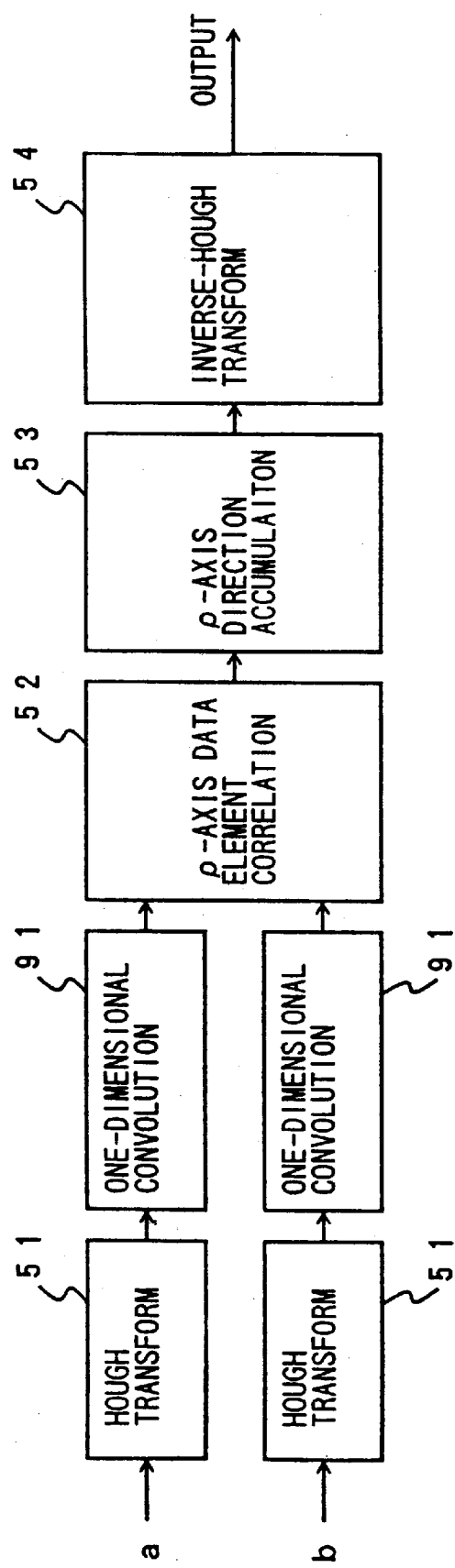
FIG. 70 is a block diagram useful for understanding a scheme of detecting a locational difference using the Hough transform.

FIG. 70 shows an embodiment for implementing the above-mentioned processing. Two-dimensional data a and b are subjected to the Hough transform process. Thereafter, one-dimensional convolution arithmetic units 91 practice the one-dimensional convolution according to equation (21) on ρ-axis data having the sameθ coordinate value. This output equals the "Hough transform after the two-dimensional convolution" (cf. Japanese Patent Application Laid Open Gazette Hei.5-165956, and Technical Report NC92-16 of the IEICE of Japan, 1992). Next, a ρ-axis data element correlation is computed. Finally, ρ-axis direction accumulation and inverse-Hough transform processing are performed and outputted. This series of processing is equivalent to the processing of FIG. 67.

Figures 71, 72, 73, 74:
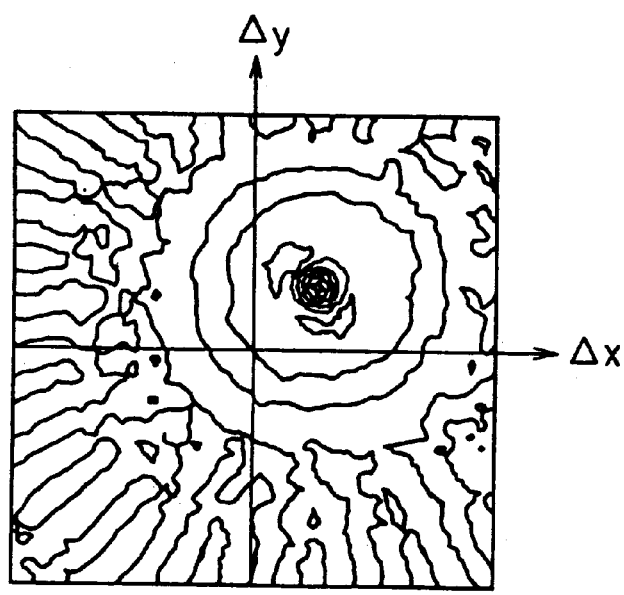
FIGS. 71–73 are each a view showing a one-dimensional filter.
FIG. 74 is a contour map of a correlation rate obtained through a simulation according to the present invention.

The one-dimensional convolution (equation (21)) using the product can be carried out, in case of a filter as to the integer value, with the use of an adder-subtracter. The "two-dimensional convolution with the two-dimensional integer value filter", which is exemplarily shown in FIGS. 62 and 63, are derived, after the Hough transform, in the form of "one-dimensional convolution with the one-dimensional filter" shown in FIGS. 71 and 72. According to this scheme, the one-dimensional filter is equivalent to a circular two-dimensional filter. Thus, it is possible to improve the "anisotropy in 0 degree and 45 degree" which follows the square filter. The number of times of addition and subtraction on each p -coordinate is four times for both the filters and is so few. Further, according to this scheme, it is possible to readily perform a first order differentiation, which would be difficult to be effected with the two-dimensional filter, with the one-dimensional filter as shown in FIG. 73 (cf. Japanese Patent Application Laid Open Gazette Hei.5-165956, and Technical Report NC92-16 of the IEICE of Japan, 1992). This filter can detect the boundary (edge) of dark and light.

FIG. 74 shows a contour map which is made up through performing an arithmetic operation shown in FIG. 70 using the integer value filter (corresponding to the integer value two-dimensional filter of FIG. 63 in case of the operation of FIG. 67). In this case, as the input screens, ones shown in FIGS. 39(A) and 39(B) were used. A positive sharp peak appears on the map involving the negative rings around its own self. This indicates that a differentiation is carried out even with the integer value filter. The peak position ($\Delta_{x0}$, $\Delta_{y0}$) equals the interval vector of the circular figure, and it is indicated that the pattern matching is exactly performed.

Figure 75:
FIG. 75 is an illustration of a one-dimensional low-pass filter.

As compared with the map (FIG. 68) which is associated with a real number value filter, it will be understood that the peak has become further sharp. The reason why this is so down is that the central part (the value: 2) of the filter (FIG. 72) used is small (one pixel). If there is a need to provide a map which is similar to that shown in FIG. 68, it is sufficient to arrange the "low-pass filter (e.g. FIG. 75) having the same width as the central part of the real number value filter (equation (23))" after the integer value filter.

Consequently, the pattern matching is exactly performed using the adder-subtracter and the adder (without using the multiplier) in accordance with the integer value filter.

Figure 76:
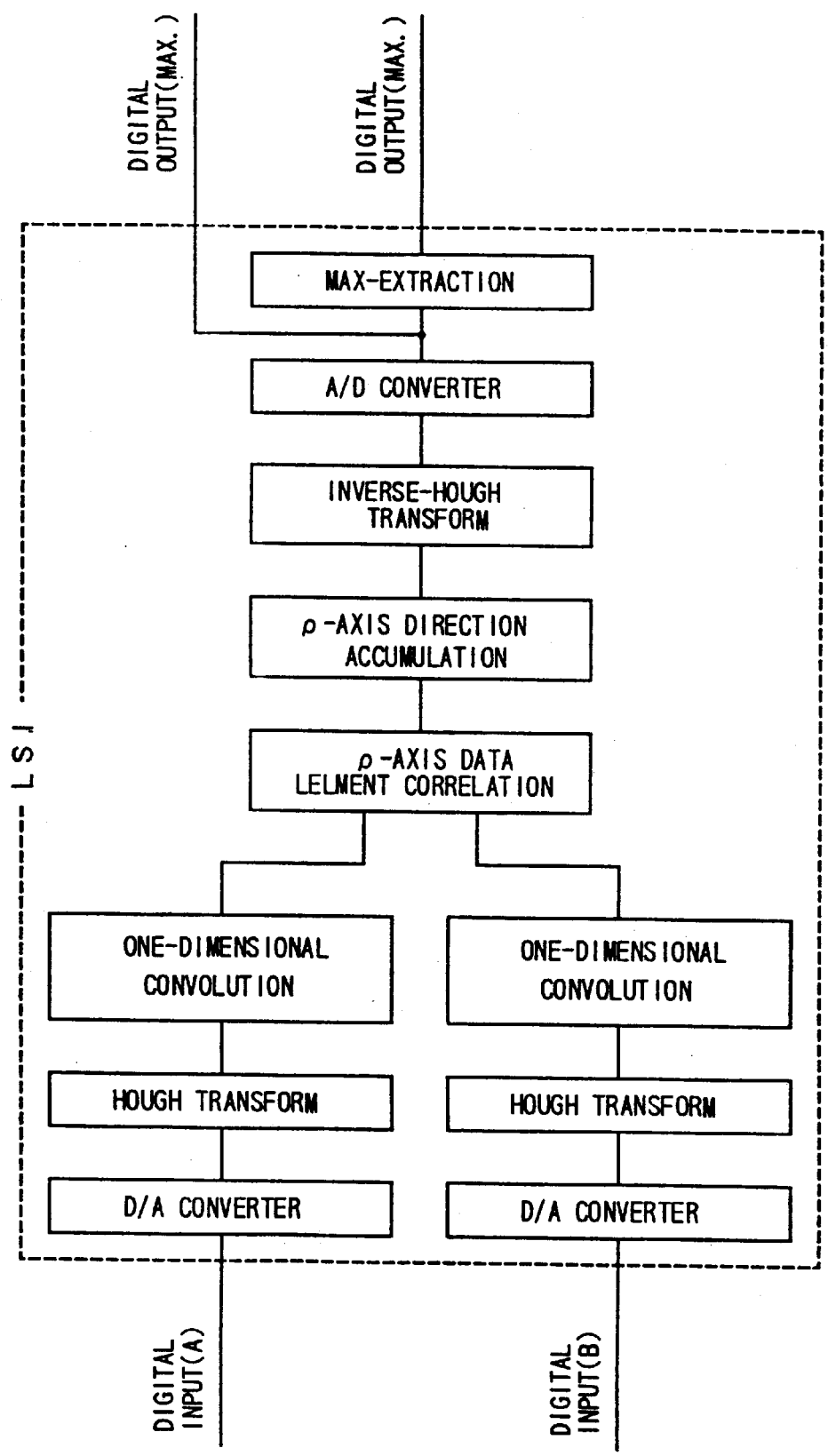
FIG. 76 is a circuit block diagram showing exemplarily an arrangement of the analog LSI adapted to perform an arithmetic operation involved in FIG. 70.
Figure 80:
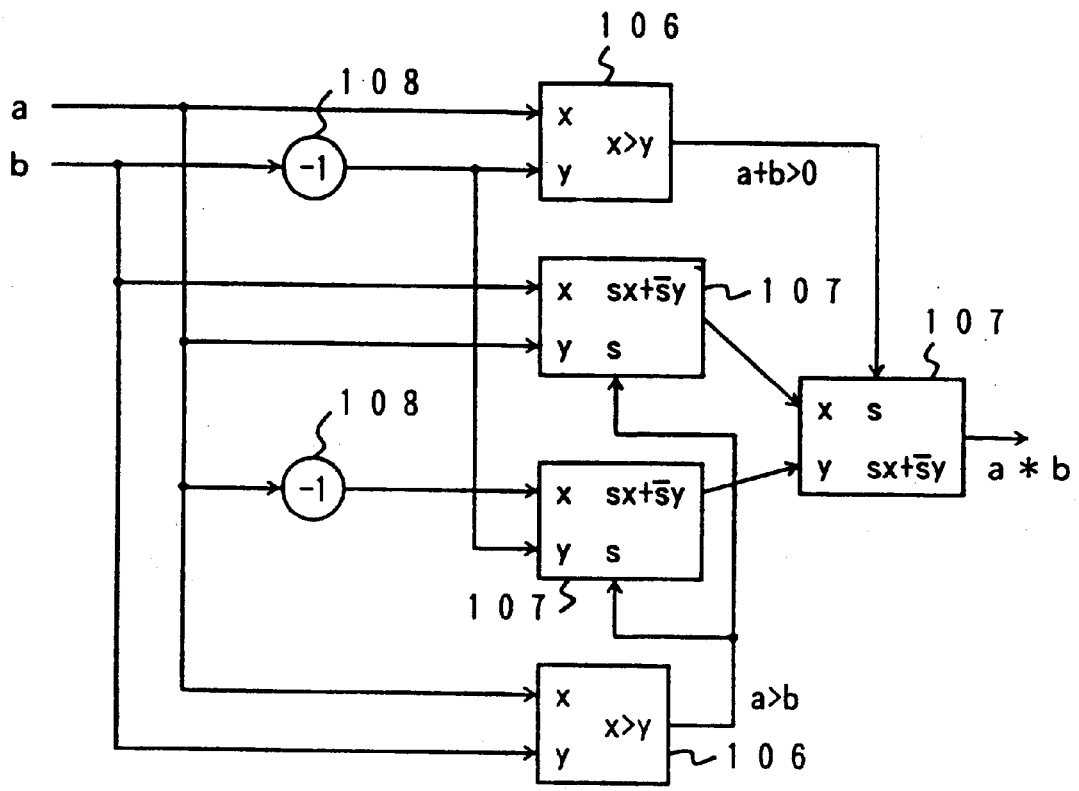

FIG. 76 shows exemplarily an arrangement of an analog LSI adapted to perform an arithmetic operation involved in FIG. 80. Input and output to the analog LSI are performed on a digital basis. The digital input is converted into an analog component by a D/A converter. Next, a one-dimensional convolution of the integer value filter (e.g. the filter (FIG. 72) used in the simulation) is carried out by a multi-input analog adder-subtracter (e.g. FIGS. 29 and 30). In case of the filter value "−1", the input is applied to a subtraction terminal. On the other hand, in case of the filter value "2", the input is separated into 2 branches and then applied to the associated one of the addition terminals. Thus, the convolution is computed at one time operation of the analog adder-subtracter. The element correlation of the signals thus obtained is effected by the above-mentioned analog circuit. Thereafter, the p-axis direction accumulation and inverse-Hough transform processing are performed. Finally, the correlation is outputted in the digital form through conversion by an A/D converter, and also the maximum value is extracted and outputted in the digital form. Incidentally, the Hough transform, the ρ-axis direction accumulation and the inverse-Hough transform processing can be computed through the addition only. Thus, those elements can be arranged with analog adders. In this manner, this operation system can be implemented on a one-dimensional processing basis without using the multiplier.

The "product" used in the one-dimensional convolution given by equation (21) can be replaced by an approximation according to the operation of the present invention. Thus, it is possible to use adders instead of multipliers which are large in the hardware scale. This correlation is expressed, using the operation symbol * of the present invention, as follows.

$$conv(t) = \Sigma_u a(t-u)*f(u) \quad (24)$$

Hence, the one-dimensional convolution analogous to the product may be implemented using adders.

According to the one-dimensional correlation explained referring to FIGS. 53 and 70, the one-dimensional convolution (equation (21)) by the product is computed. This is replaced by an approximation according to the "one-dimensional convolution (equation (24)) using the operation (equations (7a)–(7c)) of the present invention". Thus, it is possible to compute the one-dimensional correlation using adders only.

The "product" used in the two-dimensional convolution given by equation (22) can be replaced by an approximation according to the operation of the present invention. This correlation is expressed, using the operation symbol * of the present invention, as follows.

$$conv\,(x,\,y) = \Sigma_u \Sigma_v a(x-u,\,y-v)*F\,(u,\,v) \quad (25)$$

Hence, the two-dimensional convolution analogous to the product may be implemented using adders.

According to the two-dimensional correlation explained referring to FIGS. 54 and 67, the two-dimensional convolution (equation (23)) by the product is computed. This is replaced by an approximation according to the "two-dimensional convolution (equation (25)) using the operation (equations (7a)–(7c)) of the present invention". Thus, it is possible to compute the two-dimensional correlation using adders only.

Next, there will be described embodiments of the second group of the present invention. Incidentally, there will be omitted the figures and the explanation as to ones which may be considered as the embodiments of the second group of the present invention through simply considering that the operation * of the present invention in the embodiments of the first group of the present invention explained above implies the operation of the above-mentioned paragraph (B), that is, the operation of the second group. It is noted that the arithmetic operation a * b basically implies the operation of the above-mentioned paragraph (B), that is, $$a*b = f(a+b) - f(a-b) \quad (10)$$

The embodiments of the the second group of the present invention is, as mentioned above, based on the operation expressed by equation (10). This definition makes it possible to automatically derive the preferable properties similar to that of correlation using the product. A suitable selection of the function * makes it possible to implement the system with extremely less hardware as compared with the multiplier. Further, it is possible to obtain characteristics which are more preferable than that involved in the product. This operation is useful for not only the two-dimensional correlation of equation (15), but also the one-dimensional correlation. An essential matter that this operation is used for the correlation resides, as mentioned above, in the point that equation (10) and the f (x) are of even functions. Further, in the usual correlation computation, it is preferable that the polarity of the output is always the same as the polarity of the product of the input, or always the opposite one. In order to satisfy this requirement, the f(x) must be of monotone increasing or monotone decreasing in the positive domain. However, in such a correlation operation that the matching in the modulo arithmetic is checked, it is effective that the periodic function is used as the f(x). Further, in a case where the limit of the input is determined, there is no need to take a consideration as to the range over the twice. Consequently, there is no need that the range involved in the monotone increasing or decreasing is provided throughout the positive area. It is sufficient that a restrictively predetermined area from 0 to a certain value is considered.

Of the even function in which the f(x) is of monotone increasing or monotone decreasing in the positive domain, one relatively readily implemented is a function of outputting an absolute value of an input signal to the a, as set forth below.

$$f(x) = |x|^\alpha \, (\alpha\!:\, real\ number\!>\!0) \quad (26)$$

From the definition of equation (10), it is apparent that multiplying the function by the constant or adding the constant to the function brings about simply the output being multiplied by the constant. Thus, in general, equation (26) is equivalent to the following equation (27).

$$f(x) = r|x|^\alpha + s \, (\alpha\!>\!0) \quad (27)$$

Selecting the large value of α brings about the large weighting for the input signal having the large absolute value. Thus, it becomes an operation suitable for a selection of a matching of the part having excessive values. On the other hand, selecting the small value of a brings about the averaged weighting. Thus, it becomes an operation suitable for a selection of a matching of the half tone part which is considered to be relatively important. Further, it is effective to select the value of α taking account of characteristics of noises as well as characteristics of the original signals. For example, in case of image data, it is considered that in order to avoid the influence of the noise involved in the high luminance, it is preferable that the value of α is small. And in a case where a lot of noises involved in low levels exist, it is preferable that the value of α is large.

In this manner, if the value of α is suitably selected to meet a property and a use of the input signal, it is possible to provide an optimization of a match detection through varying the weighting. When α=2, the substitution of equation (27) into equation (10) brings about 4 rab. This harmonizes with the definition of the correlation by the product. Consequently, if the value of α takes near 2, it is possible to obtain the characteristic which is approximately the same as the correlation by the product.

In this manner, even in a case where the type of function is restricted to, for example, equation (27), it is possible to control in some degree the characteristic of the correlation operation in compliance with the characteristic of the input and a use. If there is used the further general function such as the "even function in which the f(x) is of monotone increasing or monotone decreasing in the positive domain", it is possible to control the characteristic of the correlation operation with greater degree of freedom. Taking account of an amount of actual hardware, a suitable function may be adopted.

As mentioned above, of the f(x) the most simple one is of the case of α=1.

$$f(x)=r|x|+s \qquad (28)$$

At that time, $$a*b=r(|a+b|-|a-b|) \qquad (29)$$

With respect to this scheme, as will be described later, there are considered several ways for implementation. AS to what way is to be adopted for an advantageous use, it is different depending on the situation such as the circuit element to be used and the expression fashion in the numerical value. Anyway, it is possible to implement the system with more simple operation as compared with the product.

Hereinafter, there will be explained several ways for implementation.

Figure 77:
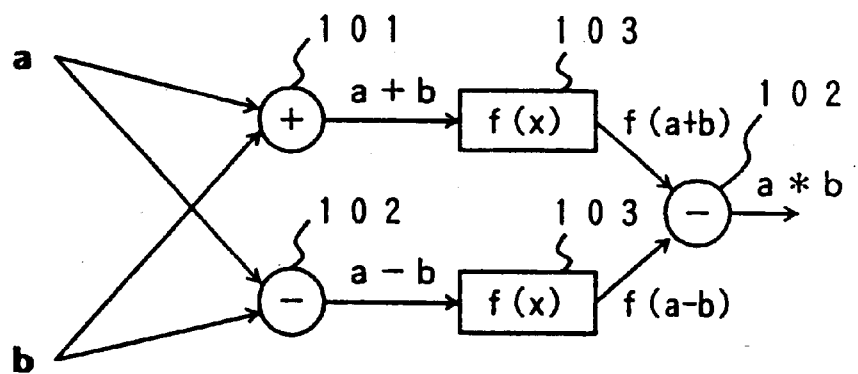
FIGS. 77–87 are each a circuit block diagram of a circuit for performing a basic operation of the second group according to the present invention.

The first one relates to a method of implementing the definition of equation (10) in its present form. As shown in FIG. 77, a circuit for performing a basic operation of the second group according to the present invention comprises an adder 101 for detecting the sum of two inputs, a subtracter 102 for detecting the difference between the two inputs, two function generators 103 for causing the functions to acting on the sum and the difference, respectively, and an additional subtracter 102 for detecting the difference between the output results of the two function generators 103. The subtracters 102 may be implemented with the combination of an adder and a complementer (or an analog inverter).

Figure 78:
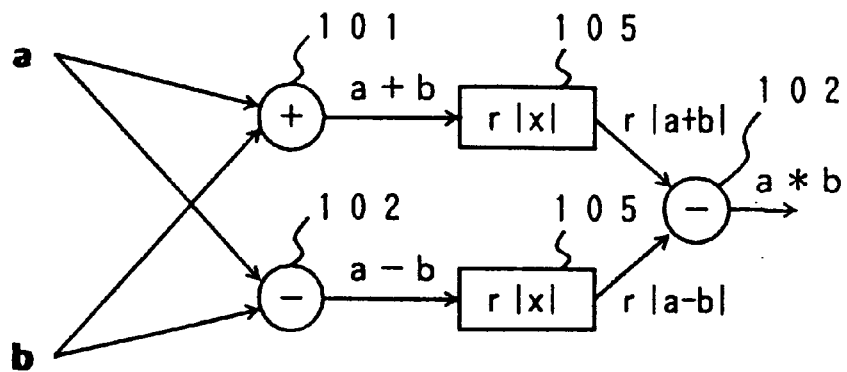

In a case where the f(x) is defined by equation (28), the function generators 103 are replaced by absolute value generators 105, respectively (FIG. 78).

According to this scheme, the adder and the subtracters for the input and the output are needed. Therefore, in a case where the f(x) is simple, there is a tendency that an amount of hardware becomes larger as compared with other schemes which will be described later. However, according to this scheme, since the function generator may be of a one input type, it is possible to relatively easily implement even the complicated function. Hence, this scheme is generally advantageous as compared with other scheme.

Figure 79:
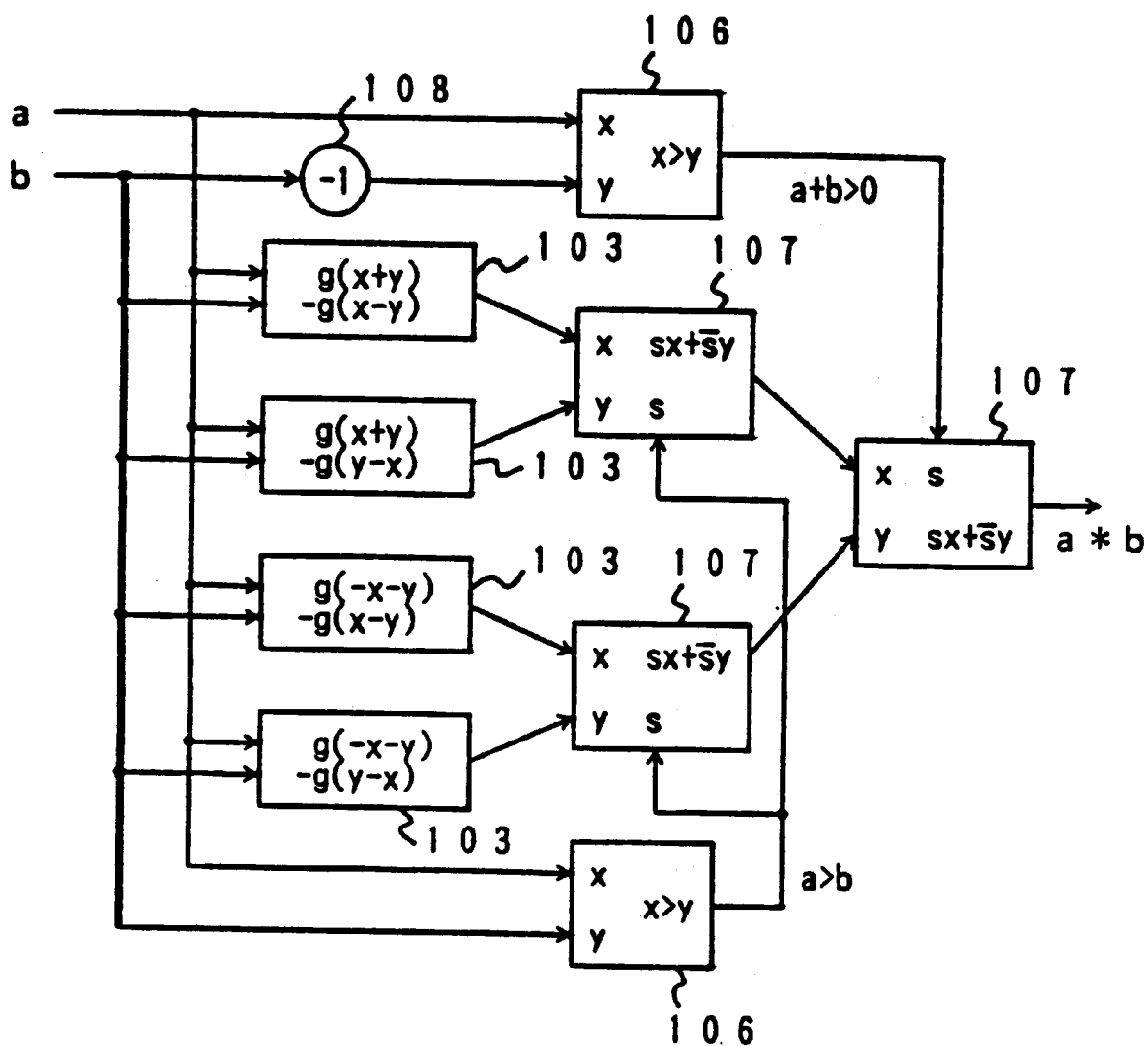

Next, there will be explained a scheme in which the property of the function is used to convert equation (10) and derive the simplified output. Specifically, in a case where the function of equation (10) is defined with use of g(x), which is not the even function, $$f(x)=g(|x|)$$

the definition of equation (10) includes the absolute value function. And thus, generally, it is difficult to modify equation (10) more over. However, if the absolute is omitted through the classification as set forth below, $$\begin{aligned}a*b = \ & g(a+b)-g(a-b) & (a \geq -b, a \geq b) \\ & g(a+b)-g(b-a) & (a \geq -b, a \leq b) \\ & g(-a-b)-g(a-b) & (a \leq -b, a \geq b) \\ & g(-a-b)-g(b-a) & (a \leq -b, a \leq b)\end{aligned} \qquad (30)$$

in some cases, equation (10) is simplified utilizing the property of the g (x). According to this scheme, as shown in FIG. 79, the comparisons of a with b and a with −b are performed by comparators 106. A function is selected by a data selector (or an analog switch) 107 in accordance with the result of the comparison. Element −b is formed through inverting element b by a complementer (or an analog inverter) 108. In a case where a equals b, or a equals −b, selection of any function by the data selector (or an analog switch) 107 brings about the same result. Consequently, in a case where two inputs are equal to one another, the comparator 106 may output either of 0 and 1.

While equation (10) is not always able to be simplified in accordance with this scheme, this scheme is especially effective in a case where the f(x) is defined by equation (28). In this case, $$\begin{aligned}a*b = \ & 2rb & (a \geq -b, a \geq b) \\ & 2ra & (a \geq -b, a \leq b) \\ & -2ra & (a \leq -b, a \geq b) \\ & -2rb & (a \leq -b, a \leq b)\end{aligned} \qquad (31)$$

Here, assuming that r=½, it is sufficient to optionally select a, b, −a and −b in accordance with a comparison results of a and b; and a and −b . In this case, as shown in FIG. 80, a circuit for performing a basic operation of the second group according to the present invention comprises comparators 106, complementers (or an analog inverter) 108, and data selector (or an analog switch) 107. Generally, the comparator is simple in the structure as compared with the adder. Therefore, it is possible to reduce an amount of hardware as compared with the case in which equation (10) is implemented in accordance with the definition in its present form.

Through utilizing that equation (31) can be modified as set forth below, another implementing scheme can be obtained.

$$a*b=2r\ max\ (min\ (a, b), min\ (-a, -b)) \qquad (32)$$

Here, max (x, y) denotes the maximum value function in which of x and y the larger one is outputted, and min (x, y) denotes the minimum function in which of x and y the smaller one is outputted. Equation (32) is modified as follows:

$$a*b=2r\ max\ (min\ (a, b), -min\ (a, b)) \qquad (33)$$

In equation (33), only one inversion of polarity appears.

Figure 81:
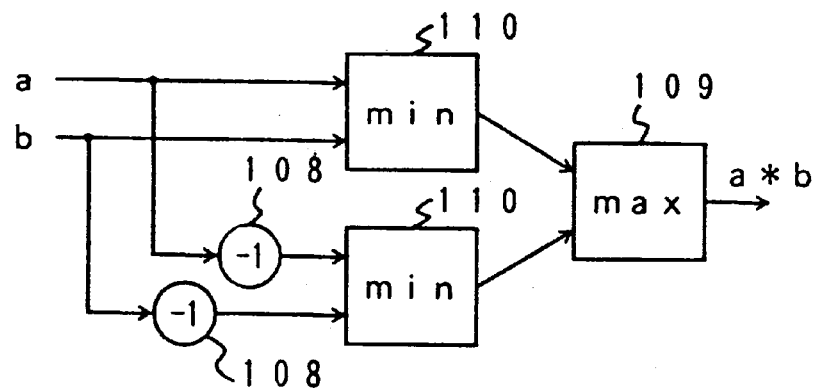
Figure 82:
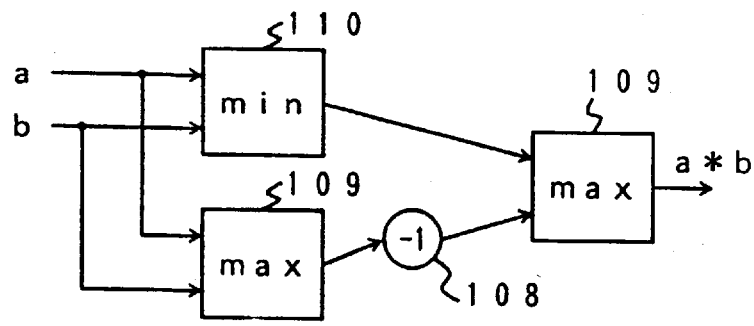
Figure 83:
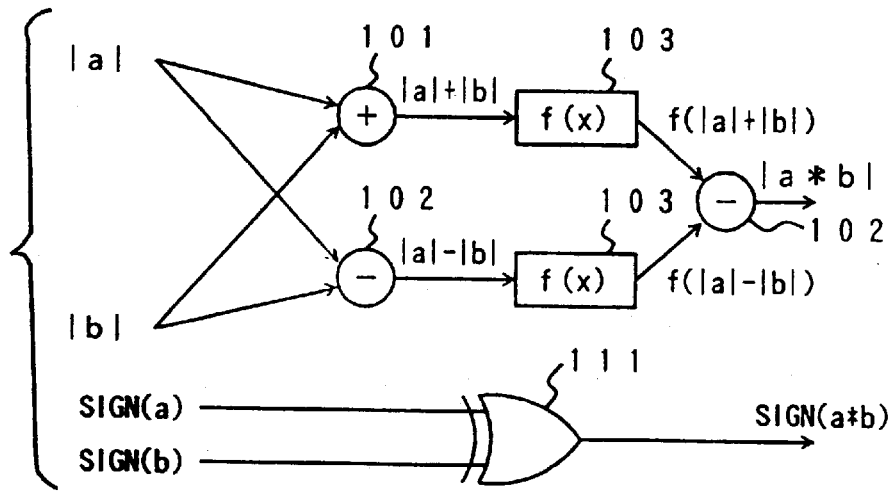

In this case, assuming that r=½, as shown in FIGS. 81 and 82, a circuit for performing a basic operation of the second group according to the present invention simply comprises a maximum value circuit 109 for performing the above-mentioned max (x, y), minimum value circuits 110 for performing the above-mentioned min (x, y), and complementers (or an analog inverter) 108. The maximum value circuit and the minimum value circuit can be relatively easily arranged with the analog circuit. Thus, this scheme is more useful as compared with the above-mentioned combination (FIGS. 79 and 80) of the comparators and the data selectors.

Likewise, the following equation is also used.

$$a*b = 2r \min (\max (a, -b), \max (-a, b)) \qquad (34)$$

Next, there will be explained a scheme in which equation (12d) is used and the operation is performed in such a manner that the absolute value and the sign are separated.

According to equation (12d), $$|a*b| = |\,|a|*|b|\,| \qquad (35a)$$

sign (a*b)

$$= sign\,(|a|*|b|)\,sign\,(a)\,sign\,(b) \qquad (35b)$$

Thus, it is possible to restrict the definition area of the operation * to only the positive area. Specifically, if the f(x) is of the monotone increasing in the positive area, then equation (14) holds. Hence, $$|a*b| = |a|*|b| \qquad (36a)$$

$$= sign\,(a*b)\,sign\,(a)\,sign\,(b) \qquad (36b)$$

Thus, it is possible to evaluate the absolute value and the sign independently of each other. In addition, with respect to the later, if one assigns the sign (x)=1 to "0" and the sign (x)=−1 to "1", correspondingly, then those can be expressed by an exclusive OR. Thus, it can be readily implemented. Consequently, if it is easy to separate the numeral value into the absolute value and the sign, this scheme is also effective.

Figure 84:
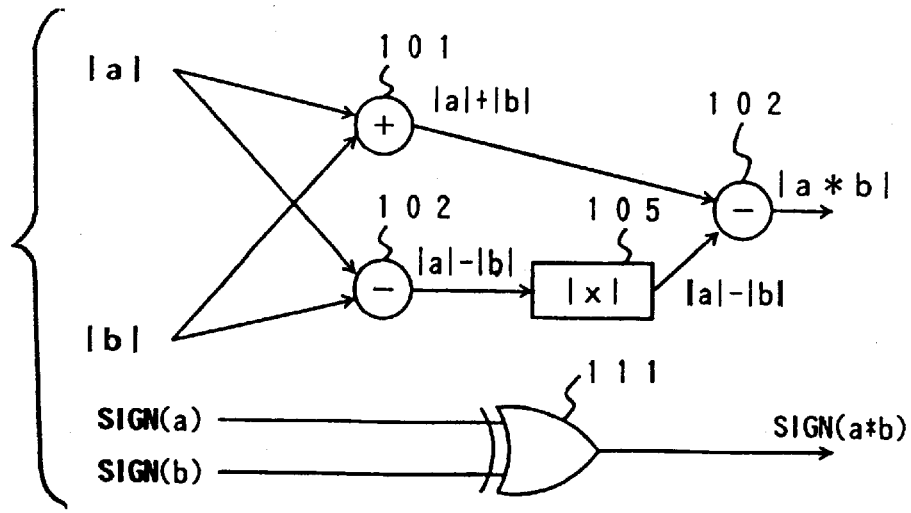

In a case where the f(x) is complicated, it is advantageous to implement the definition of equation (10) in its present form. Through utilizing such a property that |a|+|b| is always over 0, there is a possibility that the function generator can be simplified. For example, in a case where the f(x) is defined by equation (28), the absolute value circuit for |a|+|b| can be omitted (FIG. 84).

In a case where the f(x) is simple, in some cases, the function generator can be simplified. In this case, there is no need to consider −|a| and −|b|.

Figure 85:
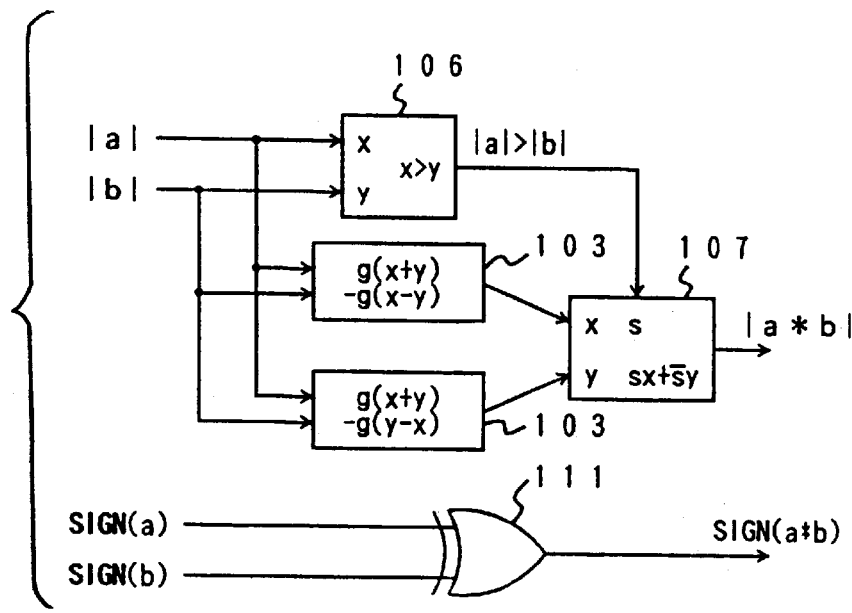

That is, in a case where the f (x) is defined using the g (x) in which the function is not the even function, in the form of f (x)=g (|x|), the following equation is used (FIG. 85).

$$|a|*|b| = g(|a|+|b|) - g(|a|-|b|) \quad (|a| \geq |b|) \qquad (37)$$
$$\phantom{|a|*|b| =} g(|a|+|b|) - g(|b|-|a|) \quad (|a| < |b|)$$

Especially, in a case where the f (x) is defined by equation (28), the following equation is given.

$$|a|*|b| = r(|a|+|b|) - ||a|-|b||) \qquad (38)$$
$$= 2r \min(|a|, |b|)$$

Figure 86:
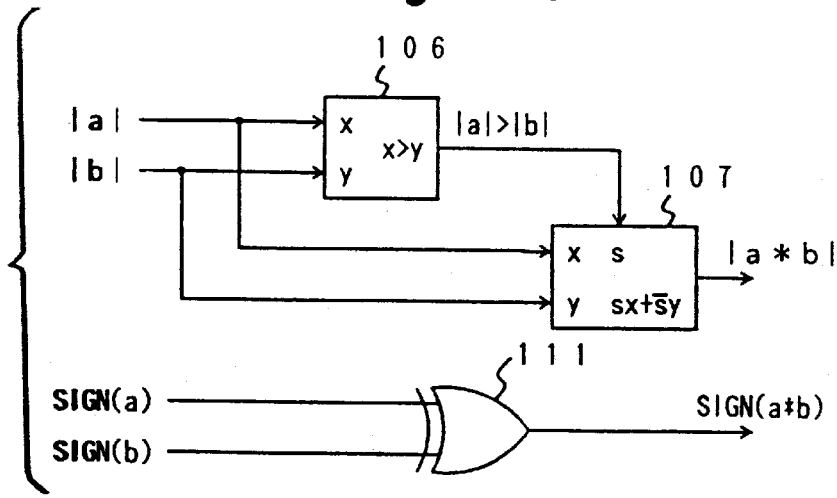
Figure 87:
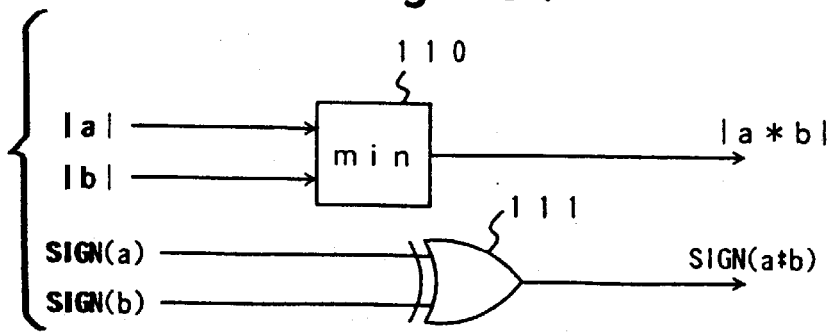

Hence, if r=½, an operation needed for |a|*|b| is only min (x, y). This is implemented by the combination (FIG. 86) of the comparator and the data selector, or in its present form (FIG. 87).

Hereinafter, there will be explained several ways for implementation of the system by the digital circuit.

According to the arrangement as shown in FIG. 77, the sum and the difference between the signals are found indeed. In a case where this is implemented with the digital circuit, it is advantageous that the numeral value is expressed by the complement representation on 2 or the biased exponent which are easy for execution of the addition and subtraction.

In the N bit binary number according to the complement representation on 2, the numeral value x is expressed as follows.

$$x = -2^{N-1} x_{N-1} + \Sigma_i 2^i x_i \qquad (39)$$

In the biased exponent, the numeral value x is expressed as follows.

$$x = -2^{N-1}(x_{N-1}-1) + \Sigma_i 2^i x_i \qquad (40)$$

The use of these representation makes it possible to perform the addition with a sign by the use of the adder for the usual binary addition involved in no sign.

Figure 88:
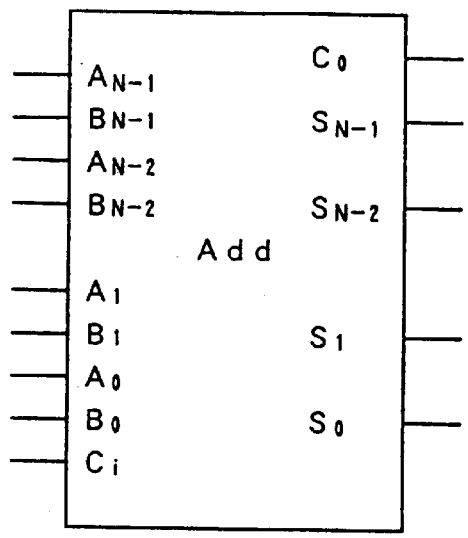
FIG. 88 is an illustration of a symbol of an N-bits binary adder.
Figure 89:
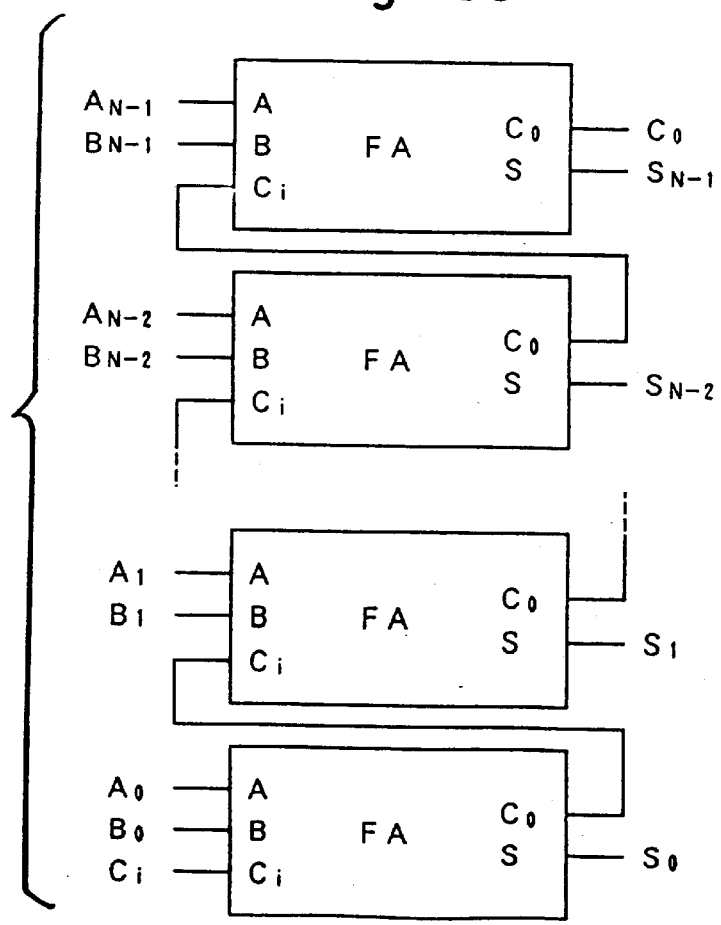
FIG. 89 is a circuit diagram of an N-bits binary adder.
Figure 90:
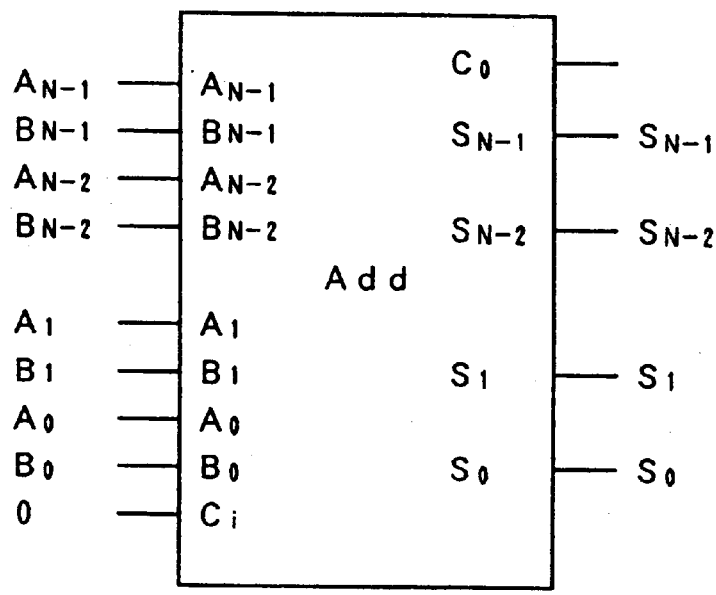
FIGS. 90–93 are each a circuit diagram of an adder.
Figure 91:
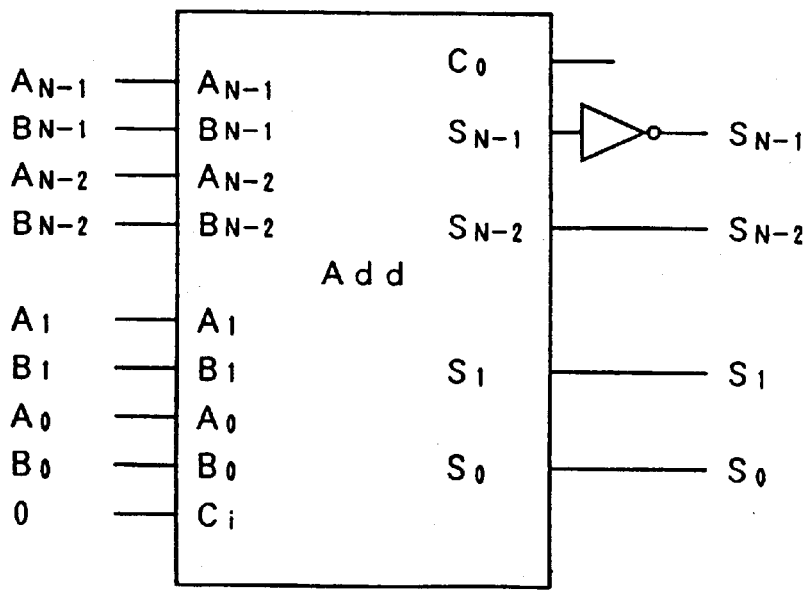

FIG. 88 show a symbol of an N bit binary adder. The N bit binary adder may be constituted of ripple carry type of adders using, for example, full adders as shown in FIG. 89. In the complement representation on 2, as shown in FIG. 90, the binary adder is used as it is. In the biased exponent, as shown in FIG. 91, there is a need to invert the bit of sign of the output.

The biased exponent is one in which the numerical value is expressed in such a manner that central value of binary data represented by the maximum bit length (N bit in case of FIG. 88) is given with 0; the value over the central value with the positive; and the value below the central value with the negative.

Figure 92:
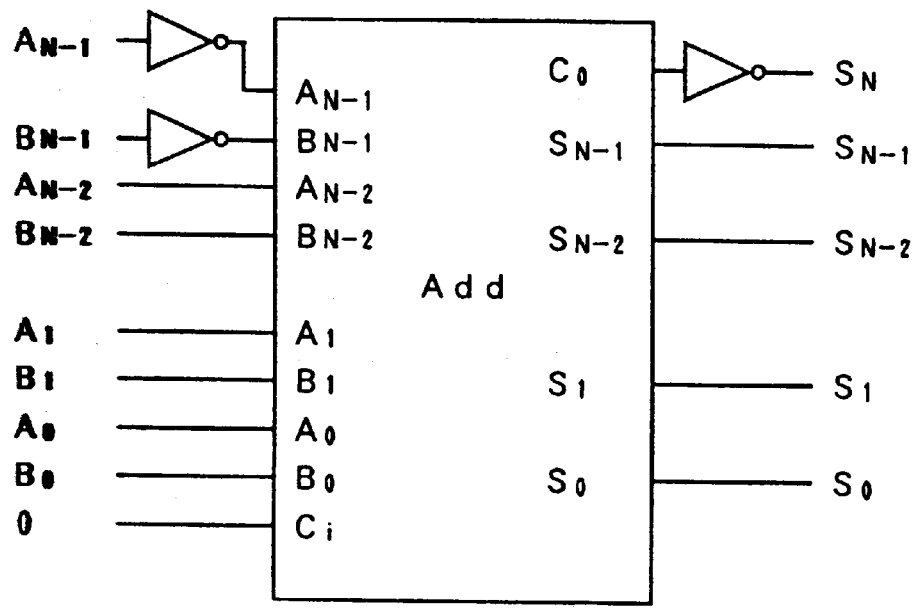

It is difficult to detect the overflow exactly with these structures. Accordingly, it is necessary to take care of the limit of the input. While it is possible to provide a detection circuit for detecting the overflow, it is more simple that as shown in FIG. 92 (complement representation on 2) and FIG. 93 (the biased exponent) the output is provided with N+1 bits so as to prevent the overflow. In this arrangement, it is acceptable that the least significant bit is omitted and only the upper significant N bits are outputted.

Figure 94:
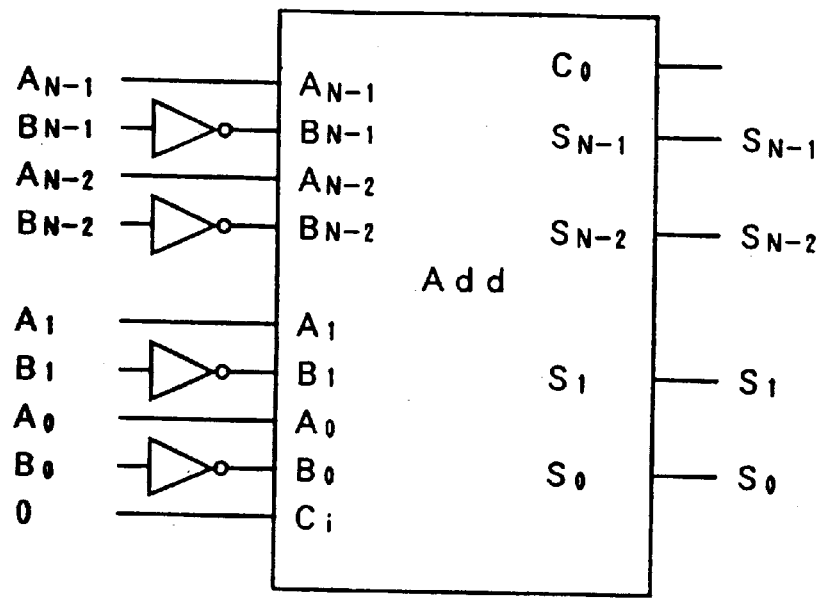
FIGS. 94–97 are each a circuit diagram of a subtracter.
Figure 95:
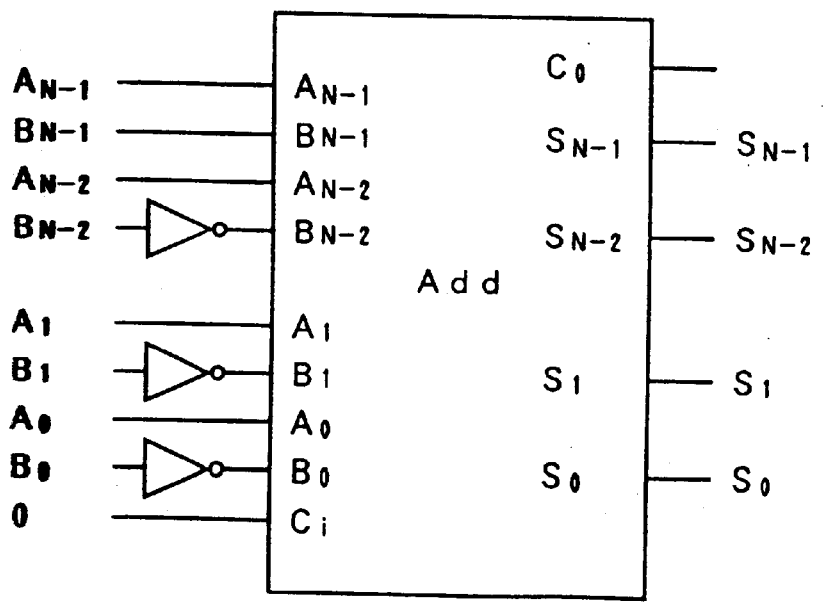
Figure 96:
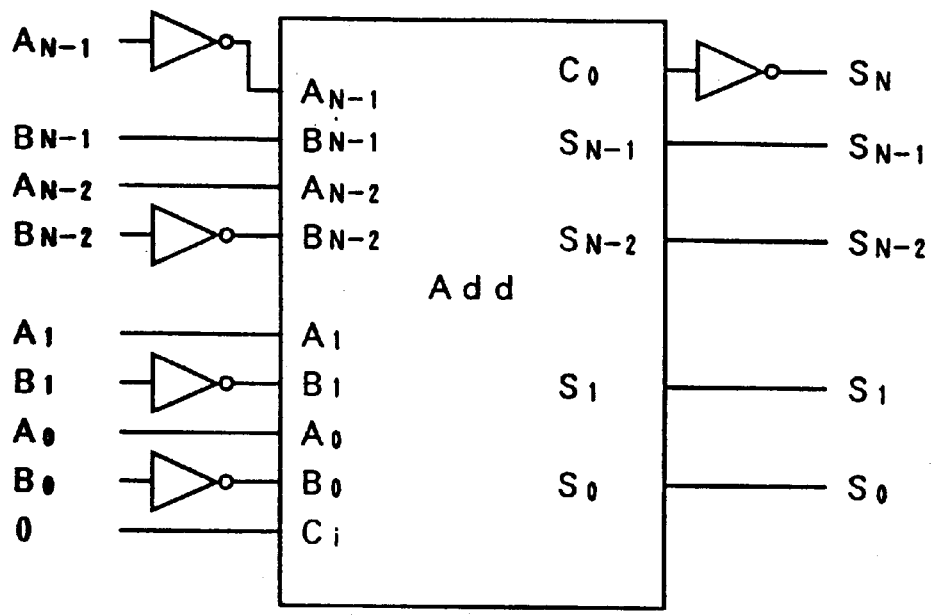
Figure 97:
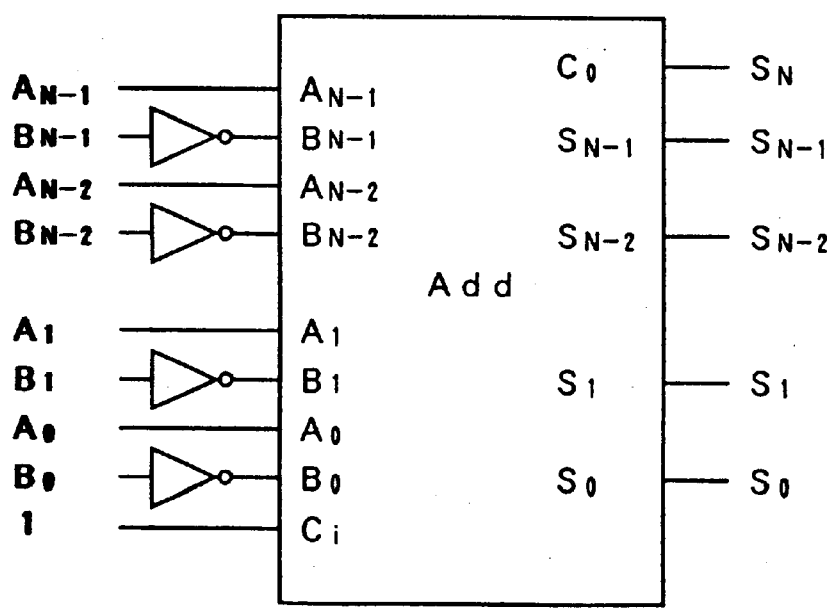

With respect to the subtraction, one may find complement on operand and then add the resultant by the adder. Actually, the use of the carry input of the adder makes it possible to perform the subtraction involving a sign through using inverters and adders, without the use of the complementer. FIGS. 94 and 95 show the subtracters of the complement representation on 2 of the N bits output and the biased exponent thereof, respectively. FIGS. 96 and 97 show the subtracters of the complement representation on 2 of the N+1 bits output and the biased exponent thereof, respectively.

The function generator is generally implemented using a ROM. Here the function generator is for one input function. Hence, assuming that the bit width of the signal is given with N, it is sufficient for the input of the function generator to be provided with N bits. Assuming that the number of bits of the output is M, the necessary capacity of the ROM is M×$2^N$ bits.

Figure 98:
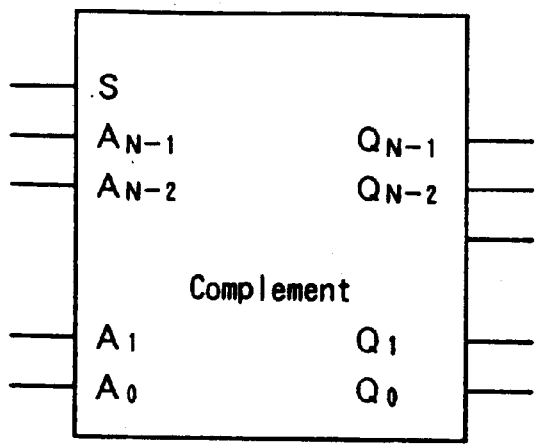
FIG. 98 is an illustration of a symbol of a corrector having a control input.
Figure 99:
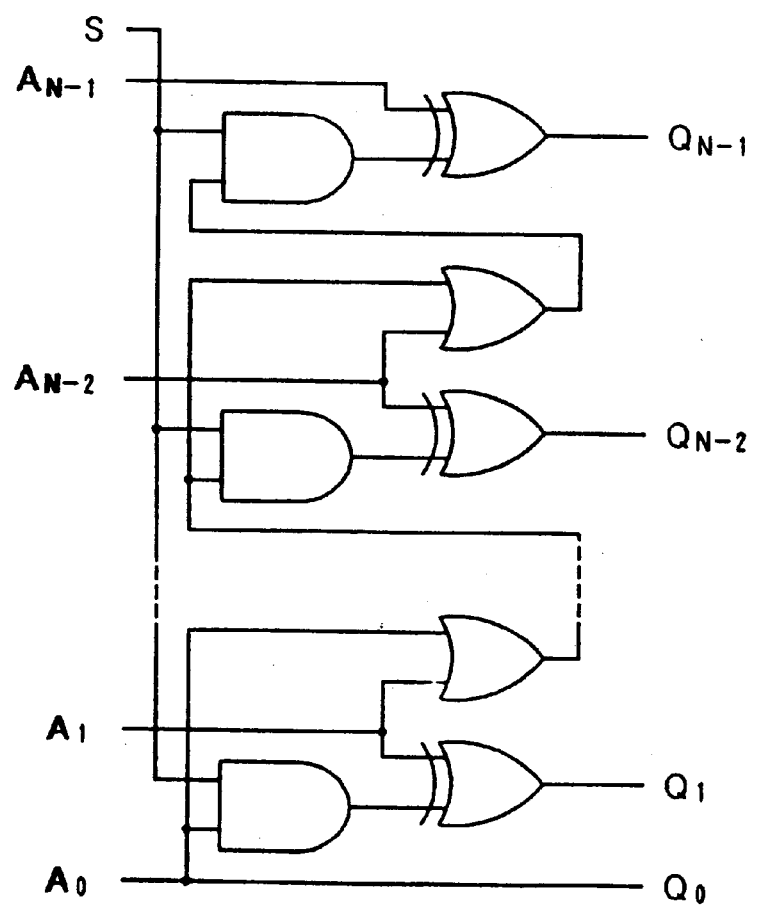
FIG. 99 is a circuit diagram of a corrector having a control input.
Figure 100:
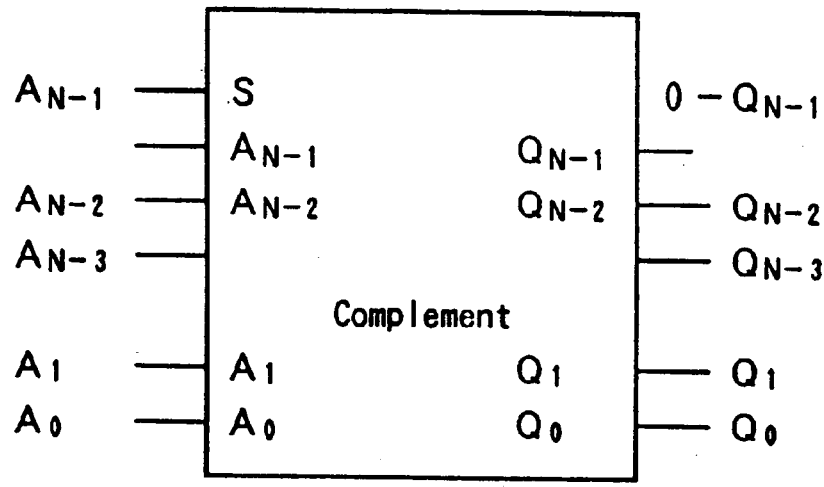
FIGS. 100–101 are each a circuit diagram of an absolute value circuit.
Figure 101:
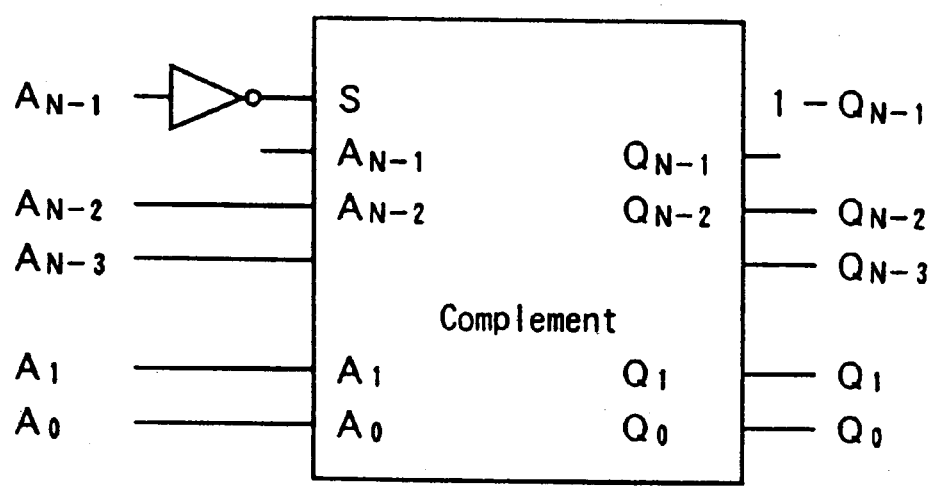
Figure 102:
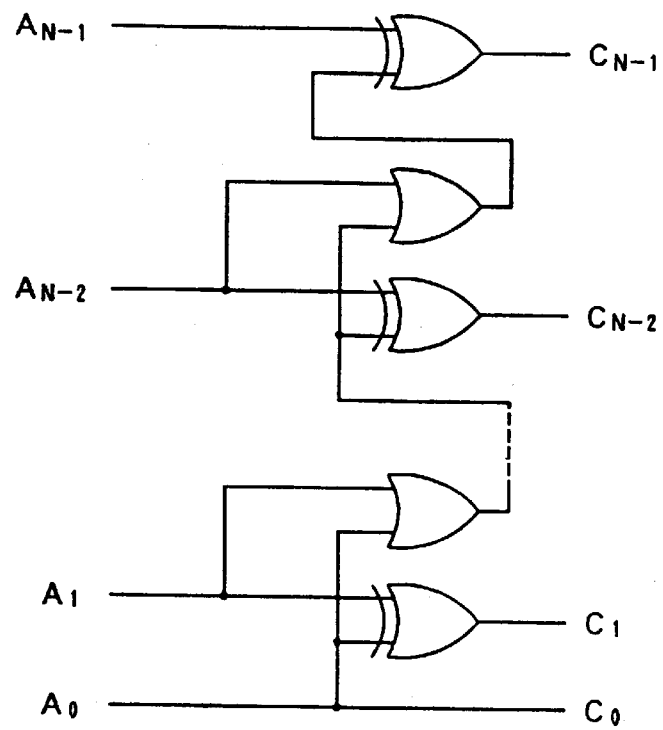
FIG. 102 is a circuit diagram of a complementer.

In a case where the function is relatively simple, it is more simple that a dedicated circuit is used rather than the ROM. In case of equation (28), the function generator is an absolute value circuit. This can be implemented using a complementer involving a control input (S) shown in FIG. 98 in the form of the symbol. The complementer involving a control input outputs the input as it is when the control input (S) is 0, and outputs the complement on the input when the control input (S) is 1. FIG. 99 shows a ripple carry type of complementer involving a control input. Using this complementer, the absolute value circuit is constructed as shown in FIG. 100 (complement representation on 2) and FIG. 101 (biased exponent). Alternatively, it is acceptable to provide such an arrangement that a data selector and a complementer are used and the data selector selects whether data passes through the complementer in accordance with the value of the sign bit. The complementer can be treated on the same logical basis in either of the complement representation on 2 and the biased exponent, and thus if it is of the ripple carry type, then it can be implemented with arrangement as shown in FIG. 102. Further, it is possible also to implement the complementer by the combination of an inverter and an increment circuit, or by a subtracter.

Figure 93:
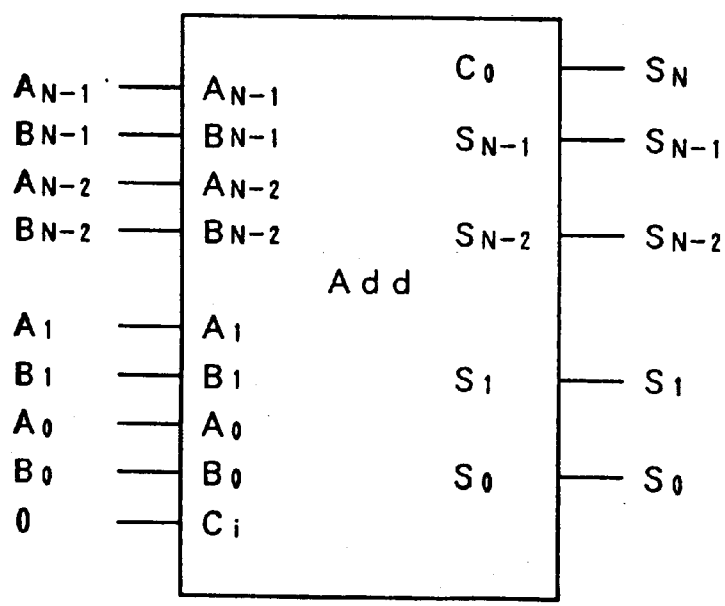

Further, in case of equation (28), it is preferable as to the adder of a and b at the input end to provide such an arrangement that only the upper significant N bits are used on the adders and the subtracters shown in FIGS. 92, 93; and 96 and 97, respectively. This arrangement does not serve to degrade the accuracy. Because the added one and the subtracted one of a and b are always equal to one another in their least significant bit and they are not varied even finding the absolute value. Thus, the least significant bits are always cancelled through the subtraction at the final stage. According to this arrangement, the inputs of the subtracter at the final stage are |a+b|/2 and |a−b|/2. This involves no fear of overflow. Thus, the final stage may adopt the subtracters shown in FIGS. 94 and 95.

The scheme using equation (30) involves a comparison and an inversion of the polarity. A representation which is most suitable for this scheme is a complement representation on 1 or a sign+absolute value representation. But, even the use of another representation involves no so complication.

In the N bit binary number according to the complement representation on 1, the numeral value x is expressed as follows.

$$x = -(2^{N-1}-1) x_{N-1} + \Sigma_i 2^i x_i \qquad (41)$$

In the sign+absolute value representation, the numeral value x is expressed as follows.

$$x = (-1)^{x_{N-1}} \Sigma_i 2^i x_i \qquad (42)$$

The use of these representations makes it possible to carry out an inversion of the polarity only with the inverter. In case of the complement representation on 2 and the biased exponent, the inversion of the polarity is carried out by the complementer.

Figure 103:
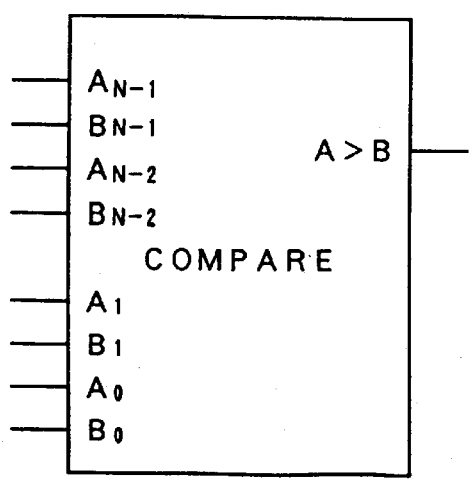
FIG. 103 is an illustration of a symbol of a comparator.
Figure 104:
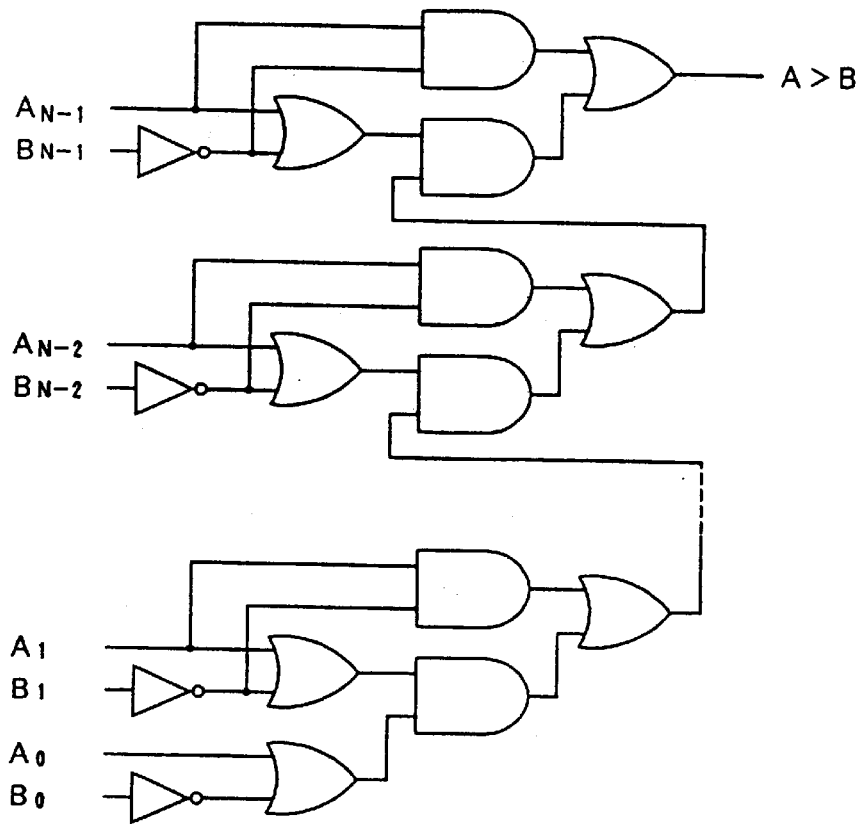
FIG. 104 is a circuit diagram of a comparator.
Figure 105:
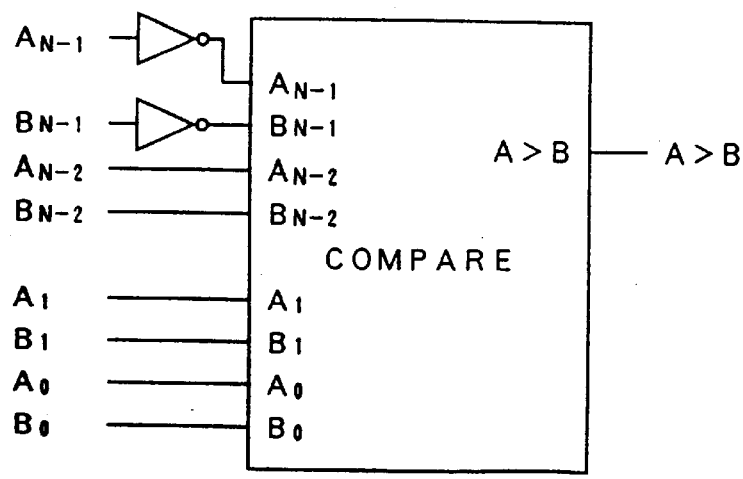
FIGS. 105–110 are each a view showing a comparator.
Figure 106:
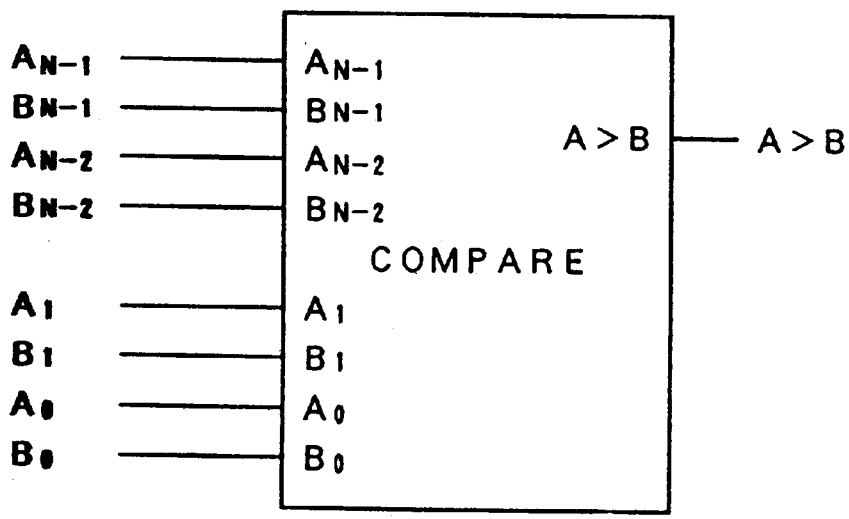
Figure 107:
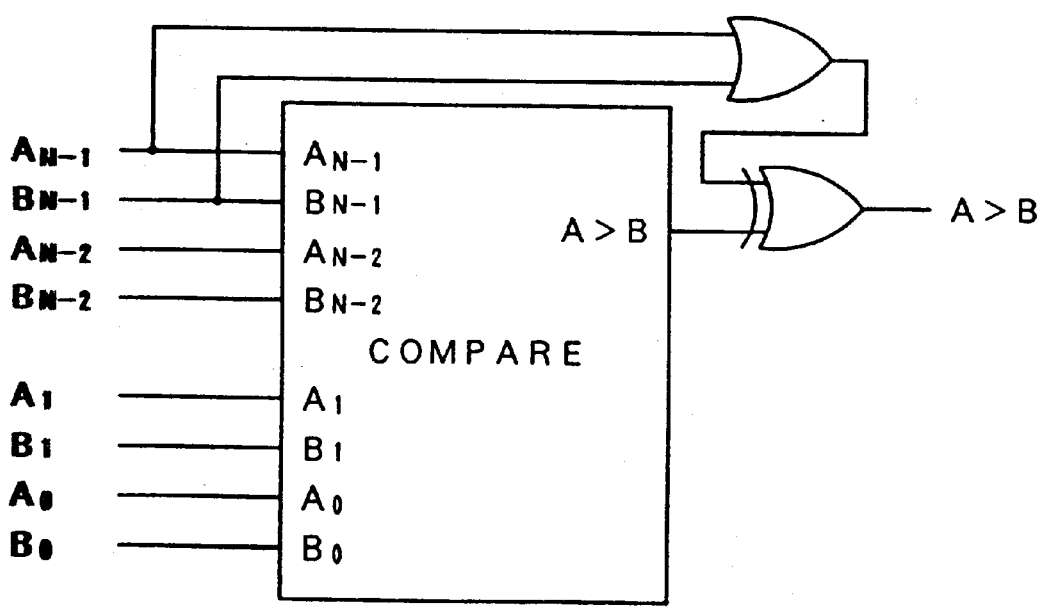

The comparison operation may be carried out by a comparator for the binary number involving no sign, the symbol of which comparator is shown in FIG. 103. FIG. 104 shows a ripple carry type of comparator by way of example. It will be understood that the arrangement is simplified as compared with the subtracter. The use of such an arrangement makes it possible to provide comparators as shown in FIG. 105 (the complement representation on 2 and the complement representation on 1), FIG. 106 (the biased exponent) and FIG. 107 (the sign+absolute value representation).

Figure 108:
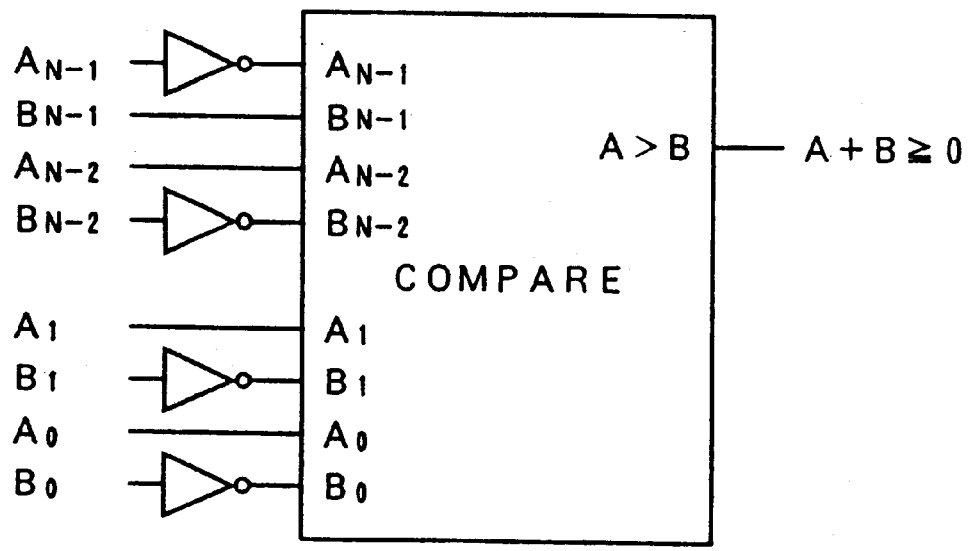
Figure 109:
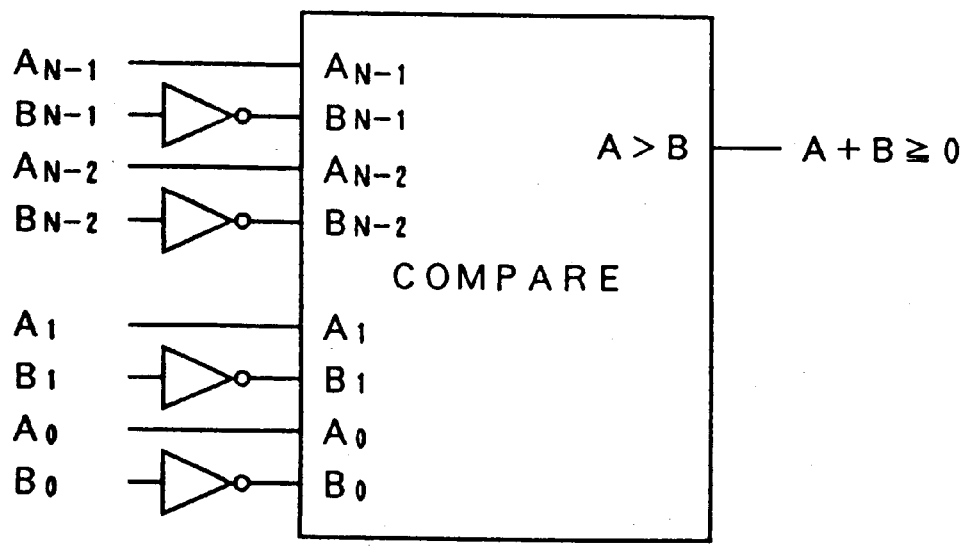
Figure 110:
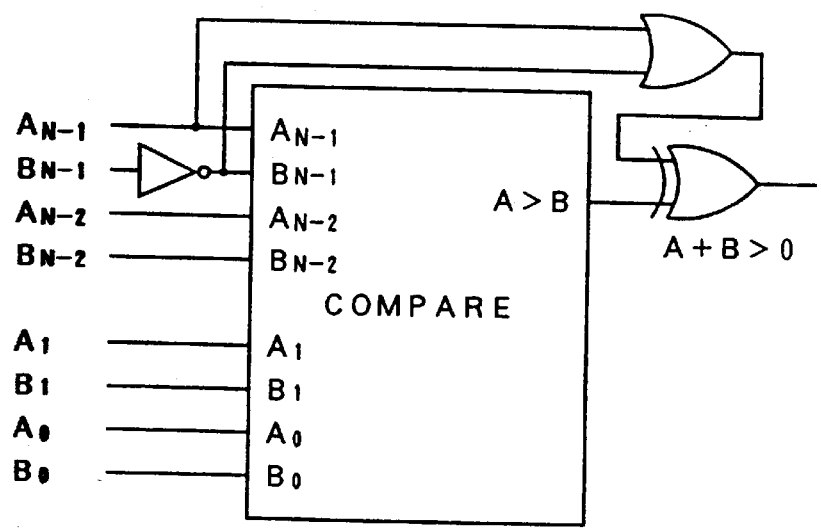

According to these arrangement ways, in the complement representation on 1 and the sign+absolute value representation, +0>−0 is decided, and in the sign+absolute value representation, an equal negative number is decided as a>b. However, as mentioned above, in comparison of the equal number, a result of the decision has no effect on the final resultant and thus there is no problem. Further, in comparison of a with −b, there is no need to always find the complement on b, it is sufficient that as in FIG. 108 (the complement representation on 2 and the complement representation on 1), FIG. 109 (the biased exponent) and FIG. 110 (the sign+absolute value representation), b is inverted and then compared. While the circuit shown in FIG. 108 outputs 1 at a+b≧0 in the complement representation on 2, and at a+b>0 in the complement representation on 1, as mentioned above, there is no problem. Since the inverter for inverting the input b is cancelled by the inverter in FIG. 104, rather this one can use a small amount of hardware.

Figure 111:
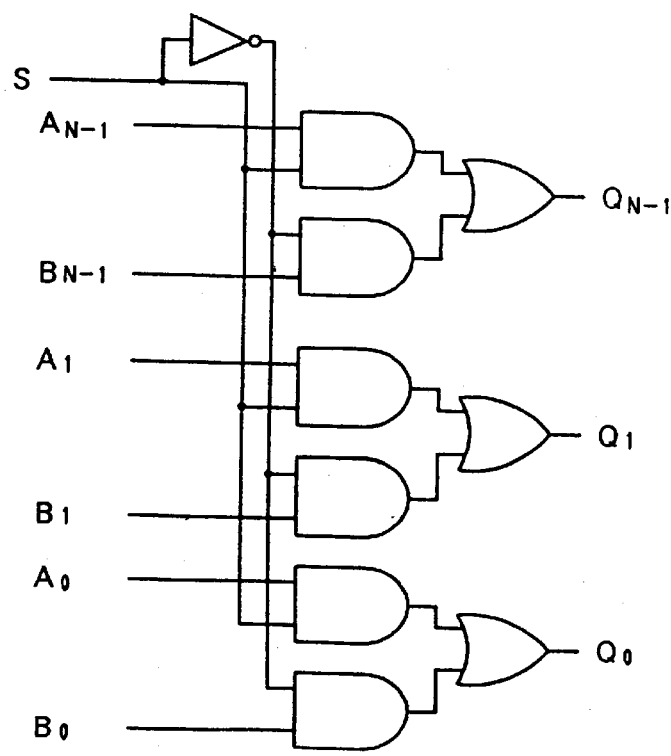
FIG. 111 is a circuit diagram of a data selector.
Figure 112:
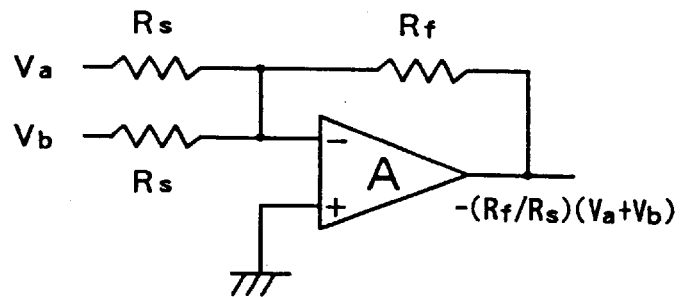
FIG. 112 is a circuit diagram of an analog adder.
Figure 113:
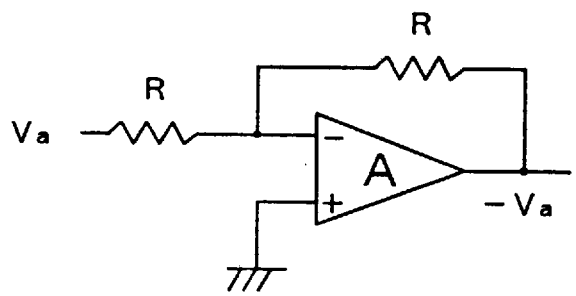
FIG. 113 is a circuit diagram of an analog inverter.

The data selector may be implemented by the logical AND-OR shown in FIG. 111 or using path transistors.

In case of equation (28), as mentioned above, a and b; and a and −b are compared with each other, respectively, and either of a, b, −a and −b is outputted in accordance with a result of the comparison. Thus, the operation may be implemented simply by the comparator, the inverter or the complementer, and the data selector.

In the digital circuit, the maximum value circuit and the minimum value circuit are each constituted of the comparators and the data selector. Accordingly, also in the scheme in which the maximum function and the minimum function are used, the structure is substantially the same.

For the scheme in which the absolute value and the sign are separated from one another and processed, the sign+absolute value representation is advantageous. The operation for the sign parts is easily implemented, as described above, with the logical exclusive OR.

If the absolute value part is regarded as the positive number represented by the complement on 2, equation (10) is computed with the arrangement which is the same as one mentioned above. Also a result ought to be represented by the complement on 2. In this respect, as mentioned above, in case of the use of the monotone increasing function, the result always becomes the positive and thus there is no problem. Through utilizing that |a+b| always becomes the positive, it is possible to reduce half the capacity of a ROM of the associated function generator. In a case where the f(x) is defined by equation (28), it is possible to omit the absolute value circuit associated with |a+b|.

With respect to a scheme for a comparison of inputs, |a| and |b| may be compared with each other by a binary comparator shown in FIG. 103. In a case where the f(x) is defined by equation (28), the data selector selects a smaller one of |a| and |b| as an output.

In the analog circuit, one assigns the numerical value to a continuous amount such as the voltage and the current. Thus, there arises no problem such as a representation of the numerical value in the digital circuit. And it is possible to readily perform the inversion of the polarity by an analog inverter (an inverter amplifier of gain −1) and the comparison by a comparator.

To implement equation (10) with an analog circuit in its present form, the analog circuit (FIGS. 77 and 78) comprises analog adders, analog subtracters, analog inverters and function generators.

The function generator is formed utilizing a nonlinear of the circuit itself or the circuit element. Usually, it will be difficult to generate the even function in accordance with this scheme. Accordingly, it is preferable that an absolute value circuit is added before the function generator. In case of equation (28), it is sufficient to provide the absolute value circuit only.

To implement equations (30) and (31), there are used circuits as shown in FIGS. 79 and 80 in which the polarity of an input is inverted by an analog inverter, a and b; a and −b are compared with one another by analog comparators, respectively, and an analog switch is controlled in accordance with a resultant. In a case where the function is expressed by equation (28), as mentioned above, either of a, b, −a and −b is outputted. Therefore, the basic operation of the second group of the present invention may be implemented by a circuit comprising comparators, inverters and data selectors only.

In the analog circuit, maximum value circuits and minimum value circuits are readily available. Accordingly, in a case where the function is expressed by equation (28), if equations (32) to (34) are used, the basic operation of the second group of the present invention may be implemented by a circuit comprising maximum value circuits, minimum value circuits and inverters only.

In a case where the absolute value and the sign are separated and processed, the separation of the absolute value and the sign may be implemented by comparators and absolute value circuits, or comparators, inverters and analog switches.

A composition may be implemented by inverters and analog switches. In case of the use of the analog switch, it is substantially identical to the scheme as mentioned above, since the selection is performed in accordance with an output resultant of the comparator.

In this manner, the use of analog adders, analog subtracters, comparators, analog inverters, absolute value circuits, maximum value circuits, minimum value circuits, analog switches and function generators makes it possible to implement a correlation circuit adopting the operation * of the present invention.

First, there will be described embodiments in which the numerical value is assigned to a voltage (a voltage mode). For the purpose of simplification, it is assumed that each circuit is operative in a two electric power source system of +Vp and −Vp, and OV corresponds to the numerical value 0.

FIGS. 112, 113, 114 and 115 show an analog adder, an analog inverter, an analog adder-subtracter and a comparator, respectively. The former three elements are involved in a liner circuit. A gain to the respective input of the three elements is determined by a ratio of a resistance of an input and a feedback resistance. The comparator may use a differential amplifier without a negative feedback.

Figure 116:
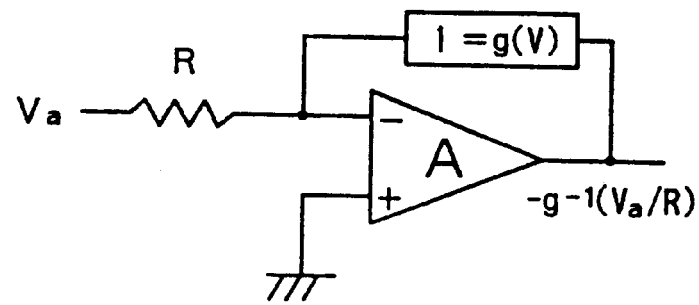
FIGS. 116–118 are each a circuit diagram of an analog function generator.
Figure 117:
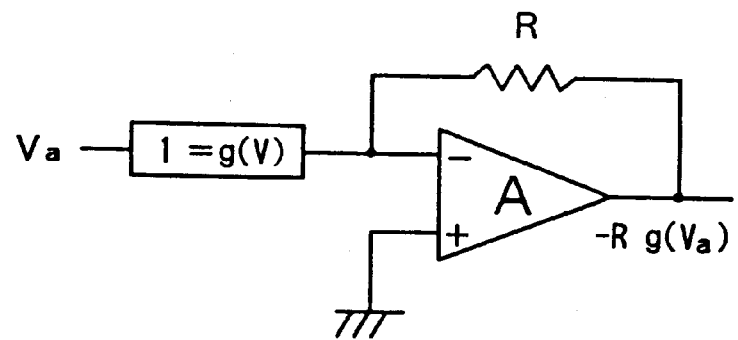
Figure 118:
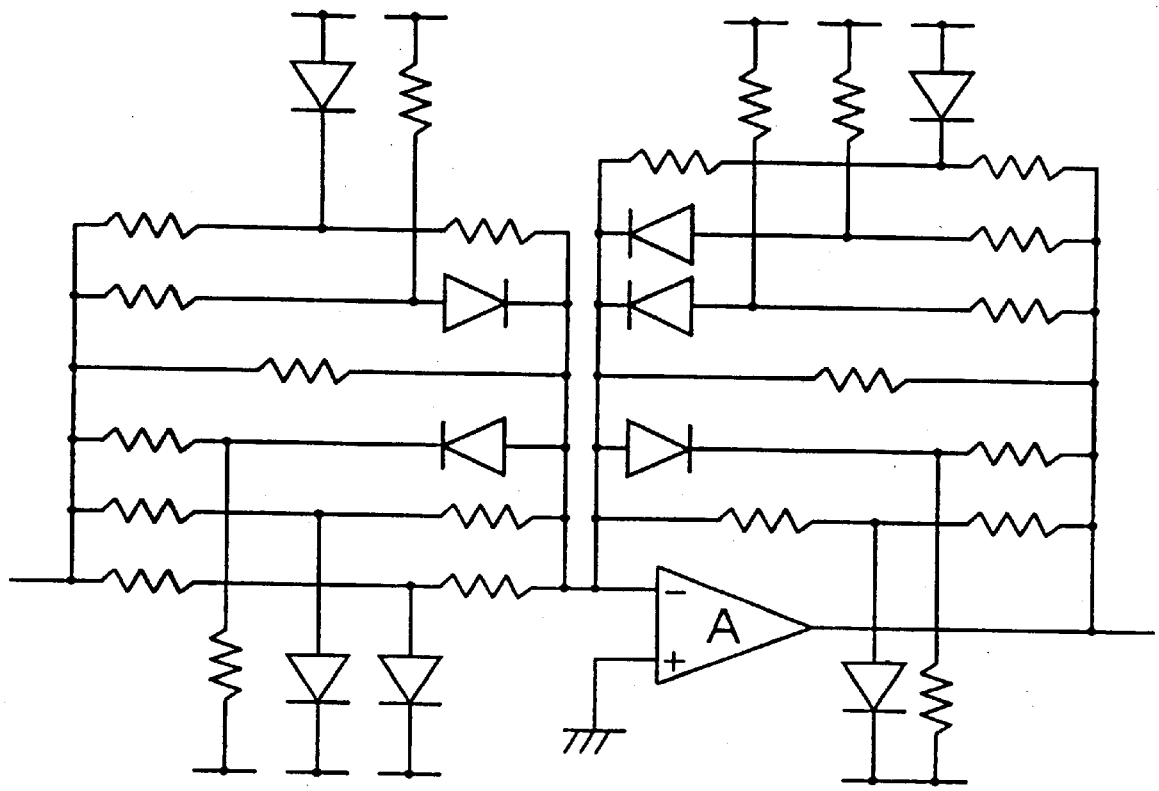

The function generator, the absolute value circuit, the maximum value circuit and the minimum value circuit are each a non-linear circuit. Hence, those circuits are implemented by the use of a non-linear element or a non-linearity of the circuit. FIGS. 116 and 117 show each a function generator using an element having a non-linear current-voltage characteristic. When the characteristic of this element is expressed by I=g(V), the function generator shown in FIG. 116 outputs $V_O = -g^{-1}(V_a/R)$, whereas the function generator shown in FIG. 117 outputs $V_O = -Rg(V_a)$. It is acceptable that the non-linear element is used at the both ends of the input and the feedback. In order to generate the general function, for example, as shown in FIG. 118, diodes and resistances are combined to form a necessary function with a polygon approximation.

Figure 119:
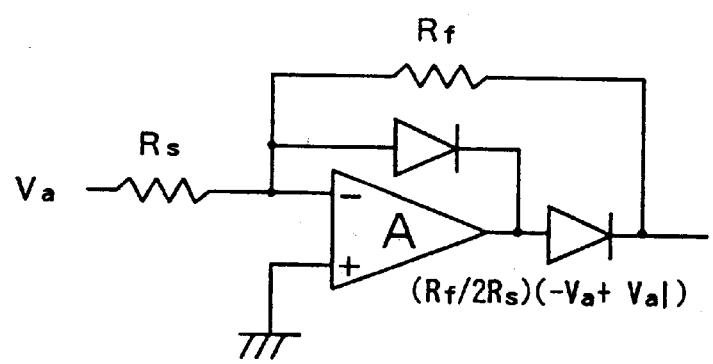
FIGS. 119–120 are each a circuit diagram of a half-wave rectifier.
Figure 120:
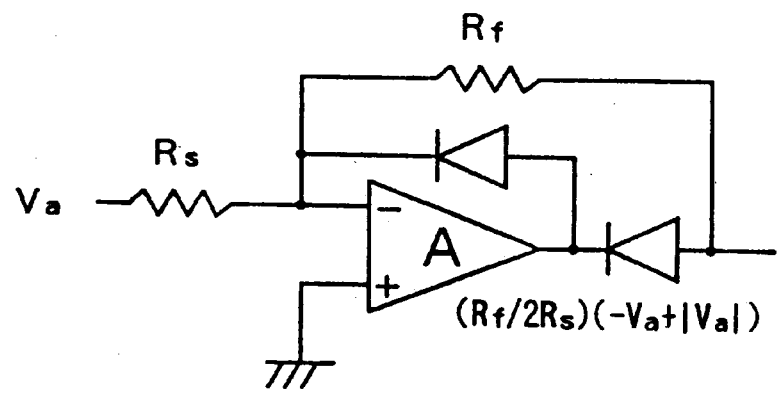
Figure 121:
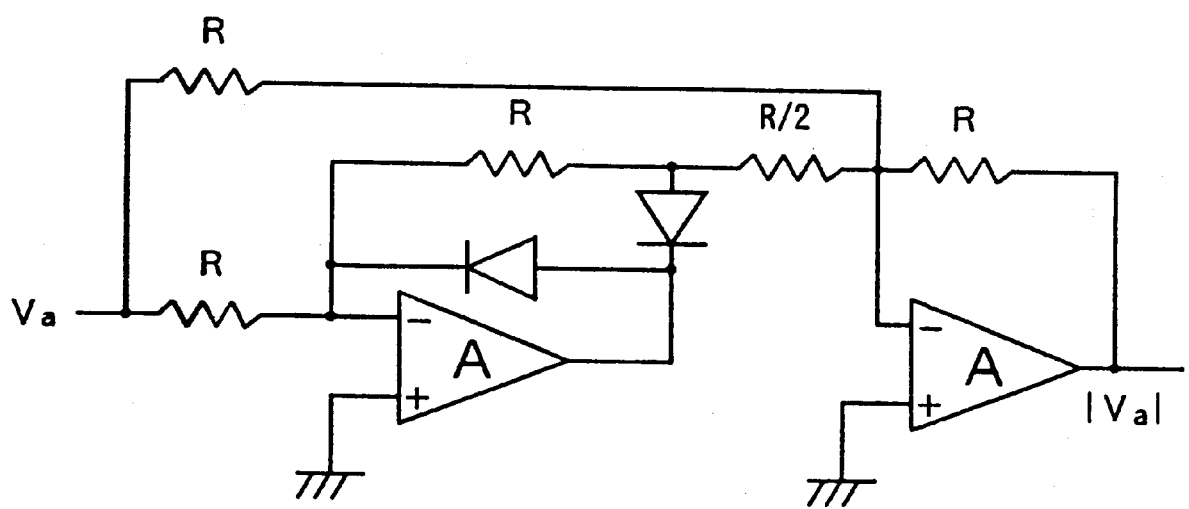
FIG. 121 is a circuit diagram of an absolute value circuit.
Figure 122:
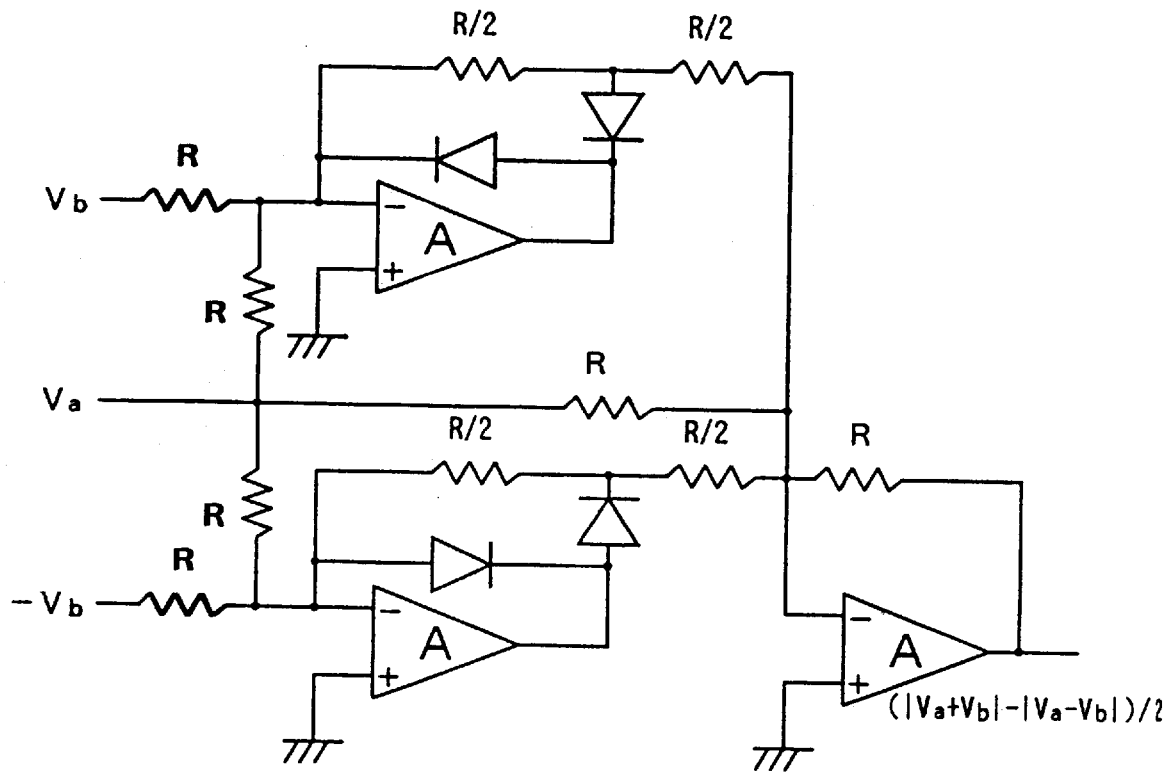
FIG. 122 is a circuit diagram of a correlation operation circuit.

Since these function generators cannot generate the even function, the absolute value circuit is needed. Utilization of a non-linearity of diodes as the half-wave rectifiers shown in FIGS. 119 and 120 makes it possible to clip an output into 0 for inputs of the positive or the negative. Finding the difference between twice of this output and the linear output makes it possible to form the absolute value circuit shown in FIG. 121. Further, when the diodes of the circuit shown in FIG. 121 is replaced oppositely in the direction, $-|V_a|$ is derived. Thus, through a combination of these items, as shown in FIG. 122, it is possible to perform the operation according to equation (29).

Figure 123:
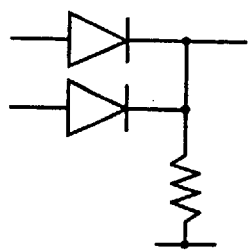
FIG. 123 is a circuit diagram of a maximum value circuit.
Figure 124:
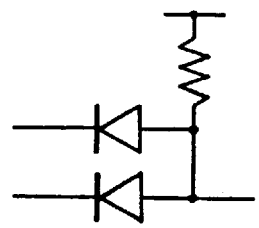
FIG. 124 is a circuit diagram of a minimum value circuit.
Figure 125:
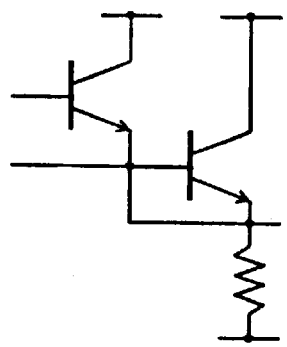
FIG. 125 is a circuit diagram of a maximum value circuit.
Figure 126:
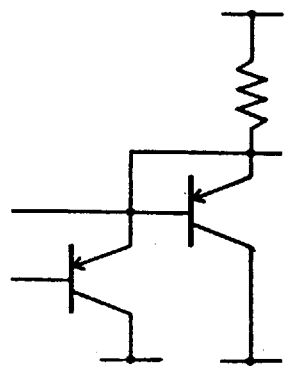
FIG. 126 is a circuit diagram of a minimum value circuit.
Figure 127:
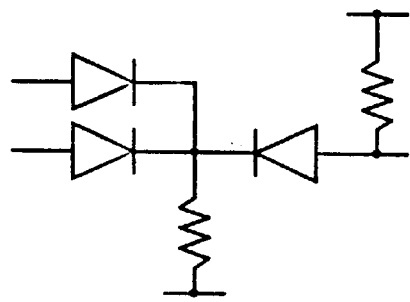
FIG. 127 is a circuit diagram of a maximum value circuit.
Figure 128:
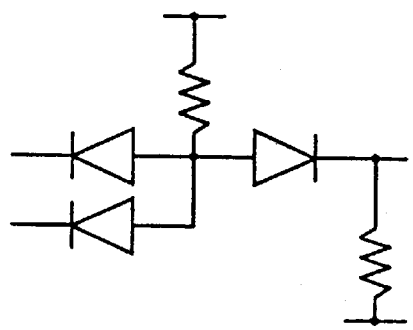
FIG. 128 is a circuit diagram of a minimum value circuit.
Figure 129:
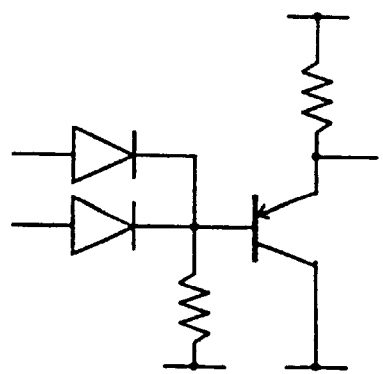
FIG. 129 is a circuit diagram of a maximum value circuit.
Figure 130:
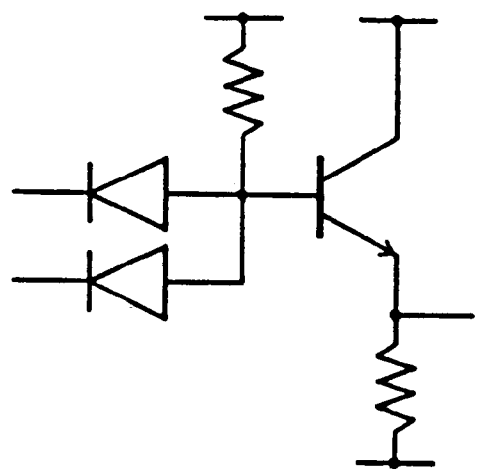
FIG. 130 is a circuit diagram of a minimum value circuit.
Figure 131:
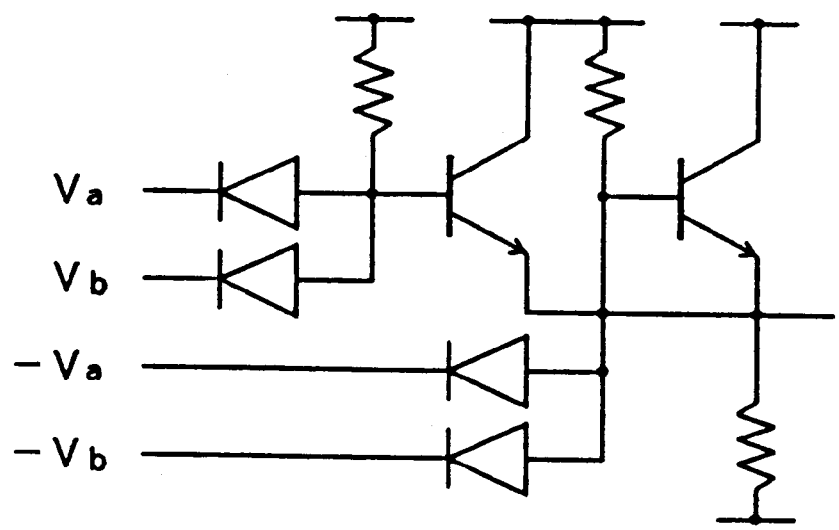
FIG. 131 is a circuit diagram of a maximum and minimum value circuit.

The maximum value circuit and the minimum value circuit may be formed, as shown in FIGS. 123 and 124, respectively, with diodes and resisters. Further, as shown in FIGS. 125 (maximum value circuit) and 126 (minimum value circuit), it is acceptable to use an emitter follower and a source follower instead of the diode. According to those circuits, the output is shifted by the corresponding forward turn-on voltage of the diode or by the corresponding threshold voltage of the transistor. In order to compensate for these components, there are provided a maximum value circuit shown in FIG. 127, a minimum value circuit shown in FIG. 128, a maximum value circuit shown in FIG. 129 and a minimum value circuit shown in FIG. 130. Those circuits are combined on a suitable basis. As a result, there is formed a circuit shown in FIG. 131 in which the diodes of an input stage constitutes the minimum value circuit, and the emitter follower constitutes the maximum value circuit. Thus, it is possible to readily implement the operation of equation (32).

The analog switch may be implemented by a path transistor or a diode switch.

Figure 114:
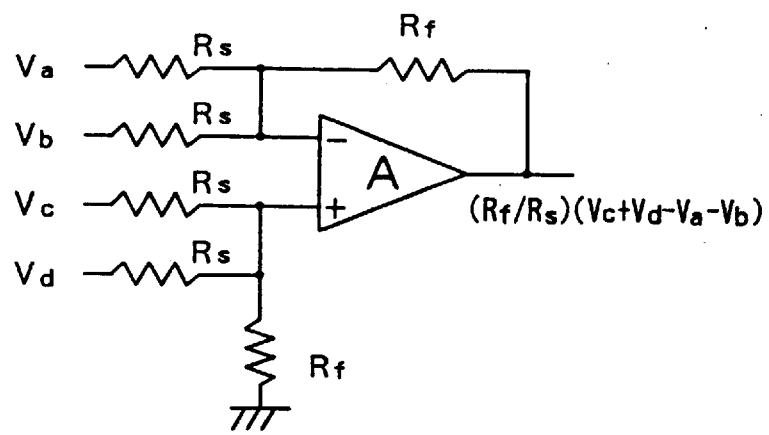
FIG. 114 is a circuit diagram of an analog adder and subtracter.
Figure 115:
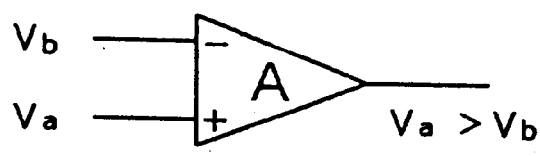
FIG. 115 is a circuit diagram of an analog comparator.

The circuits shown in FIGS. 112 to 122 are used as inverting amplifiers excepting that shown in FIGS. 114 and 115. Consequently, there is no need to be necessarily a differential amplifier. Through taking into consideration a threshold, an input voltage limit, a voltage gain, an input impedance and the like, it is possible to use the general inverting amplifier.

Figure 132:
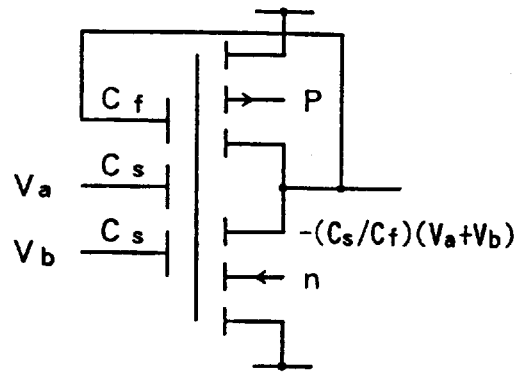
FIG. 132 is a circuit diagram of an inverting adder.
Figure 133:
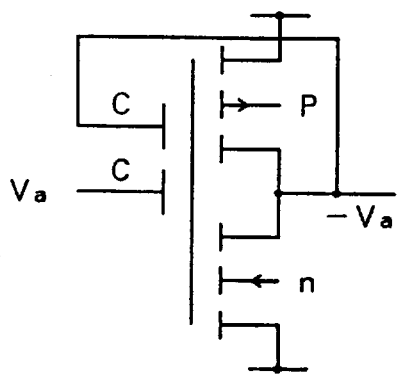
FIG. 133 is a circuit diagram of an analog inverter.
Figure 134:
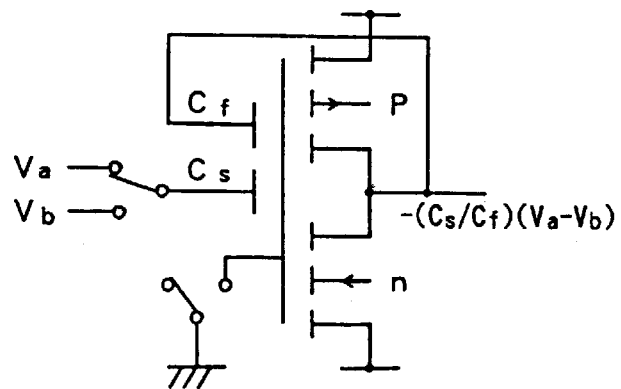
FIG. 134 is a circuit diagram of a clocked subtracter.
Figure 135:
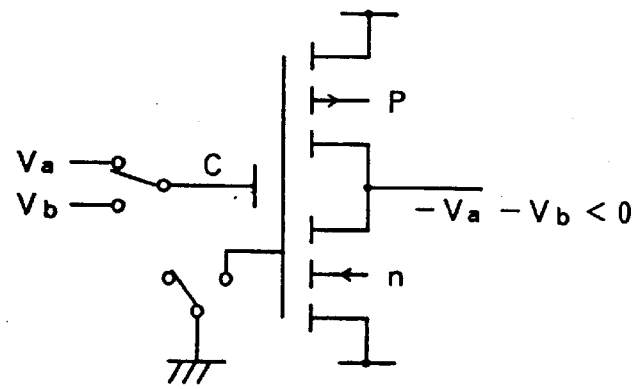
FIG. 135 is a circuit diagram of a clocked comparator.
Figure 136:
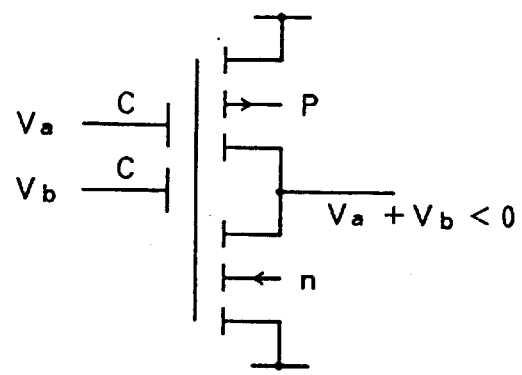
FIG. 136 is a circuit diagram of a variable threshold circuit.

While it has a slightly different characteristic from the general inverting amplifier, it is possible to use a circuit (a neuron MOS circuit) in which a gate of a MOS transistor is placed in the state of floating, and an input is applied through a capacitive coupling. A neuron MOS inverter, which uses the neuron MOS circuit as it is, presents a characteristic (weighted threshold characteristic) in which when a potential of the floating gate, which will be determined by one derived through averaging the input potential with the weighted capacity, exceeds the threshold value, the output thereof rapidly changes from the high level to the low level. Applying the negative feedback to this inverter with the capacity makes it possible to use the inverter as a multi-input inverting amplifier. The multi-input inverting amplifier may serve as an adder (FIG. 132) and an analog inverter (FIG. 133). The subtracter and the comparator may be constituted of the analog inverter and the multi-input inverting amplifier or the neuron MOS inverter. Further, if a switch is provided on the floating gate, and an input signal is applied to the floating gate and then the floating gate is reset, and thereafter an additional input is applied thereto, it is possible to obtain the floating gate potential corresponding to the difference between the two inputs. Through utilizing this, it is possible to form a subtracter (FIG. 134) and the comparator (FIG. 135). Through using the characteristic of the neuron MOS inverter as it is, it is possible to determine whether the sum of inputs is over a predetermined value (FIG. 136).

Figure 137:
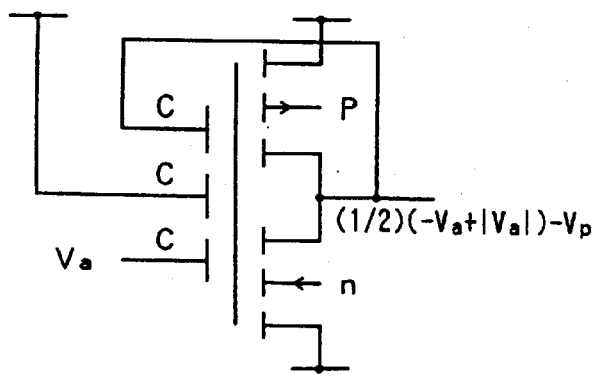
FIGS. 137–138 are each a circuit diagram of a non-linear circuit.
Figure 138:
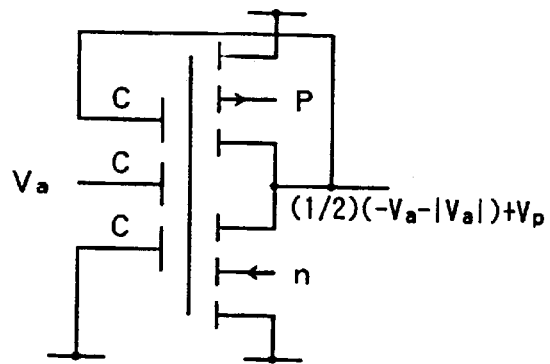

It is difficult to implement the non-linear circuit using the non-linearity of the element. It is possible to obtain the function generator using the non-linear capacitance such as the variable capacity diode and the multi-input inverting amplifier. However, according to this scheme, the available function is limited. For these reasons, a nonlinear of the circuit is utilized. Through utilizing that the potential of the output is clipped near the potential of the power source, it is possible to obtain the non-linear characteristic as shown in FIGS. 137 and 138. This characteristic is identical to that of FIGS. 119 and 120, except for having an offset. Thus, in a similar arrangement to that of FIGS. 121 and 122, it is possible to provide an absolute circuit and a circuit for outputting equation (29).

Next, there will be described embodiments in which the numerical value is assigned to a current (a current mode). In the current mode, it is difficult to cause a current to flow in both directions. Hence, there will be described embodiments as to a current source type. A constant current offset $I_{off}$ is assigned to the numerical number 0.

Figure 139:
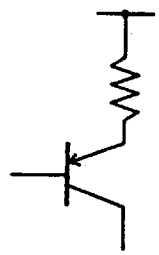
FIG. 139 is a circuit diagram of a current source.
Figure 140:
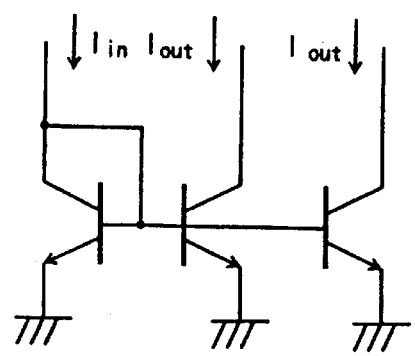
FIG. 140 is a circuit diagram of a current mirror.
Figure 141:
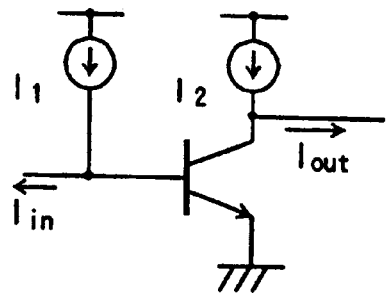
FIG. 141 is a circuit diagram of a threshold detector.
Figure 142:
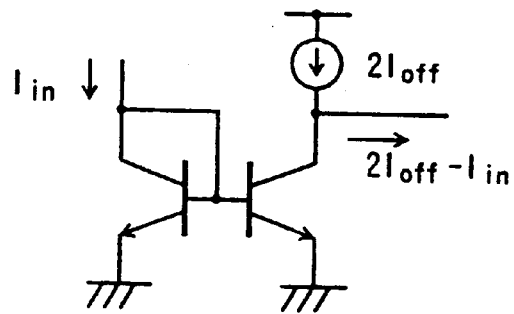
FIG. 142 is a circuit diagram of an analog inverter.
Figure 143:
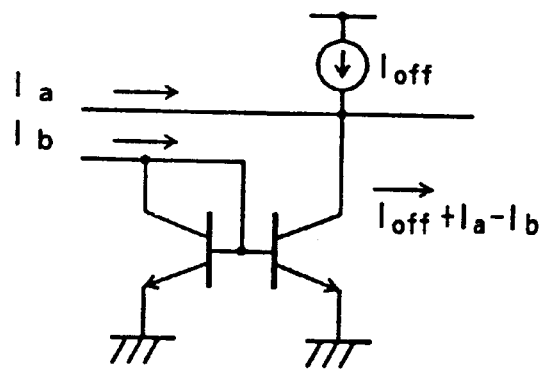
FIG. 143 is a circuit diagram of a subtracter.
Figure 144:
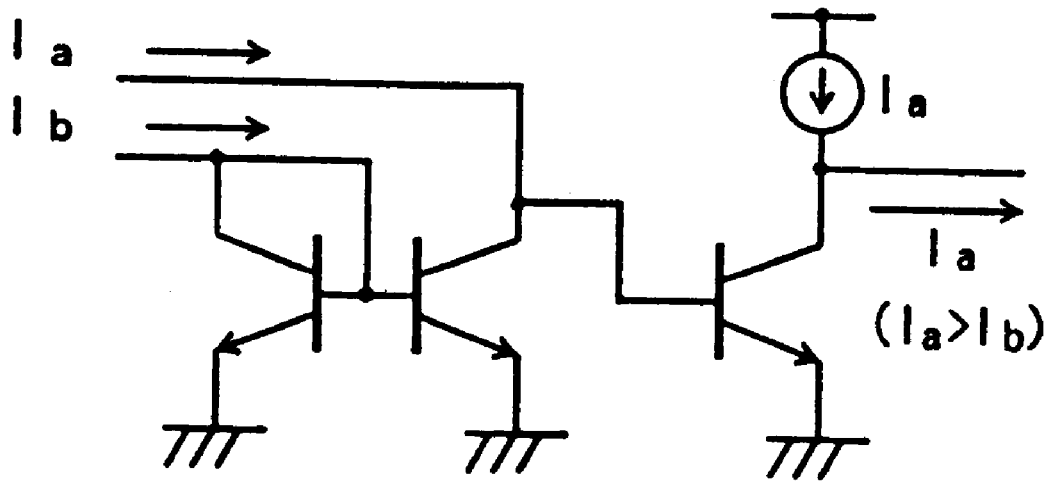
FIG. 144 is a circuit diagram of a comparator.

In the current mode, it is possible to perform an addition through simply performing a connection. A circuit is formed in addition to the connection by the combination of a current source (FIG. 139), a current mirror circuit (FIG. 140) and a threshold detector (FIG. 141). The use of the current mirror makes it possible to perform an inversion of the polarity as shown in FIG. 142. Varying an area of the transistor makes it possible to simultaneously perform a constant-fold. The subtraction may be implemented by the current mirror circuit and the connection as shown in FIG. 143. In some cases, the output is clipped to 0 depending on a magnitude of the input. A comparator may be formed by combining the current mirror and the threshold detector as shown in FIG. 144.

Figure 145:
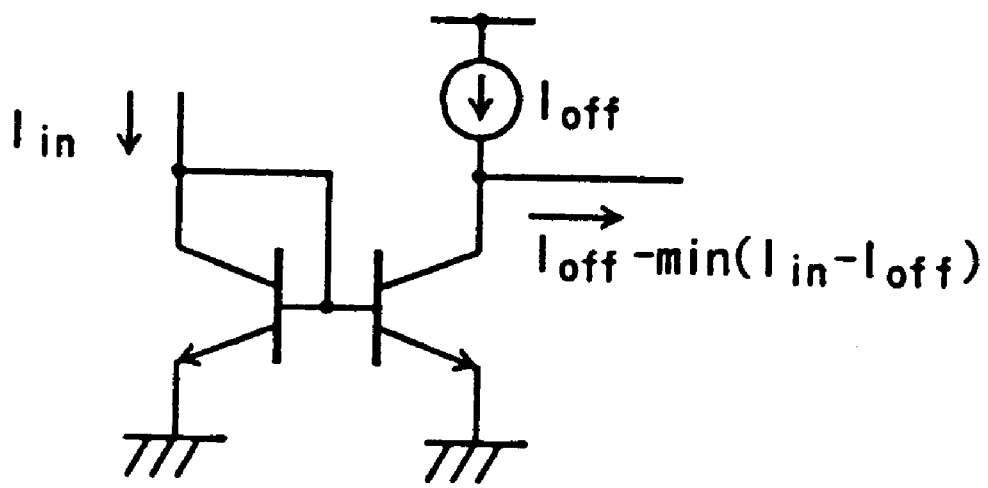
FIG. 145 is a circuit diagram of a non-linear circuit.
Figure 146:
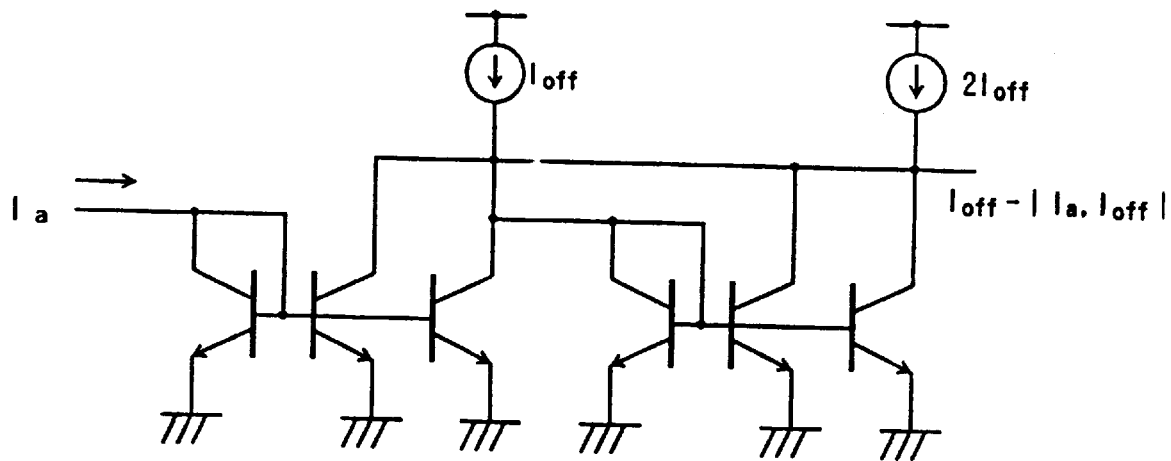
FIG. 146 is a circuit diagram of an absolute value circuit.
Figure 147:
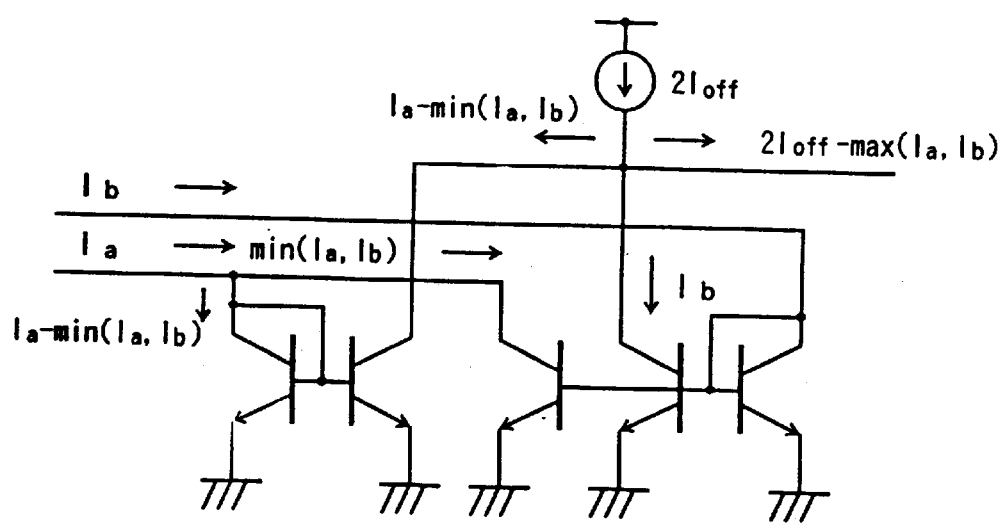
FIG. 147 is a circuit diagram of a maximum value circuit.

It is possible for the non-linear circuit to utilize such a characteristic that in the circuit shown in FIG. 145 when the input is over $I_{off}$ the output is clipped to 0. The circuit shown in FIG. 146 serves as an absolute value circuit. The circuit shown in FIG. 147 serves as a maximum value circuit.

The function, which is to be implemented in accordance with the present invention, is to evaluate the correlation in which when two signals match with one another with greatest accuracy, the maximum (or minimum) output is derived.

In many cases, greater accuracy can be expected on a scheme in which distinctive signal components are emphasized or unnecessary signal components are suppressed, and then the correlation is computed, rather than a scheme in which the signals to be tested as to the matching are processed in their present form. For example, in case of image signals, if the edge is emphasized beforehand through a differential operation, it is possible to reduce the influence of noises or the influence of uniform variation in luminance in its entirety.

According to the correlation operation using the product, it is possible not only to detect that two signals match with one another, but also to detect that two signals are in a linear relation. The reason why this is so done is as follows. In the correlation operation by the product, a distribution law and an associative law, which correspond to equations (16a) and (16b), respectively, stand for. Hence, even if the input signal is subjected to a constant-fold process or a constant offset is applied, the input is not affected essentially. On the other hand, according to the operation * of the present invention, it is impossible to detect that two signals are in a linear relation. As a result, in a case where two signals are different in level from one another, there is a possibility that a proper matching is established. As in the usual pattern matching and a movement detection, in a case where two signals are originally identical in level to one another and it is sufficient simply to detect a coincidence therebetween, this involves no problem. However, in a case where a matching is established between signal-to-signal which are different in a signal level from one another, it is preferable to adjust the signal level of two signals by the pre-processing.

The reason why the present scheme is strong to noises as compared with an "absolute value of difference" scheme associated with equation (6) is that according to the present scheme an odd function is provided for each input, so that noises are readily cancelled. However, in a case where signals are extremely unbalanced to either of the positive and the negative, even if a mismatch of two input signals is large, there is a fear that the negative correlation value is not outputted. For causing the characteristic of the present scheme to effectively operate, it is preferable that the average of the inputs is 0. In order to attain this matter, in a case where the average of the inputs is not 0, it is preferable that the associated value is subtracted beforehand.

As mentioned above, it is a very effective method that the input data are subjected to a preprocessing and then the correlation operation according to the operation * of the present invention is carried out.

Of the preprocessings the simplest one is to add the constant value to the constant-fold of the input data. Determining beforehand the average of the input signals and subtracting that value make it possible to set the average of the data after the processing to 0. This operation can be regarded as the convolution operation.

If the standard deviation of the input data is determined, dividing the data by the value of the standard deviation makes it possible to adjust the signal level of data after the processing. Actually, however, it would make the burden too heavy to evaluate the standard deviation. Hence, it is replaced by the average of |signal-average|, the maximum—the minimum, and the like. However, while these are simple, these are bad in precision and it is easily affected by noises.

In this manner, it is possible to adjust the signal level of the inputs, thereby performing the matching of the inputs having mutually different signal levels.

Further, according to the present scheme, it is possible to increase resistance to noises since the average of the input signals becomes 0. Also in the differential operation and the like according to the convolution, it is possible to make the average of the signals 0. Thus, in this case, there is no need to perform the operation of subtracting the average.

It is possible to perform various operations similar to those of the above-mentioned first group by the schemes or the circuits for implementing the basic operation of the second group of the present invention as mentioned above. In this case, the operation * referred to in the explanation of the embodiments as to the first group of the present invention may be replaced in read by the basic operation (cf. equation (10)) of the second group of the present invention. Here, there will be explained only the simulation results involving differences as compared with the simulation results on the first group of the present invention.

Figure 148:
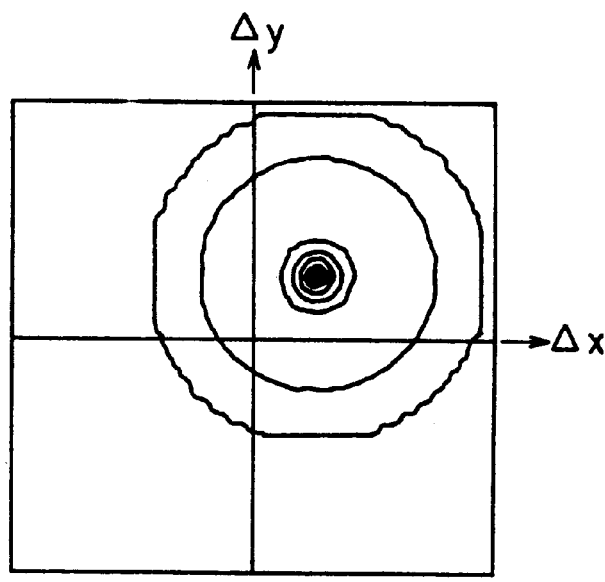
FIG. 148 is a contour map of a simulation result, which is obtained through using an operation of the second group according to the present invention, corresponding to FIG. 40.
Figure 149:
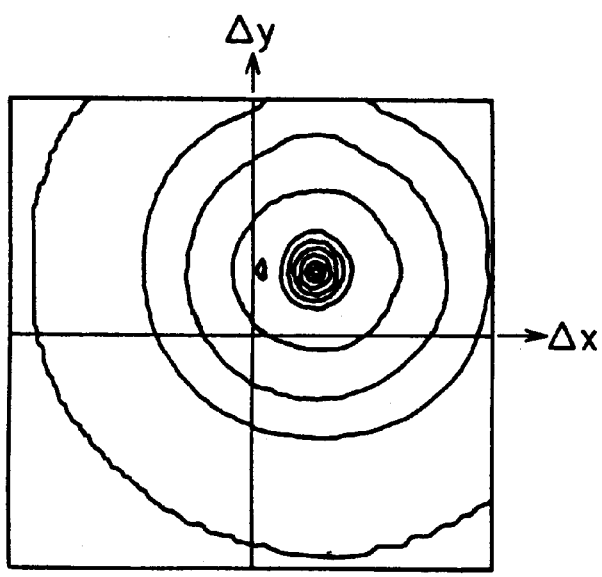
FIG. 149 is a contour map of a simulation result, which is obtained through using an operation of the second group according to the present invention, corresponding to FIG. 55.

FIG. 148 is a contour map of a simulation result, which is obtained through using an operation of the second group according to the present invention, corresponding to FIG. 40. FIG. 149 is a contour map of a simulation result, which is obtained through using an operation of the second group according to the present invention, corresponding to FIG. 55. As an operation equation, the following equation is adopted.

$$a*b=|a+b|-|a-b|.$$

This equation is an example of the operation equation of the second group of the present invention:

$a*b=f(a+b)-f(a-b)$.

When the operation equation in the explanation made referring to FIGS. 40 and 55 is replaced in read by this equation, the above-mentioned explanation is effected. Hence, the redundant explanation will be omitted.

As compared with FIGS. 40 and 55, FIGS. 148 and 149 involve peaks more sharp than those in FIGS. 40 and 55. Consequently, it would be understood that the operation equation of the second group of the present invention is suitable for the operation with greater accuracy.

Effects of the embodiments mentioned above are summarized as follows:

(1) In the two-dimensional correlation for the differential input image, the operation * of the present invention is well analogous to the "product" on an operation basis. Therefore, it is possible to implement the correlation with a simple hardware such as adders and comparators.

(2) The "two-dimensional correlation using a Hough transform" is approximately equivalent to the "general two-dimensional correlation". Therefore, it is possible to perform the correlation on a one-dimensional processing basis. Particularly, it is possible to perform the differentiation (convolution) also on a one-dimensional processing basis.

(3) In the two-dimensional correlation for the differential input image, a noise resistance property is extremely improved. Incidentally, according to the conventional "two-dimensional correlation (equation (6)) by the absolute value of differences", the noise resistance property is not improved even for the differential image.

(4) The use of the integer value filter makes it possible to perform the differentiation (convolution) by adders. Therefore, according to the present invention, it is possible to perform the whole operations, including the correlation, through using adders.

As mentioned above, according to the present invention, the correlation and the element correlation are practiced using the operation of the sum, instead of the operation of the product. Thus, this contributes to the reduction of the circuit scale and an improvement of the operational speed, and also providing a greater precision in the same degree as the conventional correlation operation.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. An arithmetic unit in which two numerical values a and b are input. and the two numerical values a and b are subjected to a predetermined operation process, so that a numerical value c representative of an operation result is derived, said arithmetic unit comprising:

an absolute value operation unit for evaluating an absolute value |c| of the numerical value c, and a sign operation unit for evaluating a sign "sign c" of the numerical value c, wherein said absolute value operation unit receives input signals representing the two numerical values a and b, and then outputs a signal representing a sum |a|+|b| of absolute values |a| and |b| of the two numerical values a and b, and said sign operation unit outputs signals representing a plus and a minus in compliance with either one of a match and a mismatch of signs "sign (a) and sign (b)" of the two numerical values a and b and the other, i.e. the product of a and b, respectively.

2. An arithmetic unit according to claim 1, wherein said absolute value operation unit comprises a digital adder, said digital adder receiving two input digital signals representing absolute values |a| and |b| of the two numerical values a and b, and performing an arithmetic operation of a sum |a|+|b| of the absolute values |a| and |b|, thereby outputting a digital signal representing the absolute value |c| of the numerical value c; and said sign operation unit comprises a logic circuit, said logic circuit receiving digital signals representing signs "sign (a) and sign (b)" of the two numerical values a and b, and operating a logical exclusive OR on the signs "sign (a) and sign (b)" of the two numerical values a and b, thereby evaluating the sign "sign (c)" of the numerical value c.

3. An arithmetic unit according to claim 2, wherein said absolute value operation unit outputs numerical value 0, instead of the sum |a|+|b|, when ab=0.

4. An arithmetic unit according to claim 1, wherein said absolute value operation unit comprises an analog adder, wherein said analog adder receiving two input analog signals representing absolute values |a| and |b| of the two numerical values a and b, and performing an arithmetic operation of the sum of the two absolute values, thereby outputting an analog signal representing the absolute value |c| of the numerical value c, and said sign operation unit comprises a logic circuit, said logic circuit receiving digital signals representing signs "sign (a) and sign (b)" of the two numerical values a and b, and said logic circuit operating a logical exclusive OR on the signs "sign (a) and sign (b)" of the two numerical values a and b, thereby evaluating the sigh "sign (c)" of the numerical value c.

5. An arithmetic unit according to claim 4, wherein said absolute value operation unit outputs numerical value 0, instead of the sum |a|+|b|, when ab=0.

6. An arithmetic unit according to claim 1, wherein said absolute value operation unit outputs numerical value 0, instead of the sum |a|+|b|, when ab=0.

7. An arithmetic unit according to claim 1, wherein said absolute value operation unit receives signals representing absolute values |a| and |b| of the two numerical values a and b, and outputs a signal representing a smaller one of the absolute values |a| and |b|, and wherein said sign operation unit outputs signals representing a plus and a minus in compliance with either one of a match and a mismatch of signs "sign (a) and sign (b)" of the two numeral values a and b and the other, respectively.

8. An arithmetic unit n which two numerical values a and b are input, and the two numerical values a and b are subjected to a predetermined operation process, so that a numerical value c representative of an operation result is derived, said arithmetic unit comprising:

an absolute value operation unit for evaluating an absolute value |c| of the numerical value c, and a sign operation unit for evaluating a sign "sign c" of the numerical value c, wherein said absolute value operation unit comprises:

an adder unit for receiving input signals representing absolute values |a| and |b| of the two numerical values a and b, and for outputting an addition signal representing a sum |a|+|b| of the two absolute values |a| and |b|;

a first subtracter unit for receiving input signals representing absolute values |a| and |b| of the two numerical values a and b, and for outputting a first subtraction signal representing a difference $|a|-|b|$ between the two absolute values $|a|$ and $|b|$;

a difference-absolute value operation unit for receiving the first subtraction signal, and for outputting an absolute value signal representing an absolute value $||a|-|b||$ of the difference $|a|-|b|$; and a second subtracter unit for receiving the addition signal and the absolute value signal, and for outputting a second subtraction signal representing a difference $|a|+|b|-||a|-|b||$ between the sum $|a|+|b|$ and the absolute value $||a|-|b||$, and said sign operation unit outputs signals representing a plus and a minus in compliance with either one of a match and a mismatch of signs "sign (a) and sign (b)" of the two numeral values a and b and the other, respectively.

9. An arithmetic unit in which two numerical values a and b are input, and the two numerical values a and b are subjected to a predetermined operation process, so that a numerical value c representative of an operation result is derived, said arithmetic unit comprising:

an absolute value operation unit for evaluating an absolute value $|c|$ of the numerical value c, and a sign operation unit for evaluating a sign "sign c" of the numerical value c, wherein said absolute value operation unit comprises:

an adder unit for receiving input signals representing absolute values $|a|$ and $|b|$ of the two numerical values a and b, and for outputting an absolute value addition signal representing a sum $|a|+|b|$ of the two absolute values $|a|$ and $|b|$;

a first function generation unit for receiving the absolute value addition signal, and for applying to the absolute value addition signal an even function f (x) involving a monotone variation when a variable x is in a predetermined positive area, where $f(x) \approx r \cdot X^2 + s$; r and s are constant, thereby generating a first function signal representing f ($|a|+|b|$);

a first subtracter unit for receiving input signals representing absolute values $|a|$ and $|b|$ of the two numerical values a and b, and for outputting an absolute value subtraction signal representing a difference $|a|-|b|$ between the two absolute values $|a|$ and $|b|$;

a second function generation unit for receiving the absolute value subtraction signal, and for applying the even function f (x) to the absolute value subtraction signal, thereby generating a second function signal representing f ($|a|-|b|$); and a second subtracter unit for receiving the first function signal and the second function signal, and for outputting a signal representing a difference f ($|a|+|b|$)−f($|a|-|b|$) between f($|a|+|b|$) and f ($|a|-|b|$), and said sign operation unit outputs signals representing a plus and a minus in compliance with either one of a match and a mismatch of signs "sign (a) and sign (b)" of the two numerical values a and b and the other, respectively.

10. An arithmetic unit in which two numerical values a and b are input, and the two numerical values a and b are subjected to a predetermined operation process, so that a numerical value c representative of an operation result is derived, said arithmetic unit comprising:

an absolute value operation unit for evaluating an absolute value $|c|$ of the numerical value c, and a sign operation unit for evaluating a sign "sign c" of the numerical value c, wherein said absolute value operation unit receives signals representing absolute values $|a|$ and $|b|$ of the two numerical values a and b, and applies a predetermined function g to the absolute values $|a|$ and $|b|$, thereby outputting signals representing g ($|a|+|b|$)−g ($|a|-|b|$) when $|a| \geq |b|$, and g($|a|+|b|$)−g($|b|-|a|$) when $|a| \leq |b|$, respectively, and wherein said sign operation unit outputs signals representing a plus and a minus in compliance with either one of a match and a mismatch of signs "sign (a) and sign (b)" of the two numeral values a and b and the other, respectively.

11. An arithmetic unit according to claim 12, wherein when ab=0, the operation result c=0 is substituted for the sum $|a|+|b|$.

12. An arithmetic unit comprising:

an analog arithmetic operator for performing an addition or an addition-subtraction for a plurality of analog signals;

an analog inverter for receiving analog signals representing two numerical values a and b, and for evaluating analog signals representing two numerical values −a and −b; and an analog switch for switchingly transmitting at least part of four analog signals representing the numerical values a, b, −a and −b respectively to said analog arithmetic operator in accordance with signs "sign (a) and sign (b)" of the two numerical values a and b, wherein an analog operation is carried out in such a manner that a sum $|a|+|b|$ of absolute values $|a|$ and $|b|$ of the two numerical values a and b is given as an absolute value $|c|$ of an operation result c , and a plus and a minus are given as a sign "sign (c)" of the operation result c in compliance with either one of a match and a mismatch of polarities of the two numerical values a and b and the other, respectively.

13. An arithmetic unit comprising:

an adder unit for receiving input signals representing two numerical values a and b, and for outputting an addition signal representing a sum a+b of the two values a and b;

a sum-absolute value operation unit for receiving the addition signal, and for outputting a sum-absolute value signal representing an absolute value $|a+b|$ of the sum a+b of the two values a and b;

a first subtracter unit for receiving the input signals representing the two numerical values a and b and for outputting a subtraction signal representing a difference a−b between the two numerical values a and b;

a difference-absolute value operation unit for receiving the subtraction signal, and for outputting a difference-absolute value signal representing an absolute value $|a-b|$ of the difference a−b between the two numerical values a and b; and a second subtracter unit for receiving the sum-absolute value signal and the difference-absolute value signal, and for outputting a signal representing a difference $|a+b|-|a-b|$ between the absolute value $|a+b|$ of the sum a+b of the two numerical values a and b and the absolute value $|a-b|$ of the difference a−b.

14. An arithmetic unit, wherein upon receipt of two numerical values a and b, the arithmetic unit performs an operation of $|a+b|-|a-b|$ by outputting:

a signal representing the numerical value b, when a $\geq$ −b and a $\geq$ b;

a signal representing the numerical value a, when a $\geq$ -b and a $\leq$ b;

a signal representing the numerical value -a, when a $\leq$ -b and a $\geq$ b; and a signal representing the numerical value -b, when a $\leq$ -b and a $\leq$ b.

15. An arithmetic unit comprising:

an adder unit for receiving input signals representing two numerical values a and b, and for outputting an addition signal representing a sum a+b of the two numerical values a and b;

a first function generation unit for receiving the addition signal, and for applying to the addition signal an even function f (x) involving a monotone variation when a variable x is in a predetermined positive area, where f $(x) \neq r \cdot x^2 + s$; r and s are constant, thereby generating a first function signal representing f (a+b);

a first subtracter unit for receiving input signals representing the two numerical values a and b, and for outputting a subtraction signal representing a difference a-b between the two numerical values a and b;

a second function generation unit for receiving the subtraction signal, and for applying the even function f (x) to the subtraction signal, thereby generating a second function signal representing f (a-b); and a second subtracter unit for receiving the first function signal and the second function signal, and for outputting a signal representing a difference f(a+b)-f(a-b) between f (a+b) and f (a-b).

16. An arithmetic unit, wherein upon receipt of two numerical values a and b, the arithmetic unit applies a predetermined function g to the two numerical values a and b, and performs an operation of g (|a+b|)-g (|a-b|) by outputting:

a signal representing g (a+b) -g (a-b), when a $\geq$ -b and a $\geq$ b;

a signal representing g (a+b) -g (b-a), when a $\geq$ -b and a $\leq$ b;

a signal representing g (-a-b)-g (a-b), when a $\leq$ -b and a $\geq$ b; and a signal representing g (-a-b) -g (b-a), when a $\leq$ -b and a $\leq$ b.

* * * * *